US008386798B2

(12) United States Patent
Dodgson et al.

(10) Patent No.: US 8,386,798 B2
(45) Date of Patent: Feb. 26, 2013

(54) BLOCK-LEVEL DATA STORAGE USING AN OUTSTANDING WRITE LIST

(75) Inventors: David Dodgson, Lansdale, PA (US); Joseph Neill, Malvern, PA (US); Ralph Farina, Downingtown, PA (US); Edward Chin, Newtown Square, PA (US); Albert French, Schwenksville, PA (US); Scott Summers, Collegeville, PA (US)

(73) Assignee: Unisys Corporation, Blue Bell, PA (US)

( * ) Notice: Subject to any disclaimer, the term of this patent is extended or adjusted under 35 U.S.C. 154(b) by 840 days.

(21) Appl. No.: 12/342,500

(22) Filed: Dec. 23, 2008

(65) Prior Publication Data

US 2010/0161919 A1   Jun. 24, 2010

(51) Int. Cl.
*G06F 11/30* (2006.01)
(52) U.S. Cl. .................. 713/189; 711/161; 713/193
(58) Field of Classification Search .................. 711/161; 713/189
See application file for complete search history.

(56) References Cited

U.S. PATENT DOCUMENTS

| 6,167,531 | A * | 12/2000 | Sliwinski ................ 714/13 |
| 2003/0188153 | A1 | 10/2003 | Demoff et al. |
| 2004/0024962 | A1 | 2/2004 | Chatterjee et al. |
| 2004/0049687 | A1 * | 3/2004 | Orsini et al. ................ 713/189 |
| 2004/0133577 | A1 | 7/2004 | Miloushev et al. |
| 2005/0165972 | A1 | 7/2005 | Miyata et al. |
| 2005/0273686 | A1 | 12/2005 | Turner et al. |
| 2007/0067644 | A1 * | 3/2007 | Flynn et al. ................ 713/189 |
| 2007/0079083 | A1 | 4/2007 | Gladwin et al. |
| 2007/0160198 | A1 | 7/2007 | Orsini et al. |
| 2008/0147821 | A1 | 6/2008 | Dietrich et al. |
| 2008/0183975 | A1 | 7/2008 | Foster et al. |

FOREIGN PATENT DOCUMENTS

| EP | 0249091 A2 | 12/1987 |
| EP | 1818847 A2 | 8/2007 |
| WO | WO2005041045 A2 | 5/2005 |
| WO | WO2007120429 A2 | 10/2007 |
| WO | WO2007120438 A2 | 10/2007 |

(Continued)

OTHER PUBLICATIONS

Rabin, M.O.: "Efficient Dispersal of Information for Security, Load Balancing, and Fault Tolerance"; Journal of the Association for Computing Machinery, ACM, New York, NY US; vol. 36, No. 2, Apr. 1, 1989; pp. 335-348; CP000570108; ISSN: 0004-5411; p. 336: line 9-line 13; p. 336, Line 41-Line 50; p. 340, Line 6-Line 30.

(Continued)

*Primary Examiner* — Carl Colin
*Assistant Examiner* — Dao Ho
(74) *Attorney, Agent, or Firm* — Richard J. Gregson

(57) ABSTRACT

A secure storage appliance is disclosed, along with methods of storing and reading data in a secure storage network. The secure storage appliance is configured to present to a client a virtual disk, the virtual disk mapped to the plurality of physical storage devices. The secure storage appliance is capable of executing program instructions configured to generate a plurality of secondary blocks of data by performing splitting and encrypting operations on a block of data received from the client for storage on the virtual disk and reconstitute the block of data from at least a portion of the plurality of secondary blocks of data stored in shares on corresponding physical storage devices in response to a request from the client.

18 Claims, 27 Drawing Sheets

FOREIGN PATENT DOCUMENTS

WO  WO2008118227 A2  10/2008

OTHER PUBLICATIONS

Robert A. Johnson: "MLS-Net and SecureParser: A New Method for Securing and Segregating Network Data" [Online] Jul. 8, 2007: XP002582437 4th International Symposium on Risk Management and Informatics: WMSI 2007, Orlando Florida, USA.

Sabre A. Schnitzer et al.: "Secured Storage Using SecureParser" [Online] 2005, pp. 135-140, XP002582438; ISBN: 1-59593-233-X workshop on Storage Security and Survivability, Fairfax VA.

* cited by examiner

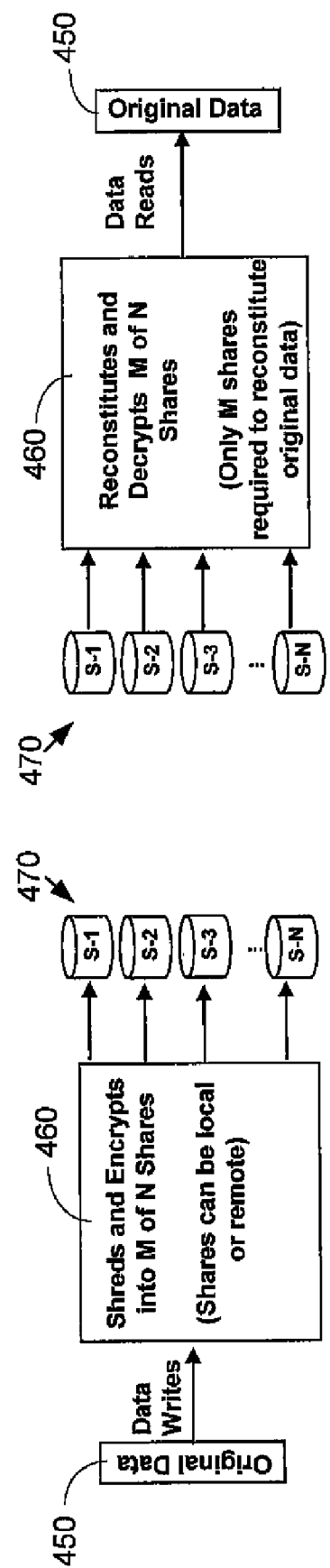

BLOCK-LEVEL DATA STORAGE USING AN OUTSTANDING WRITE LIST

RELATED CASES

The present disclosure claims the benefit of commonly assigned U.S. patent application Ser. No. 12/272,012, entitled "BLOCK LEVEL DATA STORAGE SECURITY SYSTEM", filed 17 Nov. 2008. The present disclosure also claims the benefit of commonly assigned U.S. patent application Ser. No. 12/336,558, entitled "DATA RECOVERY USING ERROR STRIP IDENTIFIERS", filed 17 Dec. 2008.

The present disclosure is related to commonly assigned, and concurrently filed, U.S. patent application Ser. No. 12/336,559 entitled "STORAGE SECURITY USING CRYPTOGRAPHIC SPLITTING", filed 17 Dec. 2008. The present disclosure is also related to commonly assigned, U.S. patent application Ser. No. 12/336,562, entitled "STORAGE SECURITY USING CRYPTOGRAPHIC SPLITTING", filed 17 Dec. 2008. The present disclosure is related to commonly assigned, U.S. patent application Ser. No. 12/336,564, entitled "STORAGE SECURITY USING CRYPTOGRAPHIC SPLITTING", filed 17 Dec. 2008. The present disclosure is related to commonly assigned, U.S. patent application Ser. No. 12/336,568, entitled "STORAGE SECURITY USING CRYPTOGRAPHIC SPLITTING", filed 17 Dec. 2008.

The present disclosure is related to commonly assigned, and concurrently filed, U.S. patent application Ser. No. 12/342,438, entitled "STORAGE AVAILABILITY USING CRYPTOGRAPHIC SPLITTING", filed 23 Dec. 2008. The present disclosure is related to commonly assigned, and concurrently filed, U.S. patent application Ser. No. 12/342,464, entitled "STORAGE AVAILABILITY USING CRYPTOGRAPHIC SPLITTING", filed 23 Dec. 2008.

The present disclosure is related to commonly assigned, and concurrently filed, U.S. patent application Ser. No. 12/342,547, entitled "STORAGE OF CRYPTOGRAPHICALLY-SPLIT DATA BLOCKS AT GEOGRAPHICALLY-SEPARATED LOCATIONS", filed 23 Dec. 2008. The present disclosure is related to commonly assigned, and concurrently filed, U.S. patent application Ser. No. 12/342,523, entitled "RETRIEVAL OF CRYPTOGRAPHICALLY-SPLIT DATA BLOCKS FROM FASTEST-RESPONDING STORAGE DEVICES", filed 23 Dec. 2008.

The present disclosure is related to commonly assigned, and concurrently filed, U.S. patent application Ser. No. 12/342,636, entitled "STORAGE COMMUNITIES OF INTEREST USING CRYPTOGRAPHIC SPLITTING", filed 23 Dec. 2008. The present disclosure is related to commonly assigned, and concurrently filed, U.S. patent application Ser. No. 12/342,575, entitled "STORAGE COMMUNITIES OF INTEREST USING CRYPTOGRAPHIC SPLITTING", filed 23 Dec. 2008. The present disclosure is related to commonly assigned, and concurrently filed, U.S. patent application Ser. No. 12/342,610, entitled "STORAGE COMMUNITIES OF INTEREST USING CRYPTOGRAPHIC SPLITTING", filed 23 Dec. 2008.

The present disclosure is related to commonly assigned, and concurrently filed, U.S. patent application Ser. No. 12/342,379, entitled "SECURE NETWORK ATTACHED STORAGE DEVICE USING CRYPTOGRAPHIC SPLITTING", filed 23 Dec. 2008.

The present disclosure is related to commonly assigned, and concurrently filed, U.S. patent application Ser. No. 12/342,414, entitled "VIRTUAL TAPE BACKUP ARRANGEMENT USING CRYPTOGRAPHICALLY SPLIT STORAGE", filed 23 Dec. 2008.

These related applications are incorporated by reference herein in its entirety as if it is set forth in this application.

TECHNICAL FIELD

The present disclosure relates to data storage systems, and security for such systems. In particular, the present disclosure relates to a block-level data storage security system.

BACKGROUND

Modern organizations generate and store large quantities of data. In many instances, organizations store much of their important data at a centralized data storage system. It is frequently important that such organizations be able to quickly access the data stored at the data storage system. In addition, it is frequently important that data stored at the data storage system be recoverable if the data is written to the data storage system incorrectly or if portions of the data stored at the repository is corrupted. Furthermore, it is important that data be able to be backed up to provide security in the event of device failure or other catastrophic event.

The large scale data centers managed by such organizations typically require mass data storage structures and storage area networks capable of providing both long-term mass data storage and access capabilities for application servers using that data. Some data security measures are usually implemented in such large data storage networks, and are intended to ensure proper data privacy and prevent data corruption. Typically, data security is accomplished via encryption of data and/or access control to a network within which the data is stored. Data can be stored in one or more locations, e.g. using a redundant array of inexpensive disks (RAID) or other techniques.

Mass data storage system 10, illustrated in FIG. 1, is an example of an existing mass data storage system. As shown, an application server 12 (e.g. a database or file system provider) connects to a number of storage devices $14_1$-$14_N$ providing mass storage of data to be maintained accessible to the application server via direct connection 15, an IP-based network 16, and a Storage Area Network 18. Each of the storage devices 14 can host disks 20 of various types and configurations useable to store this data.

The physical disks 20 are made visible/accessible to the application server 12 by mapping those disks to addressable ports using, for example, logical unit numbering (LUN), internet SCSI (iSCSI), or common internet file system (CIFS) connection schemes. In the configuration shown, five disks are made available to the application server 12, bearing assigned letters I-M. Each of the assigned drive letters corresponds to a different physical disk 20 (or at least a different portion of a physical disk) connected to a storage device 14, and has a dedicated addressable port through which that disk 20 is accessible for storage and retrieval of data. Therefore, the application server 12 directly addresses data stored on the physical disks 20.

A second typical data storage arrangement 30 is shown in FIG. 2. The arrangement 30 illustrates a typical data backup configuration useable to tape-backup files stored in a data network. The network 30 includes an application server 32, which makes a snapshot of data 34 to send to a backup server 36. The backup server 36 stores the snapshot, and operates a tape management system 38 to record that snapshot to a magnetic tape 40 or other long-term storage device.

These data storage arrangements have a number of disadvantages. For example, in the network 10, a number of data access vulnerabilities exist. An unauthorized user can steal a physical disk 20, and thereby obtain access to sensitive files stored on that disk. Or, the unauthorized user can exploit network vulnerabilities to observe data stored on disks 20 by monitoring the data passing in any of the networks 15, 16, 18 between an authorized application server 12 or other authorized user and the physical disk 20. The network 10 also has inherent data loss risks. In the network 30, physical data storage can be time consuming, and physical backup tapes can be subject to failure, damage, or theft.

To overcome some of these disadvantages, systems have been introduced which duplicate and/or separate files and directories for storage across one or more physical disks. The files and directories are typically stored or backed up as a monolith, meaning that the files are logically grouped with other like data before being secured. Although this provides a convenient arrangement for retrieval, in that a common security construct (e.g. an encryption key or password) is related to all of the data, it also provides additional risk exposure if the data is compromised.

For these and other reasons, improvements are desirable.

SUMMARY

In accordance with the following disclosure, the above and other problems are solved by the following:

In a first aspect, a method for securely writing and reading data, the method comprising receiving, at a secure storage appliance, a primary read request for a primary data block at a primary storage location of a volume provided by the secure storage appliance. The method also comprises in response to receiving the primary read request, determining, at the secure storage appliance, whether the primary storage location is locked. Furthermore, the method comprises when the primary storage location is locked, retrieving the primary data block from an outstanding write list that stores primary write requests that could not be completed when the primary write requests were received by the secure storage appliance. In addition, the method comprises when the primary storage location is not locked, sending, from the secure storage appliance to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than N. Furthermore, when the primary storage location is not locked, receiving, at the secure storage appliance, secondary read responses sent by the storage devices, the secondary read responses containing the secondary data blocks. In addition, when the primary storage location is not locked, reconstructing, at the secure storage appliance, the primary data block using the secondary data blocks contained in the secondary read responses. The method also comprises sending, from the secure storage appliance, a primary read response that is responsive to the primary read request, the primary read response containing the primary data block.

In a second aspect, an electronic computing device comprises a processing unit, a primary interface, a secondary interface, and a system memory comprising instructions. When executed by the processing unit, the instructions cause the processing unit to receive a primary read request for a primary data block at a primary storage location of a volume provided by the electronic computing device. The instructions also cause the processing unit to, in response to receiving the primary read request, determine whether the primary storage location is locked. In addition, the instructions cause the processing unit to, when the primary storage location is locked, retrieve the primary data block from an outstanding write list that stores primary write requests that could not be completed when the primary write requests were received by the secure storage appliance. When the primary storage location is not locked, the instructions cause the processing unit to send, to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than N. In addition, when the primary storage location is not locked, the instructions cause the processing unit to receive secondary read responses sent by the storage devices, the secondary read responses containing the secondary data blocks. When the primary storage location is not locked, the instructions cause the processing unit to reconstruct the primary data block using the secondary data blocks contained in the secondary read responses. In addition, the instructions cause the processing unit to send a primary read response that is responsive to the primary read request, the primary read response containing the primary data block.

In a third aspect, a computer-readable storage medium comprises instructions that, when executed at an electronic computing device, cause the electronic computing device to receive a primary write request to store a primary data block at a primary storage location. The instructions also cause the electronic computing device to, in response to receiving the primary write request, determine whether the primary storage location is locked. In response to determining that the primary storage location is locked, the instructions cause the electronic computing device to write the primary write request to an outstanding write list. In response to determining that the primary storage location is not locked, the instructions cause the electronic computing device to determine whether the primary write request can be completed. Furthermore, when it is determined that the primary write request cannot be completed, the instructions cause the processing unit to lock the primary storage location and write the primary write request to the outstanding write list. When it is determined that the primary write request can be completed, the instructions cause the processing unit to cryptographically split the primary data block into the secondary data blocks. Furthermore, when it is determined that the primary write request can be completed, the instructions cause the processing unit to send, to the storage devices, secondary write requests to write the secondary data blocks. The instructions also cause the processing unit to receive a primary read request for the primary data block at the primary storage location of a volume provided by the electronic computing device. Furthermore, instructions cause the processing unit to, in response to receiving the primary read request, determine whether the primary storage location is locked. When the primary storage location is locked, the instructions cause the processing unit to retrieve the primary data block from an outstanding write list that stores primary write requests that could not be completed at the time when the primary write requests were received by the secure storage appliance. When the primary storage location is not locked, the instructions cause the processing unit to send, to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than N. Furthermore, when the primary storage location is not locked, the instructions cause the processing unit to receive secondary read responses sent by the storage devices, the secondary read responses containing the secondary data blocks. In addition, when the primary storage location is not locked, the instructions cause the processing unit to reconstruct the primary data block using the secondary data blocks contained in the secondary read responses. Furthermore, the instructions cause the processing unit to send a primary read response that is responsive to the primary read request, the primary read response containing the primary data block.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 illustrates dataflow of a write operation according to a possible embodiment of the present disclosure.

FIG. 9 illustrates dataflow of a read operation according to a possible embodiment of the present disclosure.

DETAILED DESCRIPTION

Figure 1:
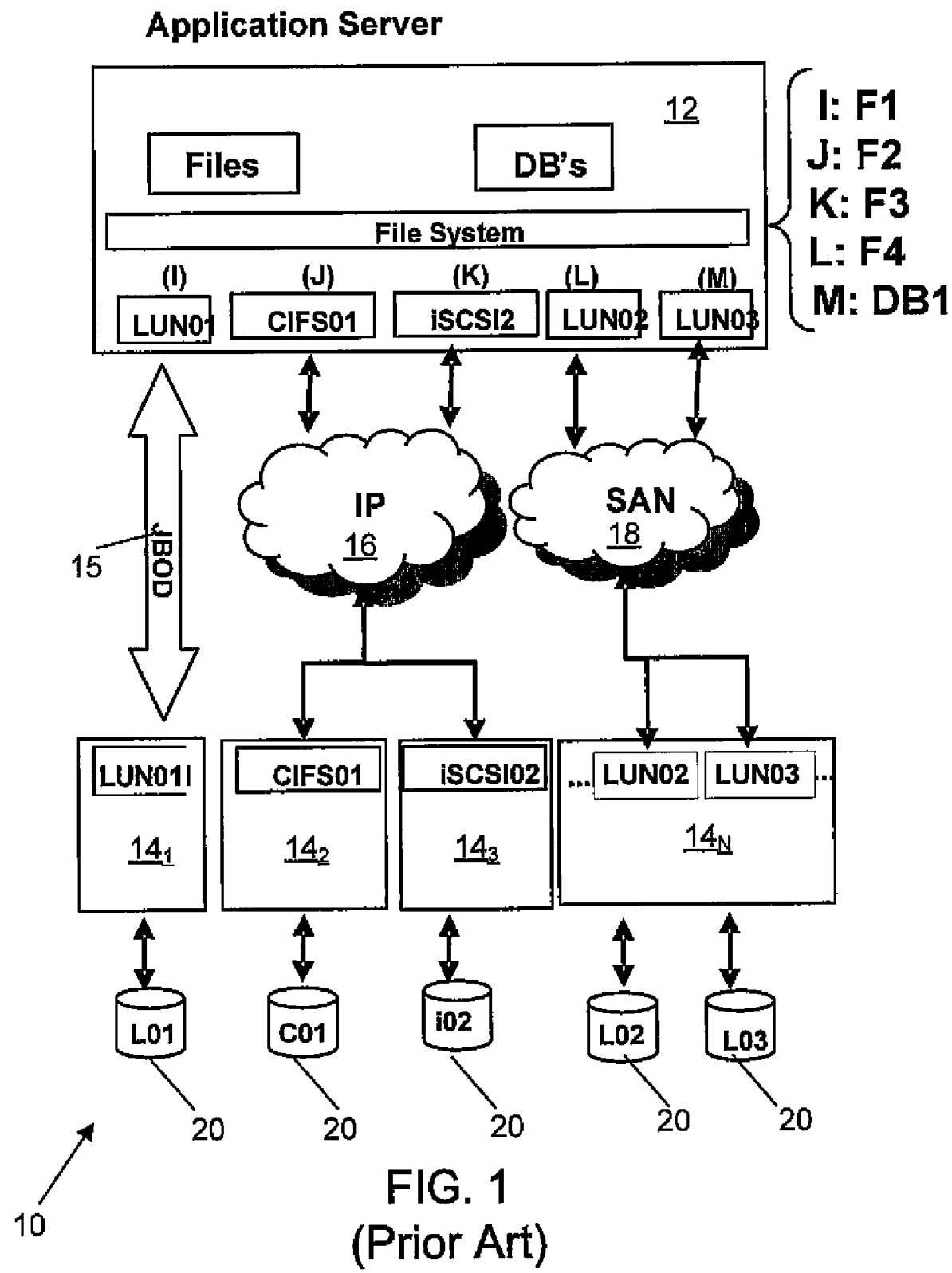
FIG. 1 illustrates an example prior art network providing data storage.
Figure 2:
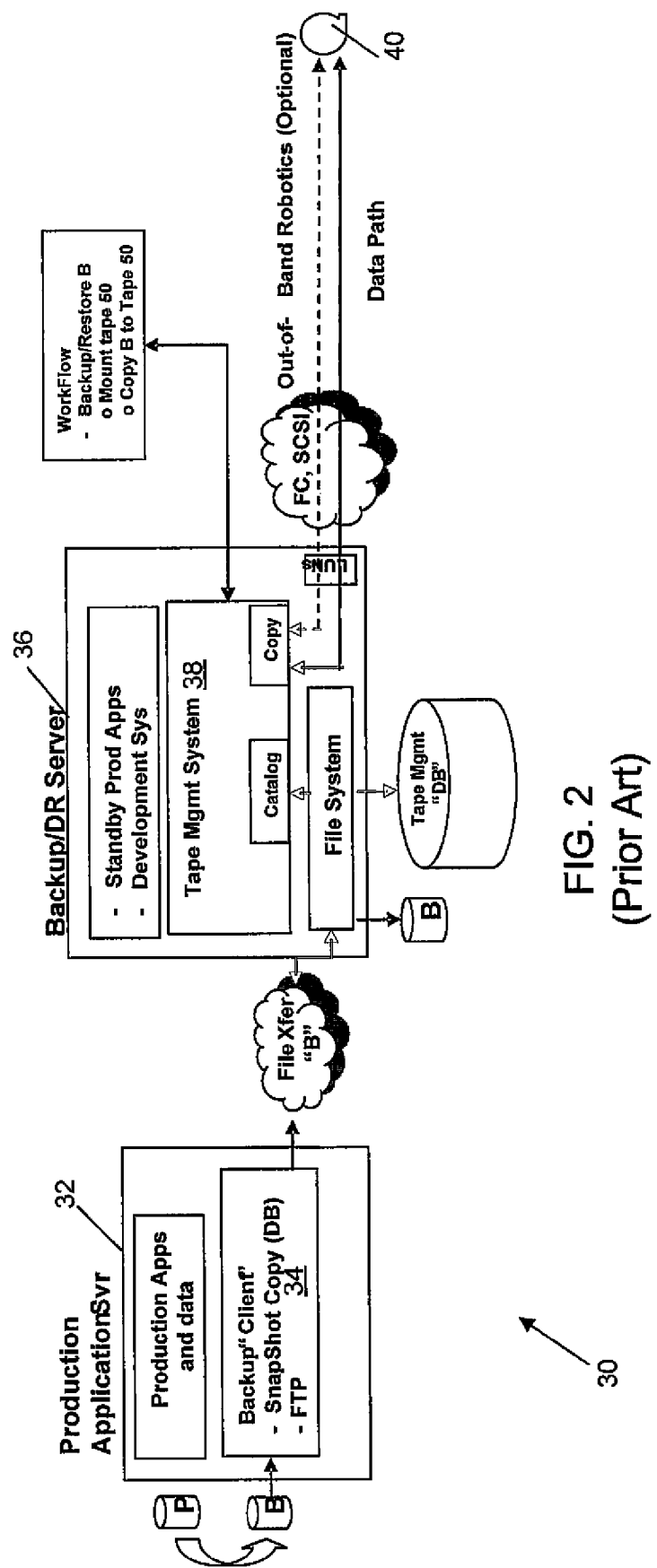
FIG. 2 illustrates an example prior art network providing data backup capabilities.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to a block-level data storage security system. By block-level, it is intended that the data storage and security performed according to the present disclosure is not performed based on the size or arrangement of logical files (e.g. on a per-file or per-directory level), but rather that the data security is based on individual read and write operations related to physical blocks of data. In various embodiments of the present disclosure, the data managed by the read and write operations are split or grouped on a bitwise or other physical storage level. These physical storage portions of files can be stored in a number of separated components and encrypted. The split, encrypted data improves data security for the data "at rest" on the physical disks, regardless of the access vulnerabilities of physical disks storing the data. This is at least in part because the data cannot be recognizably reconstituted without having appropriate access and decryption rights to multiple, distributed disks. The access rights limitations provided by such a system also makes deletion of data simple, in that deletion of access rights (e.g. encryption keys) provides for effective deletion of all data related to those rights.

The various embodiments of the present disclosure are applicable across a number of possible networks and network configurations; in certain embodiments, the block-level data storage security system can be implemented within a storage area network (SAN) or Network-Attached Storage (NAS). Other possible networks in which such systems can be implemented exist as well.

Figure 3:
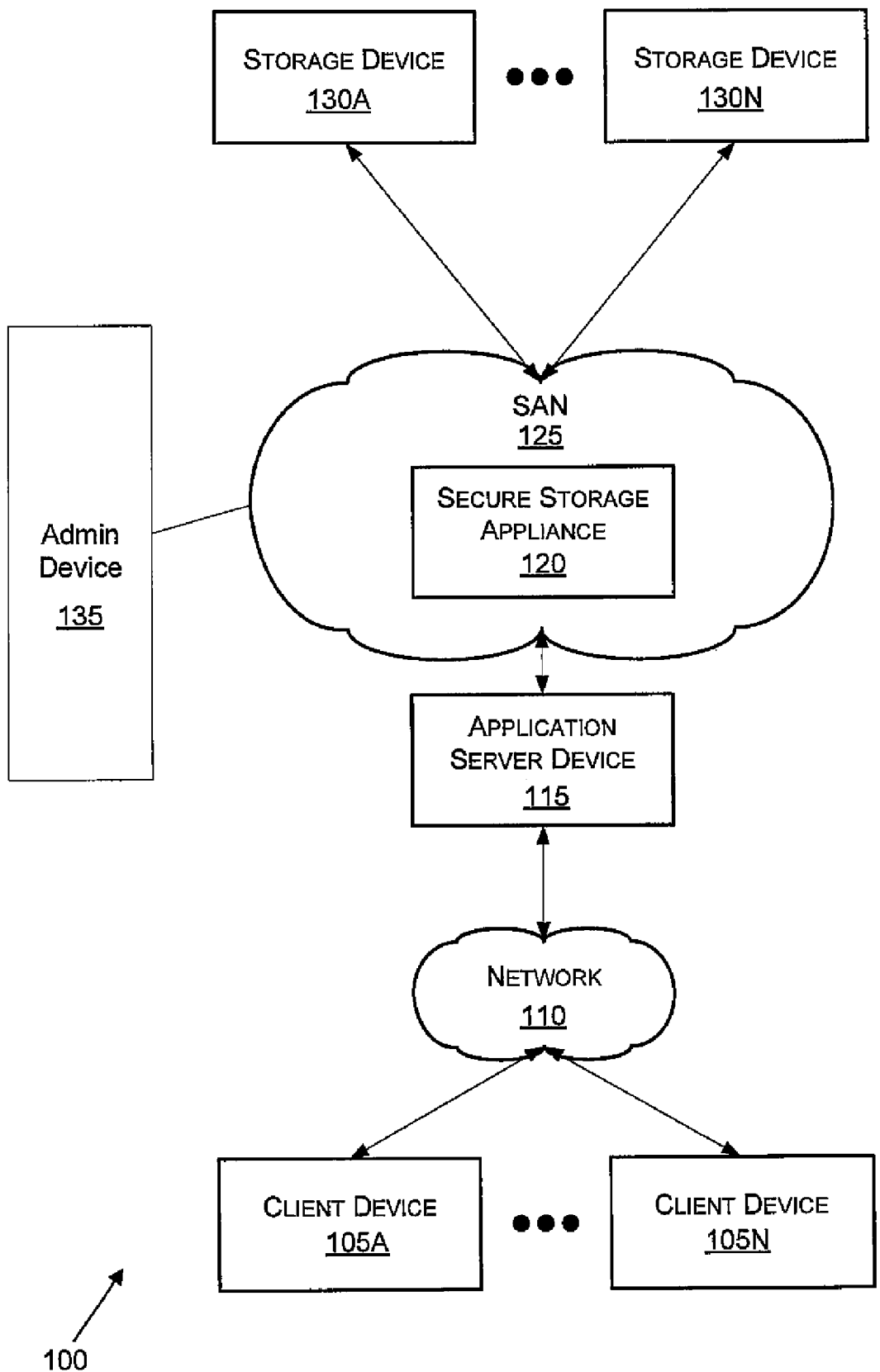
FIG. 3 illustrates a data storage system according to a possible embodiment of the present disclosure.

Referring now to FIG. 3, a block diagram illustrating an example data storage system 100 is shown, according to the principles of the present disclosure. In the example of FIG. 3, system 100 includes a set of client devices 105A through 105N (collectively, "client devices 105"). Client devices 105 can be a wide variety of different types of devices. For example, client devices 105 can be personal computers, laptop computers, network telephones, mobile telephones, television set top boxes, network televisions, video gaming consoles, web kiosks, devices integrated into vehicles, mainframe computers, personal media players, intermediate network devices, network appliances, and other types of computing devices. Client devices 105 may or may not be used directly by human users.

Client devices 105 are connected to a network 110. Network 110 facilitates communication among electronic devices connected to network 110. Network 110 can be a wide variety of electronic communication networks. For example, network 110 can be a local-area network, a wide-area network (e.g., the Internet), an extranet, or another type of communication network. Network 110 can include a variety of connections, including wired and wireless connections. A variety of communications protocols can be used on network 110 including Ethernet, WiFi, WiMax, Transfer Control Protocol, and many other communications protocols.

In addition, system 100 includes an application server 115. Application server 115 is connected to the network 110, which is able to facilitate communication between the client devices 105 and the application server 115. The application server 115 provides a service to the client devices 105 via network 110. For example, the application server 115 can provide a web application to the client devices 105. In another example, the application server 115 can provide a network-attached storage server to the client devices 105. In another example, the application server 115 can provide a database access service to the client devices 105. Other possibilities exist as well.

The application server 115 can be implemented in several ways. For example, the application server 115 can be implemented as a standalone server device, as a server blade, as an intermediate network device, as a mainframe computing device, as a network appliance, or as another type of computing device. Furthermore, it should be appreciated that the application server 115 can include a plurality of separate computing devices that operate like one computing device. For instance, the application server 115 can include an array of server blades, a network data center, or another set of separate computing devices that operate as if one computing device. In certain instances, the application server can be a virtualized application server associated with a particular group of users, as described in greater detail below in FIG. 18.

The application server 115 is communicatively connected to a secure storage appliance 120 that is integrated in a storage area network (SAN) 125. Further, the secure storage appliance 120 is communicatively connected to a plurality of storage devices 130A through 130N (collectively, "storage devices 130"). Similar to the secure storage appliance 120, the storage devices 130 can be integrated with the SAN 125.

The secure storage appliance 120 can be implemented in several ways. For example, the secure storage appliance 120 can be implemented as a standalone server device, as a server blade, as an intermediate network device, as a mainframe computing device, as a network appliance, or as another type of computing device. Furthermore, it should be appreciated that, like the application server 115, the secure storage appliance 120 can include a plurality of separate computing devices that operate like one computing device. In certain embodiments, SAN 125 may include a plurality of secure storage appliances. Each of secure storage appliances 214 is communicatively connected to a plurality of the storage devices 130. In addition, it should be appreciated that the secure storage appliance 120 can be implemented on the same physical computing device as the application server 115.

The application server 115 can be communicatively connected to the secure storage appliance 120 in a variety of ways. For example, the application server 115 can be communicatively connected to the secure storage appliance 120 such that the application server 115 explicitly sends I/O commands to secure storage appliance 120. In another example, the application server 115 can be communicatively connected to secure storage appliance 120 such that the secure storage appliance 120 transparently intercepts I/O commands sent by the application server 115. On a physical level, the application server 115 and the secure storage appliance 120 can be connected via a communication interface that can support a SCSI command set. Examples of such interfaces include Fibre Channel and iSCSI interfaces.

The storage devices 130 can be implemented in a variety of different ways as well. For example, one or more of the storage devices 130 can be implemented as disk arrays, tape drives, JBODs ("just a bunch of disks"), or other types of electronic data storage devices.

In various embodiments, the SAN 125 is implemented in a variety of ways. For example, the SAN 125 can be a local-area network, a wide-area network (e.g., the Internet), an extranet, or another type of electronic communication network. The SAN 125 can include a variety of connections, including wired and wireless connections. A variety of communications protocols can be used on the SAN 125 including Ethernet, WiFi, WiMax, Transfer Control Protocol, and many other communications protocols. In certain embodiments, the SAN 125 is a high-bandwidth data network provided using, at least in part, an optical communication network employing Fibre Channel connections and Fibre Channel Protocol (FCP) data communications protocol between ports of data storage computing systems.

The SAN 125 additionally includes an administrator device 135. The administrator device 135 is communicatively connected to the secure storage appliance 120 and optionally to the storage devices 130. The administrator device 135 facilitates administrative management of the secure storage appliance 120 and to storage devices. For example, the administrator device 135 can provide an application that can transfer configuration information to the secure storage appliance 120 and the storage devices 130. In another example, the administrator device 135 can provide a directory service used to store information about the SAN 125 resources and also centralize the SAN 125.

In various embodiments, the administrator device 135 can be implemented in several ways. For example, the administrator device 135 can be implemented as a standalone computing device such as a PC or a laptop, or as another type of computing device. Furthermore, it should be appreciated that, like the secure storage appliance 120, the administrator device 135 can include a plurality of separate computing devices that operate as one computing device.

Figure 4:
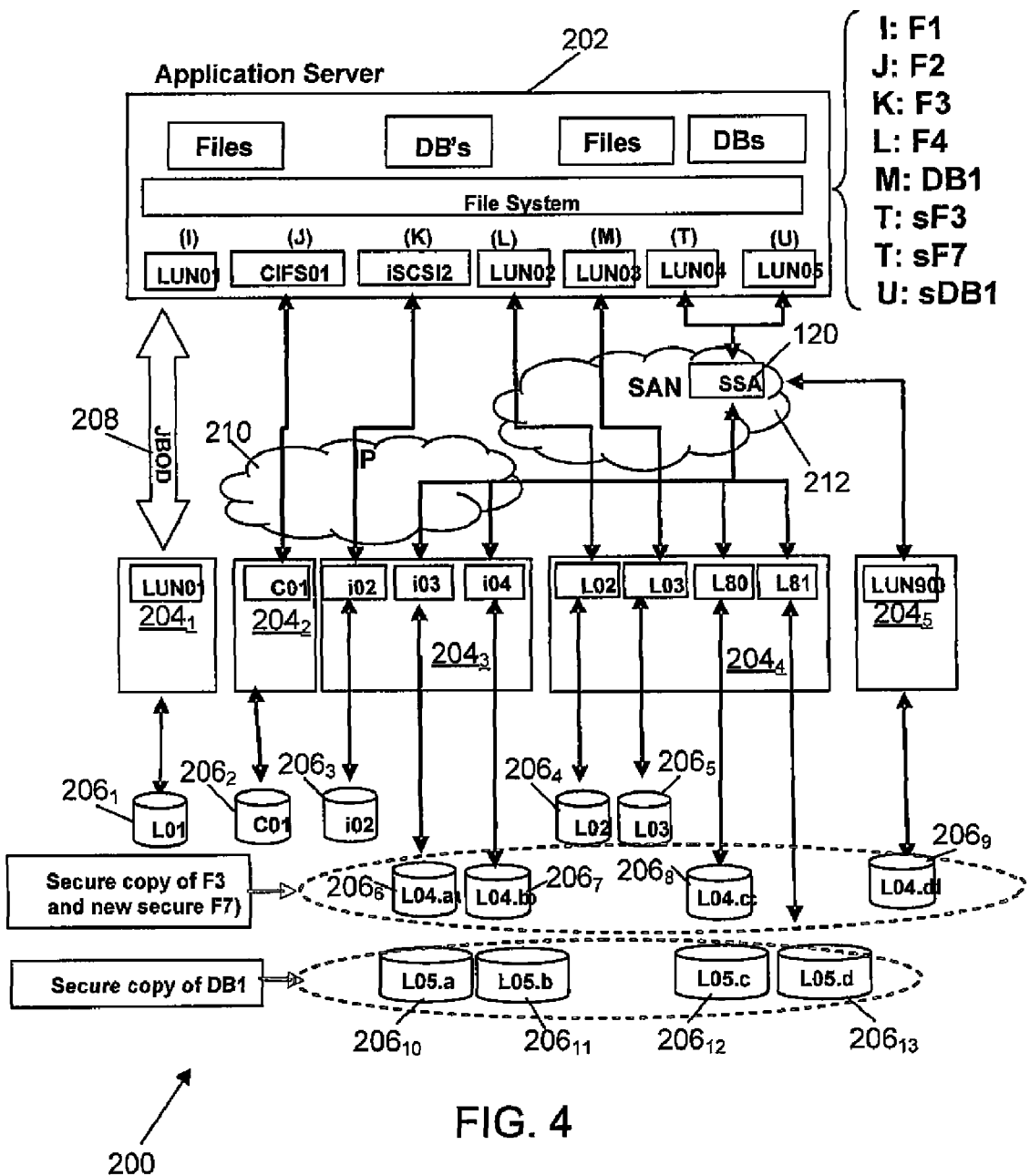
FIG. 4 illustrates a data storage system according to a further possible embodiment of the present disclosure.

Now referring to FIG. 4, a data storage system 200 is shown according to a possible embodiment of the present disclosure. The data storage system 200 provides additional security by way of introduction of a secure storage appliance and related infrastructure/functionality into the data storage system 200, as described in the generalized example of FIG. 3.

In the embodiment shown, the data storage system 200 includes an application server 202, upon which a number of files and databases are stored. The application server 202 is generally one or more computing devices capable of connecting to a communication network and providing data and/or application services to one or more users (e.g. in a client-server, thin client, or local account model). The application server 202 is connected to a plurality of storage systems 204. In the embodiment shown, storage systems $204_{1-5}$ are shown, and are illustrated as a variety of types of systems including direct local storage, as well as hosted remote storage. Each storage system 204 manages storage on one or more physical storage devices 206. The physical storage devices 206 generally correspond to hard disks or other long-term data storage devices. In the specific embodiment shown, the JBOD storage system $204_1$ connects to physical storage devices $206_1$, the NAS storage system $204_2$ connects to physical storage device $206_2$, the JBOD storage system $204_3$ connects to physical storage devices $206_{3-7}$, the storage system $204_4$ connects to physical storage devices $206_{8-12}$, and the JBOD storage system $204_5$ connects to physical storage device $206_{13}$. Other arrangements are possible as well, and are in general a matter of design choice.

In the embodiment shown, a plurality of different networks and communicative connections reside between the application server 202 and the storage systems 204. For example, the application server 202 is directly connected to storage system $204_1$ via a JBOD connection 208, e.g. for local storage. The application server 202 is also communicatively connected to storage systems $204_{2-3}$ via network 210, which uses any of a number of IP-based protocols such as Ethernet, WiFi, WiMax, Transfer Control Protocol, or any other of a number of communications protocols. The application server 202 also connects to storage systems $204_{4-5}$ via a storage area network (SAN) 212, which can be any of a number of types of SAN networks described in conjunction with SAN 125, above.

A secure storage appliance 120 is connected between the application server 202 and a plurality of the storage systems 204. The secure storage appliance 120 can connect to dedicated storage systems (e.g. the JBOD storage system $204_5$ in FIG. 4), or to storage systems connected both directly through the SAN 212, and via the secure storage appliance 120 (e.g. the JBOD storage system $204_3$ and storage system $204_4$). Additionally, the secure storage appliance 120 can connect to systems connected via the network 210 (e.g. the JBOD system $204_3$). Other arrangements are possible as well. In instances where the secure storage appliance 120 is connected to a storage system 204, one or more of the physical storage devices 206 managed by the corresponding system is secured by way of data processing by the secure storage appliance. In the embodiment shown, the physical storage devices $206_{3-7}$, $206_{10-13}$ are secured physical storage devices, meaning that these devices contain data managed by the secure storage appliance 120, as explained in further detail below.

Generally, inclusion of the secure storage appliance 120 within the data storage system 200 may provide improved data security for data stored on the physical storage devices. As is explained below, this can be accomplished, for example, by cryptographically splitting the data to be stored on the physical devices, such that generally each device contains only a portion of the data required to reconstruct the originally stored data, and that portion of the data is a block-level portion of the data encrypted to prevent reconstitution by unauthorized users.

Through use of the secure storage appliance 120 within the data storage system 200, a plurality of physical storage devices 208 can be mapped to a single volume, and that volume can be presented as a virtual disk for use by one or more groups of users. In comparing the example data storage system 200 to the prior art system shown in FIG. 1, it can be seen that the secure storage appliance 120 allows a user to have an arrangement other than one-to-one correspondence between drive volume letters (in FIG. 1, drive letters I-M) and physical storage devices. In the embodiment shown, two additional volumes are exposed to the application server 202, virtual disk drives T and U, in which secure copies of data can be stored. Virtual disk having volume label T is illustrated as containing secured volumes F3 and F7 (i.e. the drives mapped to the iSCS12 port of the application server 202, as well as a new drive), thereby providing a secured copy of information on either of those drives for access by a group of users. Virtual disk having volume label U provides a secured copy of the data held in DB1 (i.e. the drive mapped to LUN03). By distributing volumes across multiple disks, security is enhanced because copying or stealing data from a single physical disk will generally be insufficient to access that data (i.e. multiple disks of data, as well as separately-held encryption keys, must be acquired)

Figure 5:
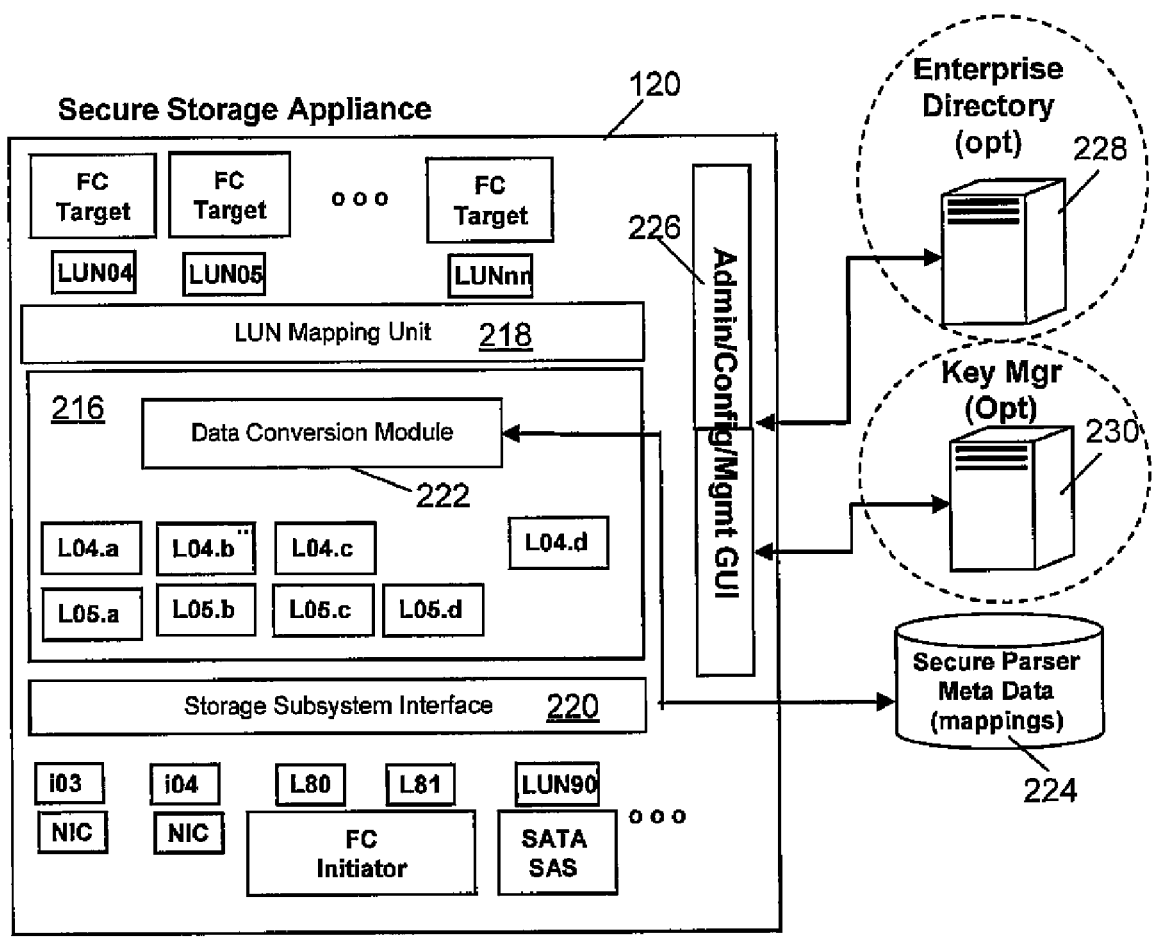
FIG. 5 illustrates a portion of a data storage system including a secure storage appliance, according to a possible embodiment of the present disclosure.

Referring now to FIG. 5, a portion of the data storage system 200 is shown, including details of the secure storage appliance 120. In the embodiment shown, the secure storage appliance 120 includes a number of functional modules that generally allow the secure storage appliance to map a number of physical disks to one or more separate, accessible volumes that can be made available to a client, and presenting a virtual disk to clients based on those defined volumes. Transparently to the user, the secure storage appliance applies a number of techniques to stored and retrieved data to provide data security.

In the embodiment shown, the secure storage appliance 120 includes a core functional unit 216, a LUN mapping unit 218, and a storage subsystem interface 220. The core functional unit 216 includes a data conversion module 222 that operates on data written to physical storage devices 206 and retrieved from the physical storage devices 206. In general, when the data conversion module 222 receives a logical unit of data (e.g. a file or directory) to be written to physical storage devices 206, it splits that primary data block at a physical level (i.e. a "block level") and encrypts the secondary data blocks using a number of encryption keys.

The manner of splitting the primary data block, and the number of physical blocks produced, is dictated by additional control logic within the core functional unit 216. As described in further detail below, during a write operation that writes a primary data block to physical storage (e.g. from an application server 202), the core functional unit 216 directs the data conversion module 222 to split the primary data block received from the application server 202 into N separate secondary data blocks. Each of the N secondary data blocks is intended to be written to a different physical storage device 206 within the data storage system 200. The core functional unit 216 also dictates to the data conversion module 222 the number of shares (for example, denoted as M of the N total shares) that are required to reconstitute the primary data block when requested by the application server 202.

The secure storage appliance 120 connects to a metadata store 224, which is configured to hold metadata information about the locations, redundancy, and encryption of the data stored on the physical storage devices 206. The metadata store 224 is generally held locally or in proximity to the secure storage appliance 120, to ensure fast access of metadata regarding the shares. The metadata store 224 can be, in various embodiments, a database or file system storage of data describing the data connections, locations, and shares used by the secure storage appliance. Additional details regarding the specific metadata stored in the metadata store 224 are described below.

The LUN mapping unit 218 generally provides a mapping of one or more physical storage devices 206 to a volume. Each volume corresponds to a specific collection of physical storage devices 206 upon which the data received from client devices is stored. In contrast, typical prior art systems assign a LUN (logical unit number) or other identifier to each physical storage device or connection port to such a device, such that data read operations and data write operations directed to a storage system 204 can be performed specific to a device associated with the system. In the embodiment shown, the LUNs correspond to target addressable locations on the secure storage appliance 120, of which one or more is exposed to a client device, such as an application server 202. Based on the mapping of LUNs to a volume, the virtual disk related to that volume appears as a directly-addressable component of the data storage system 200, having its own LUN. From the perspective of the application server 202, this obscures the fact that primary data blocks written to a volume can in fact be split, encrypted, and written to a plurality of physical storage devices across one or more storage systems 204.

The storage subsystem interface 220 routes data from the core functional unit 216 to the storage systems 204 communicatively connected to the secure storage appliance 120. The storage subsystem interface 220 allows addressing various types of storage systems 204. Other functionality can be included as well.

In the embodiment shown, a plurality of LUNs are made available by the LUN mapping unit 218, for addressing by client devices. As shown by way of example, LUNs LUN04-LUNnn are illustrated as being addressable by client devices. Within the core functional unit 216, the data conversion module 222 associates data written to each LUN with a share of that data, split into N shares and encrypted. In the embodiment shown in the example of FIG. 5, a block read operation or block write operation to LUN04 is illustrated as being associated with a four-way write, in which secondary data blocks L04.a through L04.d are created, and mapped to various devices connected to output ports, shown in FIG. 5 as network interface cards (NICs), a Fibre Channel interface, and a serial ATA interface. An analogous operation is also shown with respect to LUN05, but written to a different combination of shares and corresponding physical disks.

The core functional unit 216, LUN mapping unit 218, and storage subsystem interface 220 can include additional functionality as well, for managing timing and efficiency of data read and write operations. Additional details regarding this functionality are described in another embodiment, detailed below in conjunction with the secure storage appliance functionality described in FIG. 6.

The secure storage appliance 120 includes an administration interface 226 that allows an administrator to set up components of the secure storage appliance 120 and to otherwise manage data encryption, splitting, and redundancy. The administration interface 226 handles initialization and discovery on the secure storage appliance, as well as creation, modifying, and deletion of individual volumes and virtual disks; event handling; data base administration; and other system services (such as logging). Additional details regarding usage of the administration interface 226 are described below in conjunction with FIG. 14.

In the embodiment shown of the secure storage appliance 120, the secure storage appliance 120 connects to an optional enterprise directory 228 and a key manager 230 via the administration interface 226. The enterprise directory 228 is generally a central repository for information about the state of the secure storage appliance 120, and can be used to help coordinate use of multiple secure storage appliances in a network, as illustrated in the configuration shown in FIG. 10, below. The enterprise directory 228 can store, in various embodiments, information including a remote user table, a virtual disk table, a metadata table, a device table, log and audit files, administrator accounts, and other secure storage appliance status information.

In embodiments lacking the enterprise directory 228, redundant secure storage appliances 214 can manage and prevent failures by storing status information of other secure storage appliances, to ensure that each appliance is aware of the current state of the other appliances.

The key manager 230 stores and manages certain keys used by the data storage system 200 for encrypting data specific to various physical storage locations and various individuals and groups accessing those devices. In certain embodiments, the key manager 230 stores workgroup keys. Each workgroup key relates to a specific community of individuals (i.e. a "community of interest") and a specific volume, thereby defining a virtual disk for that community. The key manager 230 can also store local copies of session keys for access by the secure storage appliance 120. Secure storage appliance 120 uses each of the session keys to locally encrypt data on different ones of physical storage devices 206. Passwords can be stored at the key manager 230 as well. In certain embodiments, the key manager 230 is operable on a computing system configured to execute any of a number of key management software packages, such as the Key Management Service provided for a Windows Server environment, manufactured by Microsoft Corp. of Redmond, Wash.

Although the present disclosure provides for encryption keys including session keys and workgroup keys, additional keys may be used as well, such as a disk signature key, security group key, client key, or other types of keys. Each of these keys can be stored on one or more of physical storage devices 206, at the secure storage appliance 120, or in the key manager 230.

Although FIGS. 4-5 illustrate a particular arrangement of a data storage system 200 for secure storage of data, additional arrangements are possible as well that can operate consistently with the concepts of the present disclosure. For example, in certain embodiments, the system can include a different number or type of storage systems or physical storage devices, and can include one or more different types of client systems in place of or in addition to the application server 202. Furthermore, the secure storage appliance 120 can be placed in any of a number of different types of networks, but does not require the presence of multiple types of networks as illustrated in the example of FIG. 4.

Figure 6:
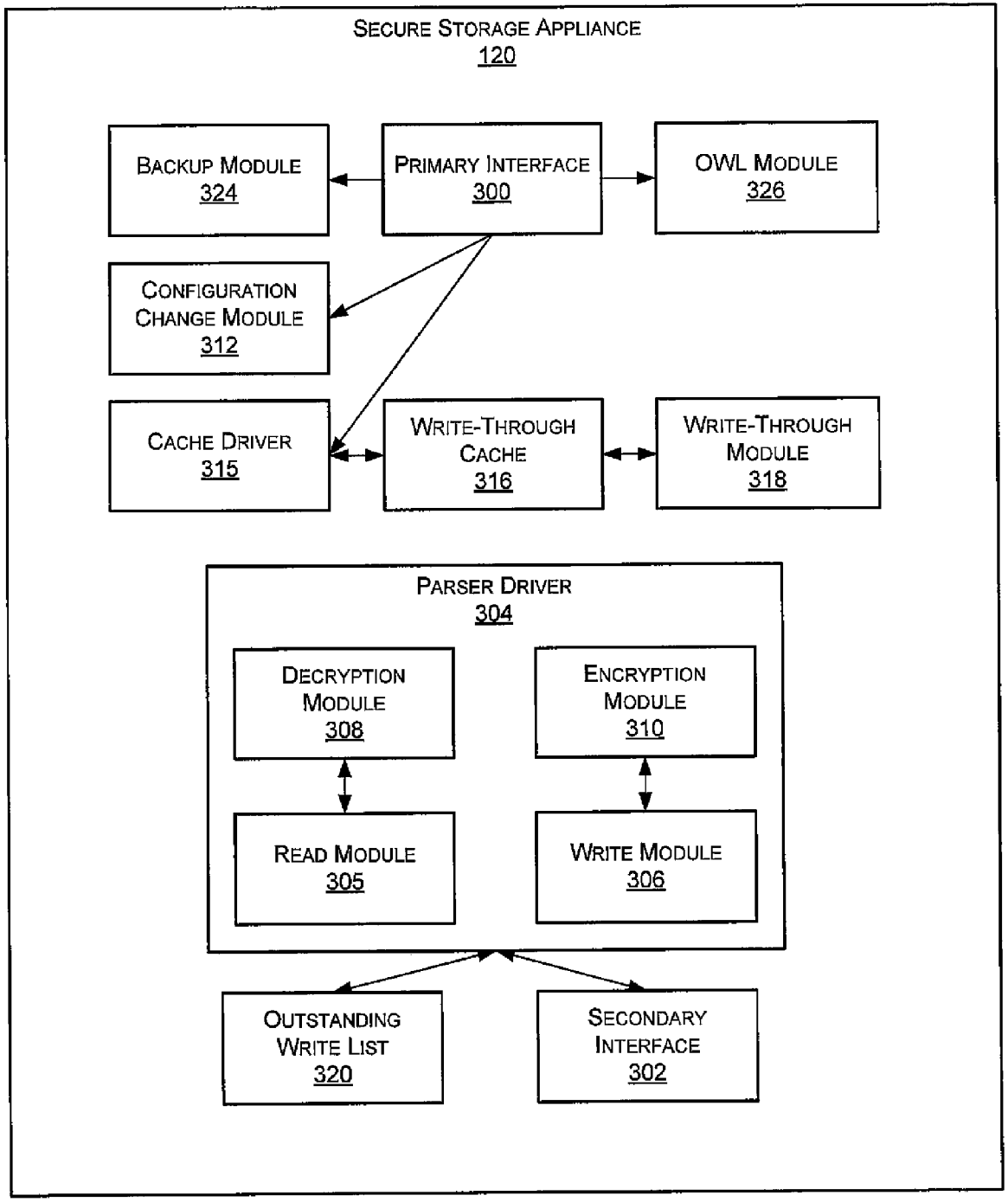
FIG. 6 illustrates a block diagram of logical components of a secure storage appliance, according to a possible embodiment of the present disclosure.

FIG. 6 is a block diagram that illustrates example logical components of the secure storage appliance 120. FIG. 6 represents only one example of the logical components of the secure storage appliance 120, for performing the operations described herein. The operations of the secure storage appliance 120 can be conceptualized and implemented in many different ways.

As illustrated in the example of FIG. 6, the secure storage appliance 120 comprises a primary interface 300 and a secondary interface 302. The primary interface 300 enables secure storage appliance 120 to receive primary I/O requests and to send primary I/O responses. For instance, the primary interface 300 can enable secure storage appliance 120 to receive primary I/O requests (e.g. read and write requests) from the application server device 202 and to send primary I/O responses to the application server 202. Secondary interface enables the secure storage appliance 120 to send secondary I/O requests to the storage systems 204, and to receive secondary I/O responses from those storage systems 204.

In addition, the secure storage appliance 120 comprises a parser driver 304. The parser driver 304 generally corresponds to the data conversion module 222 of FIG. 5, in that it processes primary I/O requests to generate secondary I/O requests and processes secondary I/O responses to generate primary I/O responses. To accomplish this, the parser driver 304 comprises a read module 305 that processes primary read requests to generate secondary read requests and processes secondary read responses to generate primary read responses. In addition, the parser driver 304 comprises a decryption module 308 that enables the read module 305 to reconstruct a primary data block using secondary blocks contained in secondary read responses. Example operations performed by the read module 305 are described below with reference to FIG. 18 and FIG. 21. Furthermore, the parser driver 304 comprises a write module 306 that processes primary write requests to generate secondary write requests and processes secondary write responses to generate primary write responses. The parser driver 304 also comprises an encryption module 310 that enables the write module 306 to cryptographically split primary data blocks in primary write requests into secondary data blocks to put in secondary write requests. An example operation performed by the write module 306 is described below as well with reference to FIGS. 19 and 23.

In the example of FIG. 6, the secure storage appliance 120 also comprises a cache driver 315. When enabled, the cache driver 315 receives primary I/O requests received by the primary interface 300 before the primary I/O requests are received by parser driver 304. When the cache driver 315 receives a primary read request to read data at a primary storage location of a virtual disk, the cache driver 315 determines whether a write-through cache 316 at the secure storage appliance 120 contains a primary write request to write a primary data block to the primary storage location of the virtual disk. If the cache driver 315 determines that the write-through cache 316 contains a primary write request to write a primary data block to the primary storage location of the virtual disk, the cache driver 315 outputs a primary read response that contains the primary data block. When the parser driver 304 receives a primary write request to write a primary data block to a primary storage location of a virtual disk, the cache driver 315 caches the primary write request in the write-through cache 316. A write-through module 318 performs write operations to memory from the write-through cache 316.

The secure storage appliance 120 also includes an outstanding write list (OWL) module 326. When enabled, the OWL module 326 receives primary I/O requests from the primary interface 300 before the primary I/O requests are received by the parser driver 304. The OWL module 326 uses an outstanding write list 320 to process the primary I/O requests.

In addition, the secure storage appliance 120 comprises a backup module 324. The backup module 324 performs an operation that backs up data at the storage systems 204 to backup devices, as described below in conjunction with FIGS. 17-18.

The secure storage appliance 120 also comprises a configuration change module 312. The configuration change module 312 performs an operation that creates or destroys a volume, and sets its redundancy configuration. Example redundancy configurations (i.e. "M of N" configurations) are described throughout the present disclosure, and refer to the number of shares formed from a block of data, and the number of those shares required to reconstitute the block of data. Further discussion is provided with respect to possible redundancy configurations below, in conjunction with FIGS. 8-9.

It should be appreciated that many alternate implementations of the secure storage appliance 120 are possible. For example, a first alternate implementation of the secure storage appliance 120 can include the OWL module 326, but not the cache driver 315, or vice versa. In other examples, the secure storage appliance 120 might not include the backup module 324 or the configuration change module 312. Furthermore, there can be many alternate operations performed by the various modules of the secure storage appliance 120.

Figure 7:
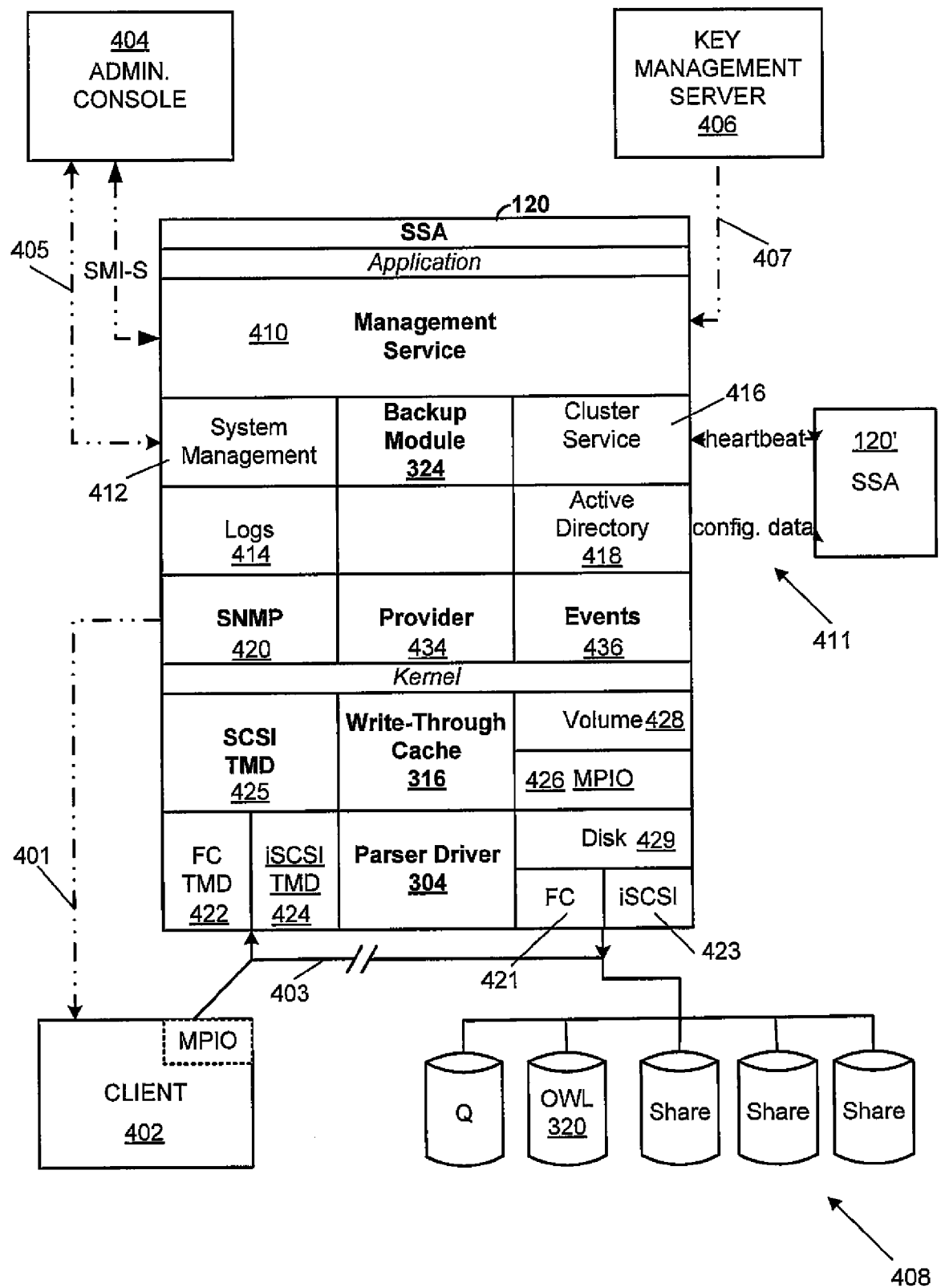
FIG. 7 illustrates a portion of a data storage system including a secure storage appliance, according to a further possible embodiment of the present disclosure.

FIG. 7 illustrates further details regarding connections to and operational hardware and software included in secure storage appliance 120, according to a possible embodiment of the present disclosure. The secure storage appliance 120 illustrates the various operational hardware modules available in the secure storage appliance to accomplish the data flow and software module operations described in FIGS. 4-6, above. In the embodiment shown, the secure storage appliance 120 is communicatively connected to a client device 402, an administrative console 404, a key management server 406, a plurality of storage devices 408, and an additional secure storage appliance 120'.

In the embodiment shown, the secure storage appliance 120 connects to the client device 402 via both an IP network connection 401 and a SAN network connection 403. The secure storage appliance 120 connects to the administrative console 404 by one or more IP connections 405 as well. The key management server 406 is also connected to the secure storage appliance 120 by an IP network connection 407. The storage devices 408 are connected to the secure storage appliance 120 by the SAN network connection 403, such as a Fibre Channel or other high-bandwidth data connection. Finally, in the embodiment shown, secure storage appliances 120, 120' are connected via any of a number of types of communicative connections 411, such as an IP or other connection, for communicating heartbeat messages and status information for coordinating actions of the secure storage appliance 120 and the secure storage appliance 120'. Although in the embodiment shown, these specific connections and systems are included, the arrangement of devices connected to the secure storage appliance 120, as well as the types and numbers of devices connected to the appliance may be different in other embodiments.

The secure storage appliance 120 includes a number of software-based components, including a management service 410 and a system management module 412. The management service 410 and the system management module 412 each connect to the administrative console 404 or otherwise provide system management functionality for the secure storage appliance 120. The management service 410 and system management module 412 are generally used to set various settings in the secure storage appliance 120, view logs 414 stored on the appliance, and configure other aspects of a network including the secure storage appliance 120. Additionally, the management service 410 connects to the key management server 406, and can request and receive keys from the key management server 406 as needed.

A cluster service 416 provides synchronization of state information between the secure storage appliance 120 and secure storage appliance 120'. In certain embodiments, the cluster service 416 manages a heartbeat message and status information exchanged between the secure storage appliance 120 and the secure storage appliance 120'. Secure storage appliance 120 and secure storage appliance 120' periodically exchange heartbeat messages to ensure that secure storage appliance 120 and secure storage appliance 120' maintain contact. Secure storage appliance 120 and secure storage appliance 120' maintain contact to ensure that the state information received by each secure storage appliance indicating the state of the other secure storage appliance is up to date. An active directory services 418 stores the status information, and provides status information periodically to other secure storage appliances via the communicative connection 411.

Additional hardware and/or software components provide datapath functionality to the secure storage appliance 120 to allow receipt of data and storage of data at the storage devices 408. In the embodiment shown, the secure storage appliance 120 includes a SNMP connection module 420 that enables secure storage appliance 120 to communicate with client devices via the IP network connection 401, as well as one or more high-bandwidth data connection modules, such as a Fibre Channel input module 422 or SCSI input module 424 for receiving data from the client device 402 or storage devices 408. Analogous data output modules including a Fibre Channel connection module 421 or SCSI connection module 423 can connect to the storage devices 408 or client device 402 via the SAN network connection 403 for output of data.

Additional functional systems within the secure storage appliance 120 assist in datapath operations. A SCSI command module 425 parses and forms commands to be sent out or received from the client device 402 and storage devices 408. A multipath communications module 426 provides a generalized communications interface for the secure storage appliance 120, and a disk volume 428, disk 429, and cache 316 provide local data storage for the secure storage appliance 120.

Additional functional components can be included in the secure storage appliance 120 as well. In the embodiment shown, a parser driver 304 provides data splitting and encryption capabilities for the secure storage appliance 120, as previously explained. A provider 434 includes volume management information, for creation and destruction of volumes. An events module 436 generates and handles events based on observed occurrences at the secure storage appliance (e.g. data errors or communications errors with other systems).

FIGS. 8-9 provide a top level sense of a dataflow occurring during write and read operations, respectively, passing through a secure storage appliance, such as the secure storage appliance described above in conjunction with FIGS. 3-7.

FIG. 8 illustrates a dataflow of a write operation according to a possible embodiment of the present disclosure, while FIG. 9 illustrates dataflow of a read operation. In the write operation of FIG. 8, a primary data block 450 is transmitted to a secure storage appliance (e.g. from a client device such as an application server). The secure storage appliance can include a functional block 460 to separate the primary data block into N secondary data blocks 470, shown as S-1 through S-N. In certain embodiments, the functional block 460 is included in a parser driver, such as parser driver 304, above. The specific number of secondary data blocks can vary in different networks, and can be defined by an administrative user having access to control settings relevant to the secure storage appliance. Each of the secondary data blocks 470 can be written to separate physical storage devices. In the read operation of FIG. 9, M secondary data blocks are accessed from physical storage devices, and provided to the functional block 460 (e.g. parser driver 304). The functional block 460 then performs an operation inverse to that illustrated in FIG. 8, thereby reconstituting the primary data block 450. The primary data block can then be provided to the requesting device (e.g. a client device).

In each of FIGS. 8-9, the N secondary data blocks 470 each represent a cryptographically split portion of the primary data block 450, such that the functional block 460 requires only M of the N secondary data blocks (where M<=N) to reconstitute the primary data block 450. The cryptographic splitting and data reconstitution of FIGS. 8-9 can be performed according to any of a number of techniques. In one embodiment, the parser driver 304 executes SecureParser software provided by Security First Corporation of Rancho Santa Margarita, Calif.

Although, in the embodiment shown in FIG. 9, the parser driver 304 uses the N secondary data blocks 470 to reconstitute the primary data block 450, it is understood that in certain applications, fewer than all of the N secondary data blocks 470 are required. For example, when the parser driver 304 generates N secondary data blocks during a write operation such that only M secondary data blocks are required to reconstitute the primary data block (where M<N), then data conversion module 60 only needs to read that subset of secondary data block from physical storage devices to reconstitute the primary data block 450.

For example, during operation of the parser driver 304 a data conversion routine may generate four secondary data blocks 470, of which two are needed to reconstitute a primary data block (i.e. M=2, N=4). In such an instance, two of the secondary data blocks 470 may be stored locally, and two of the secondary data blocks 470 may be stored remotely to ensure that, upon failure of a device or catastrophic event at one location, the primary data block 450 can be recovered by accessing one or both of the secondary data blocks 470 stored remotely. Other arrangements are possible as well, such as one in which four secondary data blocks 470 are stored locally and all are required to reconstitute the primary data block 450 (i.e. M=4, N=4). At its simplest, a single share could be created (M=N=1).

Figure 10:
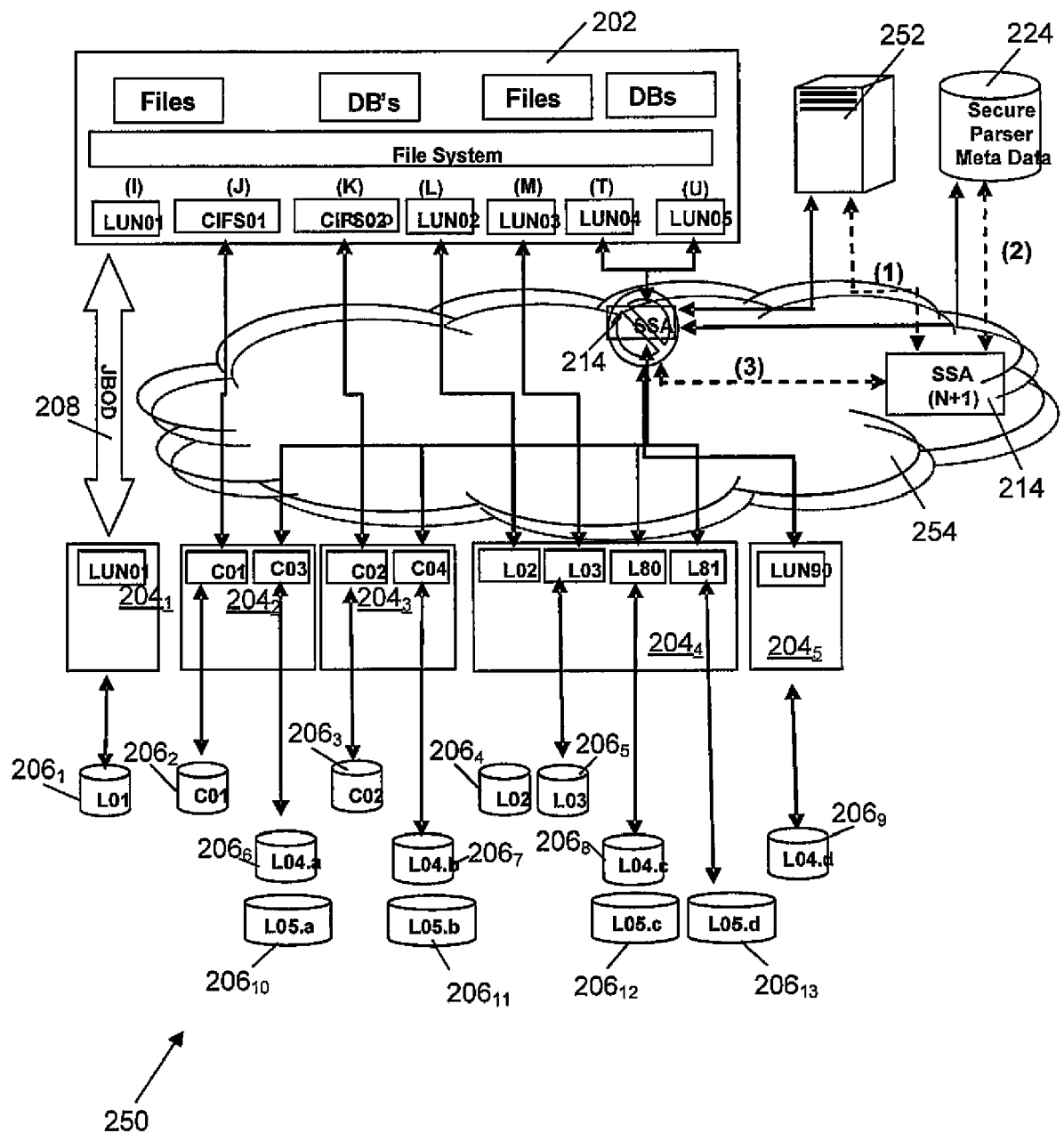
FIG. 10 illustrates a further possible embodiment of a data storage network including redundant secure storage appliances, according to a possible embodiment of the present disclosure.

FIG. 10 illustrates a further possible embodiment of a data storage system 250, according to a possible embodiment of the present disclosure. The data storage system 250 generally corresponds to the data storage system 200 of FIG. 4, above, but further includes redundant secure storage appliances 214. Each of secure storage appliances 214 may be an instance of secure storage appliance 120. Inclusion of redundant secure storage appliances 214 allows for load balancing of read and write requests in the data storage system 250, such that a single secure storage appliance is not required to process every secure primary read command or primary write command passed from the application server 202 to one of the secure storage appliances 214. Use of redundant secure storage appliances also allows for failsafe operation of the data storage system 250, by ensuring that requests made of a failed secure storage appliance are rerouted to alternative secure storage appliances.

In the embodiment of the data storage system 250 shown, two secure storage appliances 214 are shown. Each of the secure storage appliances 214 can be connected to any of a number of clients (e.g. the application server 202), as well as secured storage systems 204, the metadata store 224, and a remote server 252. In various embodiments, the remote server 252 could be, for example, an enterprise directory 228 and/or a key manager 230.

The secure storage appliances 214 are also typically connected to each other via a network connection. In the embodiment shown in the example of FIG. 10, the secure storage appliances 214 reside within a network 254. In various embodiments, network 254 can be, for example, an IP-based network, SAN as previously described in conjunction with FIGS. 4-5, or another type of network. In certain embodiments, the network 254 can include aspects of one or both types of networks. An example of a particular configuration of such a network is described below in conjunction with FIGS. 11-12.

The secure storage appliances 214 in the data storage system 250 are connected to each other across a TCP/IP portion of the network 254. This allows for the sharing of configuration data, and the monitoring of state, between the secure storage appliances 214. In certain embodiments there can be two IP-based networks, one for sharing of heartbeat information for resiliency, and a second for configuration and administrative use. The secure storage appliance 120 can also potentially be able to access the storage systems 204, including remote storage systems, across an IP network using a data interface.

In operation, sharing of configuration data, state data, and heartbeat information between the secure storage appliances 214 allows the secure storage appliances 214 to monitor and determine whether other secure storage appliances are present within the data storage system 250. Each of the secure storage appliances 214 can be assigned specific addresses of read operations and write operations to process. Secure storage appliances 214 can reroute received I/O commands to the appropriate one of the secure storage appliances 214 assigned that operation based upon the availability of that secure storage appliance and the resources available to the appliance. Furthermore, the secure storage appliances 214 can avoid addressing a common storage device 204 or application server 202 port at the same time, thereby avoiding conflicts. The secure storage appliances 214 also avoid reading from and writing to the same share concurrently to prevent the possibility of reading stale data.

When one of the secure storage appliances 214 fails, a second secure storage appliance can determine the state of the failed secure storage appliance based upon tracked configuration data (e.g. data tracked locally or stored at the remote server 252). The remaining operational one of the secure storage appliances 214 can also access information in the metadata store 224, including share and key information defining volumes, virtual disks and client access rights, to either process or reroute requests assigned to the failed device.

As previously described, the data storage system 250 is intended to be exemplary of a possible network in which aspects of the present disclosure can be implemented; other arrangements are possible as well, using different types of networks, systems, storage devices, and other components.

Figure 11:
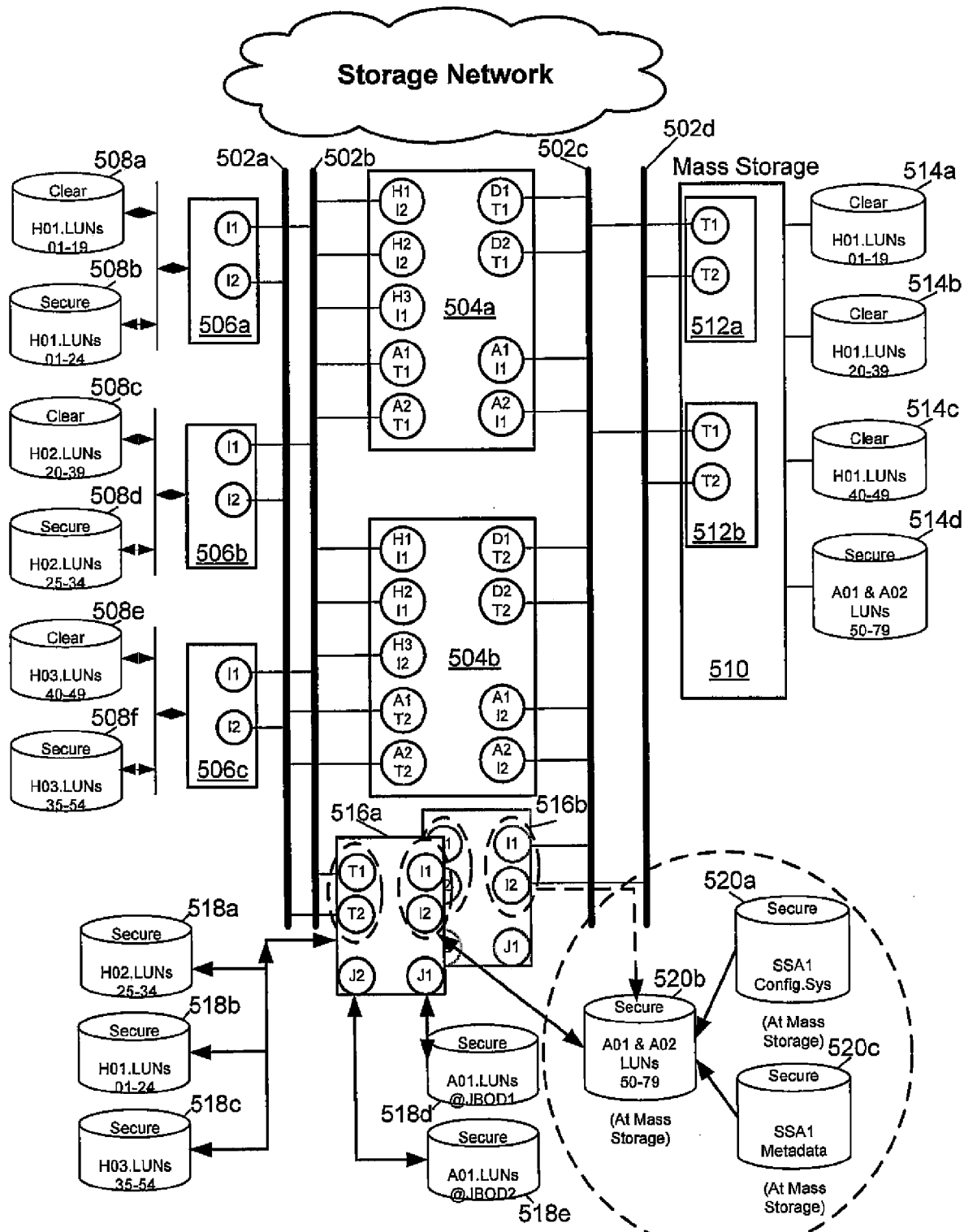
FIG. 11 illustrates incorporation of secure storage appliances in a portion of a data storage network, according to a possible embodiment of the present disclosure.

Referring now to FIG. 11, one possibility of a methodology of incorporating secure storage appliances into a data storage network, such as a SAN, is shown according to a possible embodiment of the present disclosure. In the embodiment shown, a secure storage network 500 provides for fully redundant storage, in that each of the storage systems connected at a client side of the network is replicated in mass storage, and each component of the network (switches, secure storage appliances) is located in a redundant array of systems, thereby providing a failsafe in case of component failure. In alternative embodiments, the secure storage network 500 can be simplified by including only a single switch and/or single secure storage appliance, thereby reducing the cost and complexity of the network (while coincidentally reducing the protection from component failure).

In the embodiment shown, an overall secure storage network 500 includes a plurality of data lines 502a-d interconnected by switches 504a-b. Data lines 502a-b connect to storage systems 506a-c, which connect to physical storage disks 508a-f. The storage systems 506a-c correspond generally to smaller-scale storage servers, such as an application server, client device, or other system as previously described. In the embodiment shown in the example of FIG. 11, storage system 506a connects to physical storage disks 508a-b, storage system 506b connects to physical storage disks 508c-d, and storage system 506c connects to physical storage disks 508e-f. The secure storage network 500 can be implemented in a number of different ways, such as through use of Fibre Channel or iSCSI communications as the data lines 502a-d, ports, and other data communications channels. Other high bandwidth communicative connections can be used as well.

The switches 504a-b connect to a large-scale storage system, such as the mass storage 510 via the data lines 502c-d. The mass storage 510 includes, in the embodiment shown, two data directors 512a-b, which respectively direct data storage and requests for data to one or more of the back end physical storage devices 514a-d. In the embodiment shown, the physical storage devices 514a-c are unsecured (i.e. not cryptographically split and encrypted), while the physical storage device 514d stores secure data (i.e. password secured or other arrangement).

The secure storage appliances 516a-b also connect to the data lines 502a-d, and each connect to the secure physical storage devices 518a-e. Additionally, the secure storage appliances 516a-b connect to the physical storage devices 520a-c, which can reside at a remote storage location (e.g. the location of the large-scale storage system, mass storage 510).

In certain embodiments providing redundant storage locations, the secure storage network 500 allows a user to configure the secure storage appliances 516a-b such that, using the M of N cryptographic splitting enabled in each of the secure storage appliances 516a-b, M shares of data can be stored on physical storage devices at a local location to provide fast retrieval of data, while another M shares of data can be stored on remote physical storage devices at a remote location. Therefore, failure of one or more physical disks or secure storage appliances does not render data unrecoverable, because a sufficient number of shares of data remain accessible to at least one secure storage appliance capable of reconstituting requested data.

Figure 12:
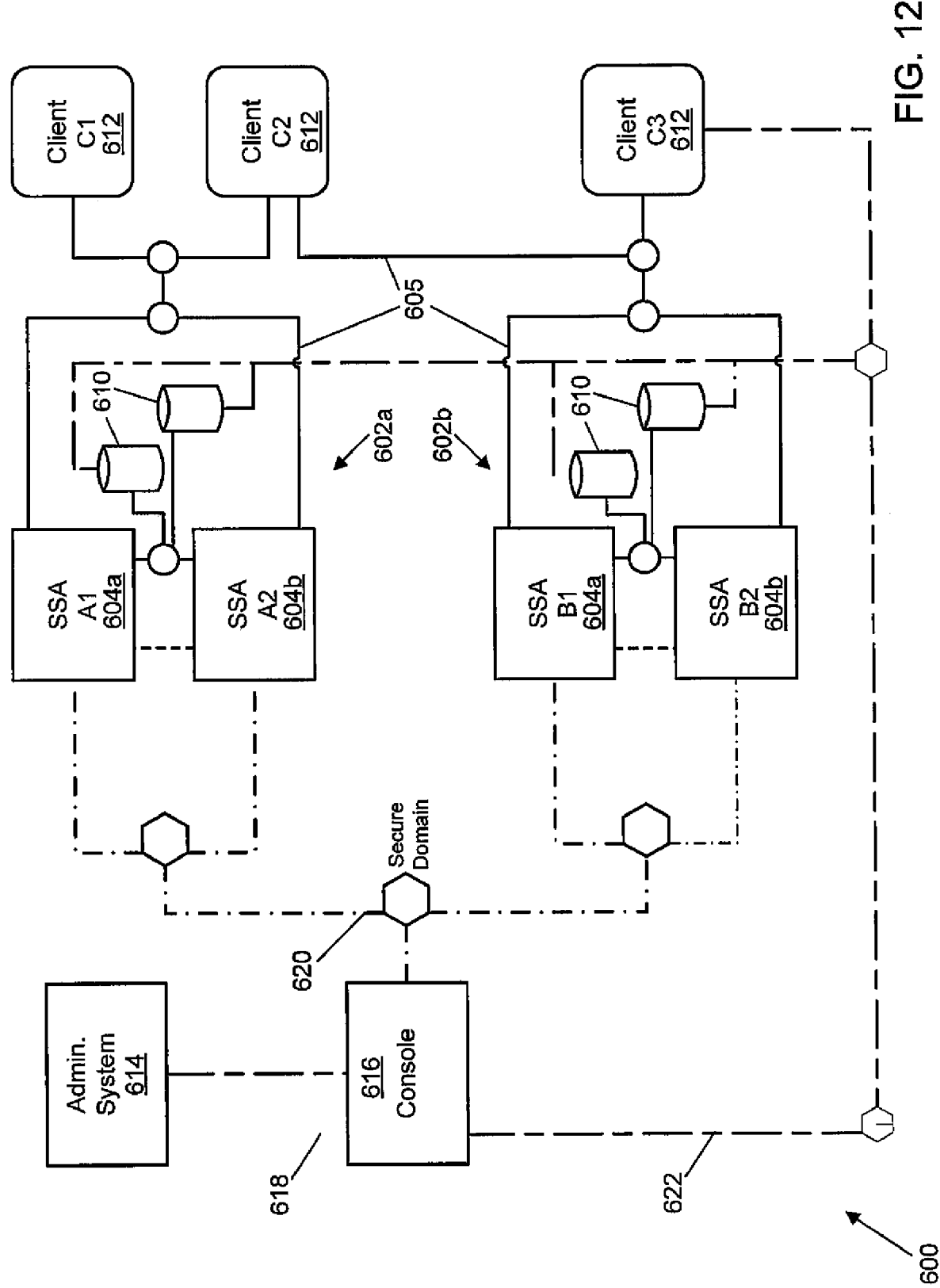
FIG. 12 illustrates an arrangement of a data storage network according to a possible embodiment of the present disclosure.

FIG. 12 illustrates a particular cluster-based arrangement of a data storage network 600 according to a possible embodiment of the present disclosure. The data storage network 600 is generally arranged such that clustered secure storage appliances access and store shares on clustered physical storage devices, thereby ensuring fast local storage and access to the cryptographically split data. The data storage network 600 is therefore a particular arrangement of the networks and systems described above in FIGS. 1-11, in that it represents an arrangement in which physical proximity of devices is accounted for.

In the embodiment shown, the data storage network 600 includes two clusters, 602a-b. Each of the clusters 602a-b includes a pair of secure storage appliances 604a-b, respectively. In the embodiment shown, the clusters 602a-b are labeled as clusters A and B, respectively, with each cluster including two secure storage appliances 604a-b (shown as appliances A1 and A2 in cluster 602a, and appliances B1 and B2 in cluster 602b, respectively). The secure storage appliances 604a-b within each of the clusters 602a-b are connected via a data network 605 (e.g. via switches or other data connections in an iSCSI, Fibre Channel, or other data network, as described above and indicated via the nodes and connecting lines shown within the data network 605) to a plurality of physical storage devices 610. Additionally, the secure storage appliances 604a-b are connected to client devices 612, shown as client devices C1-C3, via the data storage network 605. The client devices 612 can be any of a number of types of devices, such as application servers, database servers, or other types of data-storing and managing client devices.

In the embodiment shown, the client devices 612 are connected to the secure storage appliances 604a-b such that each of client devices 612 can send I/O operations (e.g. a read request or a write request) to two or more of the secure storage appliances 604a-b, to ensure a backup datapath in case of a connection failure to one of secure storage appliances 604a-b. Likewise, the secure storage appliances 604a-b of each of clusters 602a-b are both connected to a common set of physical storage devices 610. Although not shown in the example of FIG. 12, the physical storage devices 610 can be, in certain embodiments, managed by separate storage systems, as described above. Such storage systems are removed from the illustration of the data storage network 600 for simplicity, but can be present in practice.

An administrative system 614 connects to a maintenance console 616 via a local area network 618. Maintenance console 616 has access to a secured domain 620 of an IP-based network 622. The maintenance console 616 uses the secured domain 620 to access and configure the secure storage appliances 604a-b. One method of configuring the secure storage appliances is described below in conjunction with FIG. 14.

The maintenance console 616 is also connected to both the client devices 612 and the physical storage devices 610 via the IP-based network 622. The maintenance console 616 can determine the status of each of these devices to determine whether connectivity issues exist, or whether the device itself has become non-responsive.

Figure 13:
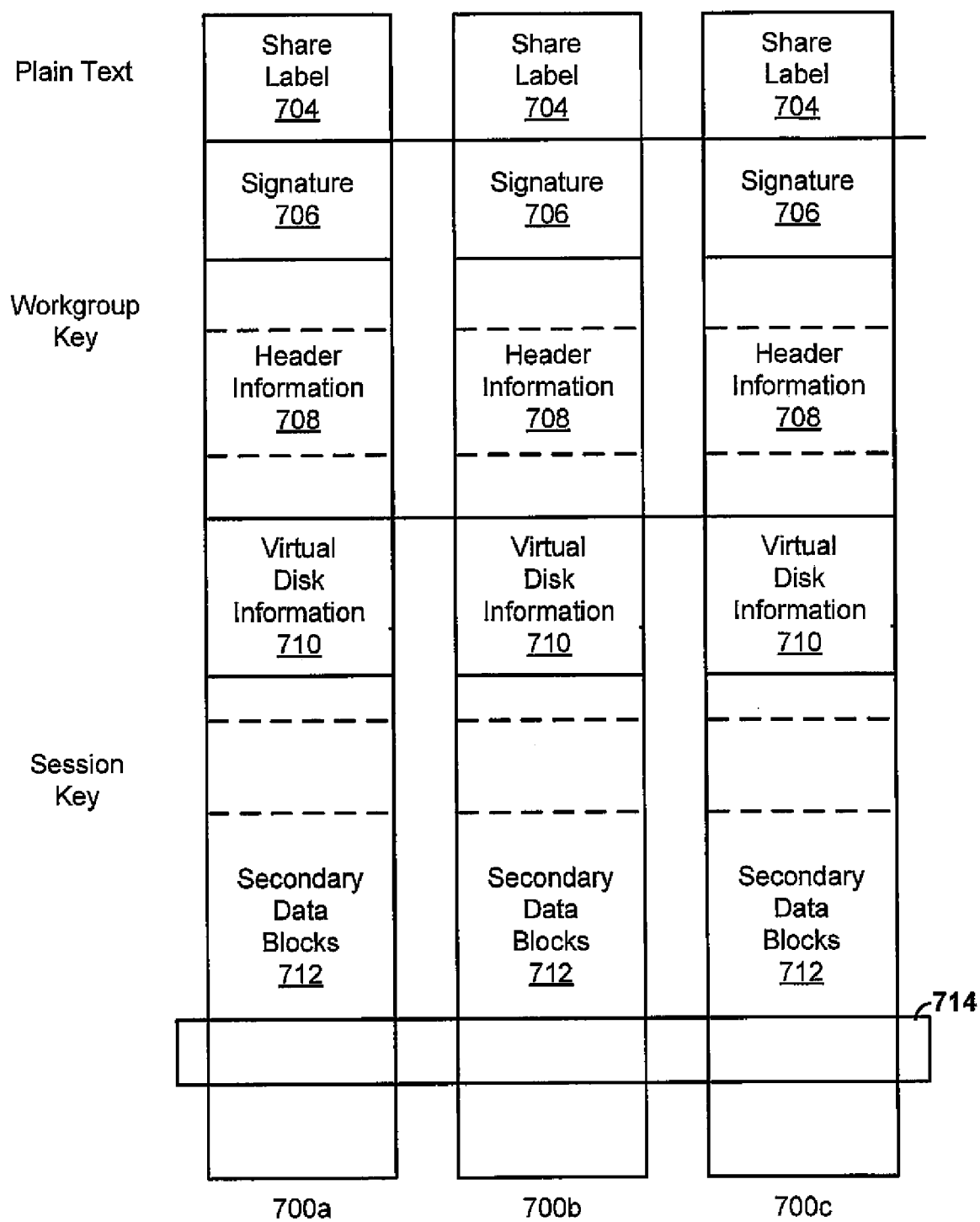
FIG. 13 illustrates a physical block structure of data to be written onto a physical storage device, according to aspects of the present disclosure.

Referring now to FIG. 13, an example physical block structure of data written onto one or more physical storage devices is shown, according to aspects of the present disclosure. The example of FIG. 13 illustrates three strips 700A, 700B, and 700C (collectively, "shares"). Each of strips 700 is a share of a physical storage device devoted to storing data associated with a common volume. For example, in a system in which a write operation splits a primary data block into three secondary data blocks (i.e. N=3), the strips 700 (shares) would be appropriately used to store each of the secondary data blocks. As used in this disclosure, a volume is grouped storage that is presented by a secure storage appliance to clients of secure storage appliance (e.g. secure storage appliance 120 or 214 as previously described), such that the storage appears as a contiguous, unitary storage location. Secondary data blocks of a volume are distributed among strips 700. In systems implementing a different number of shares (e.g. N=2, 4, 6, etc.), a different, corresponding number of shares would be used. As basic as a 1 of 1 configuration (M=1, N=1) configuration could be used.

Each of the strips 700 corresponds to a reserved portion of memory of a different one of physical storage devices (e.g. physical storage devices 206 previously described), and relates to a particular I/O operation from storage or reading of data to/from the physical storage device. Typically, each of the strips 700 resides on a different one of physical storage devices. Furthermore, although three different strips are shown in the illustrative embodiment shown, more or fewer strips can be used as well. In certain embodiments, each of the strips 700 begins on a sector boundary. In other arrangements, the each of the strips 700 can begin at any other memory location convenient for management within the share.

Each of strips 700 includes a share label 704, a signature 706, header information 708, virtual disk information 710, and data blocks 712. The share label 704 is written on each of strips 700 in plain text, and identifies the volume and individual share. The share label 704 can also, in certain embodiments, contain information describing other header information for the strips 700, as well as the origin of the data written to the strip (e.g. the originating cluster).

The signature 706 contain information required to construct the volume, and is encrypted by a workgroup key. The signatures 706 contain information that can be used to identify the physical device upon which data (i.e. the share) is stored. The workgroup key corresponds to a key associated with a group of one or more users having a common set of usage rights with respect to data (i.e. all users within the group can have access to common data.) In various embodiments, the workgroup key can be assigned to a corporate department using common data, a common group of one or more users, or some other community of interest for whom common access rights are desired.

The header information 708 contains session keys used to encrypt and decrypt the volume information included in the virtual disk information 710, described below. The header information 708 is also encrypted by the workgroup key. In certain embodiments, the header information 708 includes headers per section of data. For example, the header information 708 may include one header for each 64 GB of data. In such embodiments, it may be advantageous to include at least one empty header location to allow re-keying of the data encrypted with a preexisting session key, using a new session key.

The virtual disk information 710 includes metadata that describes a virtual disk, as it is presented by a secure storage appliance. The virtual disk information 710, in certain embodiments, includes names to present the virtual disk, a volume security descriptor, and security group information. The virtual disk information 710 can be, in certain embodiments, encrypted by a session key associated with the physical storage device upon which the strips 700 are stored, respectively.

The secondary data blocks 712 correspond to a series of memory locations used to contain the cryptographically split and encrypted data. Each of the secondary data blocks 712 contains data created at a secure storage appliance, followed by metadata created by the secure storage appliance as well. The N secondary data blocks created from a primary data block are combined to form a stripe 714 of data. The metadata stored alongside each of the secondary data blocks 712 contains an indicator of the header used for encrypting the data.

In one example implementation, each of the secondary data blocks 712 includes metadata that specifies a number of times that the secondary data block has been written. A volume identifier and stripe location of an primary data block an be stored as well.

It is noted that, although a session key is associated with a volume, multiple session keys can be used per volume. For example, a volume may include one session key per 64 GB block of data. In this example, each 64 GB block of data contains an identifier of the session key to use in decrypting that 64 GB block of data. The session keys used to encrypt data in each strip 700 can be of any of a number of forms. In certain embodiments, the session keys use an AES-256 Counter with Bit Splitting. In other embodiments, it may be possible to perform bit splitting without encryption. Therefore, alongside each secondary data block 712, an indicator of the session key used to encrypt the data block may be provided.

A variety of access request prioritization algorithms can be included for use with the volume, to allow access of only quickest-responding physical storage devices associated with the volume. Status information can be stored in association with a volume and/or share as well, with changes in status logged based on detection of event occurrences. The status log can be located in a reserved, dedication portion of memory of a volume. Other arrangements are possible as well.

It is noted that, based on the encryption of session keys with workgroup keys and the encryption of the secondary data blocks 712 in each strip 700 with session keys, it is possible to effectively delete all of the data on a disk or volume (i.e. render the data useless) by deleting all workgroup keys that could decrypt a session key for that disk or volume.

Figure 14:
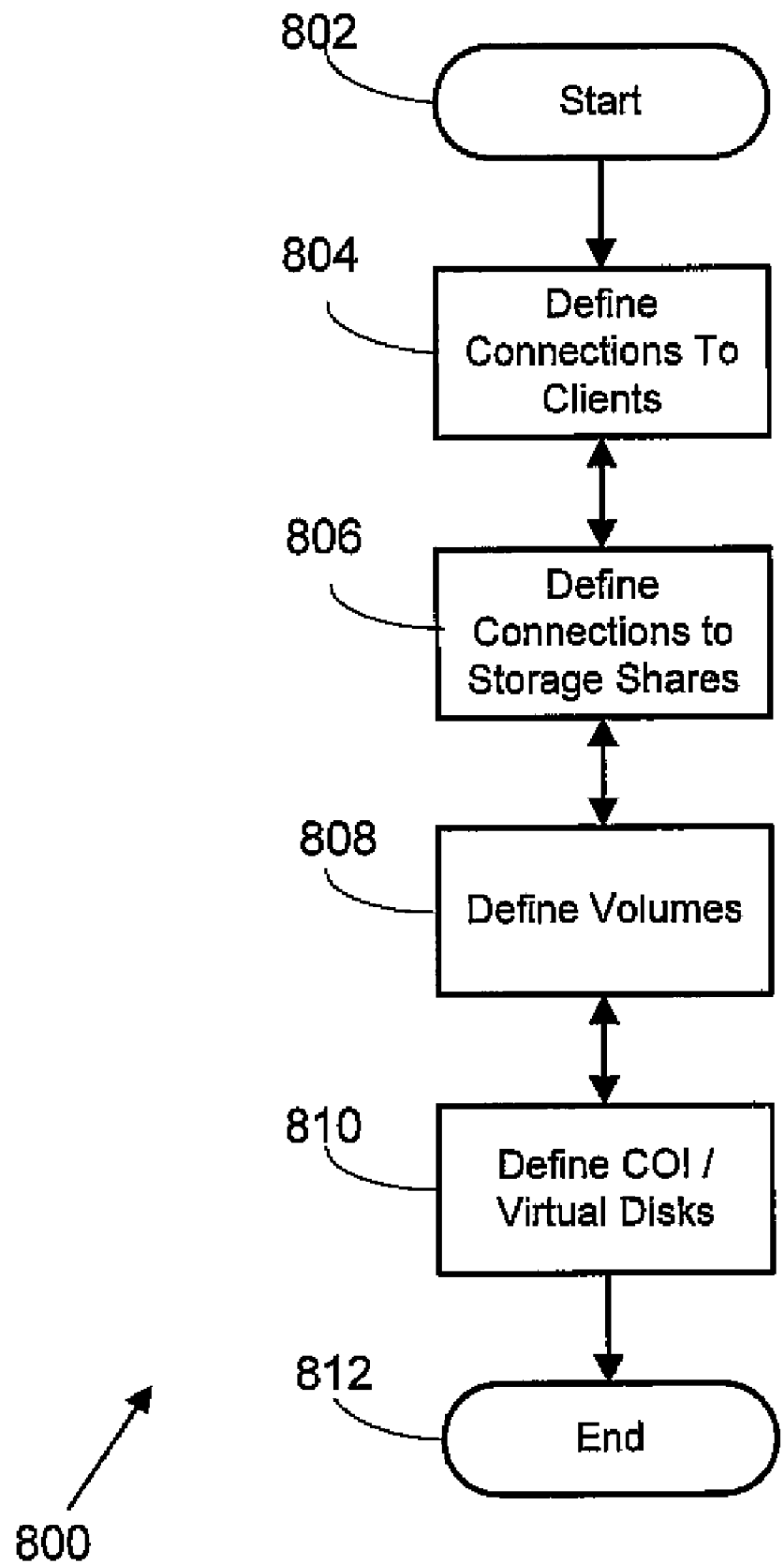
FIG. 14 shows a flowchart of systems and methods for providing access to secure storage in a storage area network according to a possible embodiment of the present disclosure.
Figure 15:
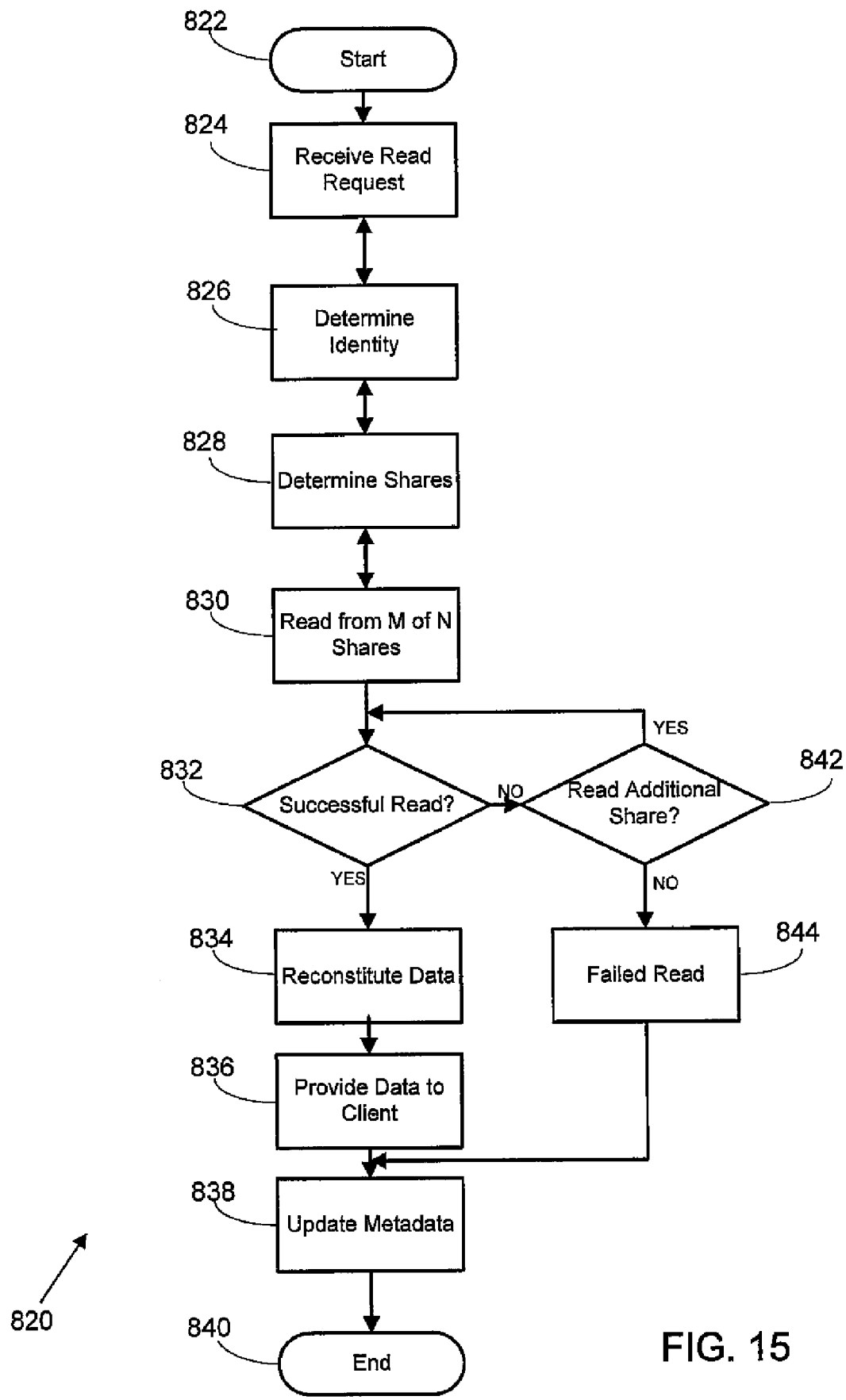
FIG. 15 shows a flowchart of systems and methods for reading block-level secured data according to a possible embodiment of the present disclosure.
Figure 16:
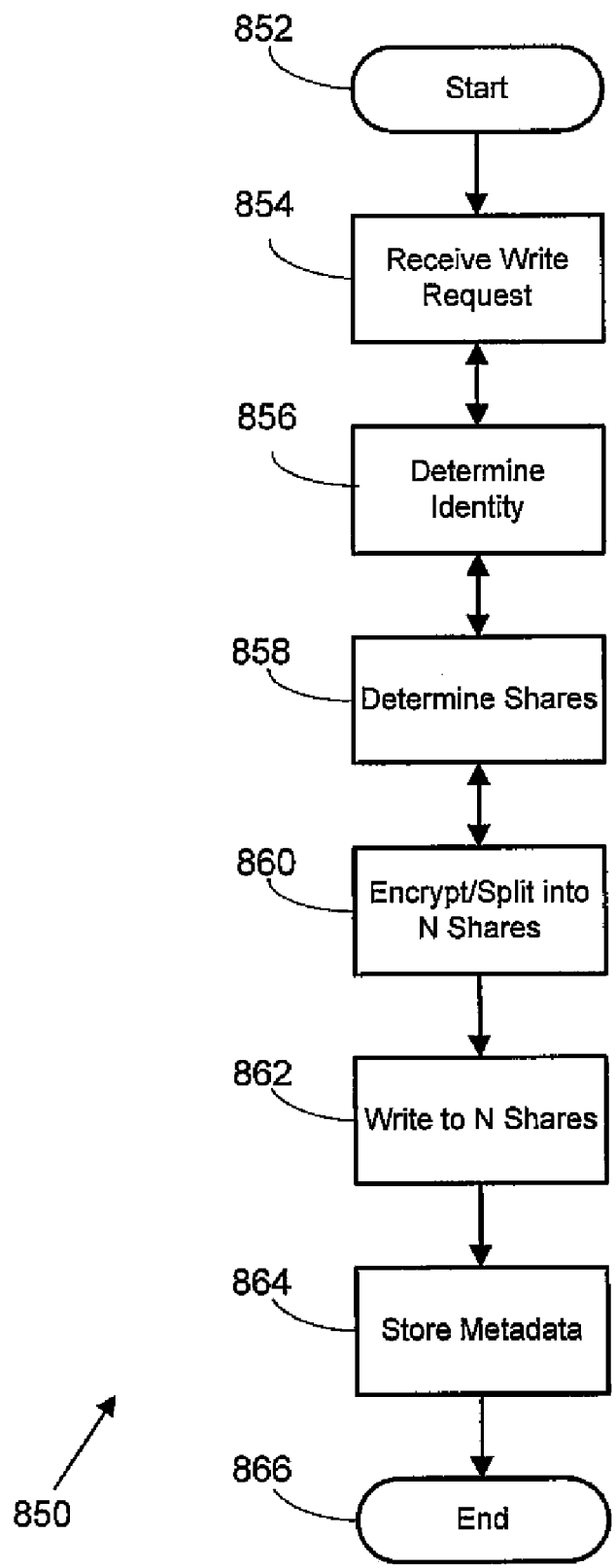
FIG. 16 shows a flowchart of systems and methods for writing block-level secured data according to a possible embodiment of the present disclosure.

Referring now to FIGS. 14-16, basic example flowcharts of setup and use of the networks and systems disclosed herein are described. Although these flowcharts are intended as example methods for administrative and I/O operations, such operations can include additional steps/modules, can be performed in a different order, and can be associated with different number and operation of modules. In certain embodiments, the various modules can be executed concurrently.

FIG. 14 shows a flowchart of systems and methods 800 for providing access to secure storage in a storage area network according to a possible embodiment of the present disclosure. The methods and systems 800 correspond to a setup arrangement for a network including a secure data storage system such as those described herein, including one or more secure storage appliances. The embodiments of the methods and systems described herein can be performed by an administrative user or administrative software associated with a secure storage appliance, as described herein.

Operational flow is instantiated at a start operation 802, which corresponds to initial introduction of a secure storage appliance into a network by an administrator or other individuals of such a network in a SAN, NAS, or other type of networked data storage environment. Operational flow proceeds to a client definition module 804 that defines connections to client devices (i.e. application servers or other front-end servers, clients, or other devices) from the secure storage appliance. For example, the client definition module 804 can correspond to mapping connections in a SAN or other network between a client such as application server 202 and a secure storage appliance 120 of FIG. 4.

Operational flow proceeds to a storage definition module 806. The storage definition module 806 allows an administrator to define connections to storage systems and related physical storage devices. For example, the storage definition module 806 can correspond to discovering ports and routes to storage devices 206 within the system 200 of FIG. 4, above.

Operational flow proceeds to a volume definition module 808. The volume definition module 808 defines available volumes by grouping physical storage into logical arrangements for storage of shares of data. For example, an administrator can create a volume, and assign a number of attributes to that volume. A storage volume consists of multiple shares or segments of storage from the same or different locations. The administrator can determine a number of shares into which data is cryptographically split, and the number of shares required to reconstitute that data. The administrator can then assign specific physical storage devices to the volume, such that each of the N shares is stored on particular devices. The volume definition module 808 can generate session keys for storing data on each of the physical storage devices, and store that information in a key server and/or on the physical storage devices. In certain embodiments, the session keys generated in the volume definition module 808 are stored both on a key server connected to the secure storage appliance and on the associated physical storage device (e.g. after being encrypted with an appropriate workgroup key generated by the communities of interest module 810, below). Optionally, the volume definition module 808 includes a capability of configuring preferences for which shares are first accessed upon receipt of a request to read data from those shares.

Operational flow proceeds to a communities of interest module 810. The communities of interest module 810 corresponds to creation of one or more groups of individuals having interest in data to be stored on a particular volume. The communities of interest 810 module further corresponds to assigning of access rights and visibility to volumes to one or more of those groups.

In creating the groups via the communities of interest module 810, one or more workgroup keys may be created, with each community of interest being associated with one or more workgroup keys. The workgroup keys are used to encrypt access information (e.g. the session keys stored on volumes created during operation of the volume definition module 808) related to shares, to ensure that only individuals and devices from within the community of interest can view and access data associated with that group. Once the community of interest is created and associated with a volume, client devices identified as part of the community of interest can be provided with a virtual disk, which is presented to the client device as if it is a single, unitary volume upon which files can be stored.

In use, the virtual disks appear as physical disks to the client and support SCSI or other data storage commands. Each virtual disk is associated on a many-to-one basis with a volume, thereby allowing multiple communities of interest to view common data on a volume (e.g. by replicating the relevant session keys and encrypting those keys with relevant workgroup keys of the various communities of interest). A write command will cause the data to be encrypted and split among multiple shares of the volume before writing, while a read command will cause the data to be retrieved from the shares, combined, and decrypted.

Operational flow terminates at end operation 812, which corresponds to completion of the basic required setup tasks to allow usage of a secure data storage system.

FIG. 15 shows a flowchart of systems and methods 820 for reading block-level secured data according to a possible embodiment of the present disclosure. The methods and systems 820 correspond to a read or input command related to data stored via a secure storage appliance, such as those described herein. Operational flow in the system 820 begins at a start operation 822. Operational flow proceeds to a receive read request module 824, which corresponds to receipt of a primary read request at a secure storage appliance from a client device (e.g. an application server or other client device, as illustrated in FIGS. 3-4). The read request generally includes an identifier of a virtual disk from which data is to be read, as well as an identifier of the requested data.

Operational flow proceeds to an identity determination module 826, which corresponds to a determination of the identity of the client from which the read request is received. The client's identity generally corresponds with a specific community of interest. This assumes that the client's identity for which the secure storage appliance will access a workgroup key associated with the virtual disk that is associated with the client.

Operational flow proceeds to a share determination module 828. The share determination module 828 determines which shares correspond with a volume that is accessed by way of the virtual disk presented to the user and with which the read request is associated. The shares correspond to at least a minimum number of shares needed to reconstitute the primary data block (i.e. at least M of the N shares). In operation, a read module 830 issues secondary read requests to the M shares, and receives in return the secondary data blocks stored on the associated physical storage devices.

A success operation 832 determines whether the read module 830 successfully read the secondary data blocks. The success operation may detect for example, that data has been corrupted, or that a physical storage device holding one of the M requested shares has failed, or other errors. If the read is successful, operational flow branches "yes" to a reconstitute data module 834. The reconstitute data module 834 decrypts a session key associated with each share with the workgroup key accessed by the identity determination module 826. The reconstitute data module 834 provides the session key and the encrypted and cryptographically split data to a data processing system within the secure storage appliance, which reconstitutes the requested data in the form of an unencrypted block of data physical disk locations in accordance with the principles described above in FIGS. 8-9 and 13. A provide data module 836 sends the reconstituted block of data to the requesting client device. A metadata update module 838 updates metadata associated with the shares, including, for example, access information related to the shares. From the metadata update module 838, operational flow proceeds to an end operation 840, signifying completion of the read request.

If the success operation 832 determines that not all of the M shares are successfully read, operational flow proceeds to a supplemental read operation 842, which determines whether an additional share exists from which to read data. If such a share exists (e.g. M<N), then the supplemental read operation reads that data, and operational flow returns to the success operation 832 to determine whether the system has now successfully read at least M shares and can reconstitute the primary data block as requested. If the supplemental read operation 842 determines that no further blocks of data are available to be read (e.g. M=N or M+failed reads>N), operational flow proceeds to a fail module 844, which returns a failed read response to the requesting client device. Operational flow proceeds to the update metadata module 838 and end operation 840, respectively, signifying completion of the read request.

Optionally, the fail module 844 can correspond to a failover event in which a backup copy of the data (e.g. a second N shares of data stored remotely from the first N shares) are accessed. In such an instance, once those shares are tested and failed, a fail message is sent to a client device.

In certain embodiments, commands and data blocks transmitted to the client device can be protected or encrypted, such as by using a public/private key or symmetric key encryption techniques, or by isolating the data channel between the secure storage appliance and client. Other possibilities exist for protecting data passing between the client and secure storage appliance as well.

Furthermore, although the system 820 of FIG. 15 illustrates a basic read operation, it is understood that certain additional cases related to read errors, communications errors, or other anomalies may occur which can alter the flow of processing a read operation. For example, additional considerations may apply regarding which M of the N shares to read from upon initially accessing physical storage disks 206. Similar considerations apply with respect to subsequent secondary read requests to the physical storage devices in case those read requests fail as well.

FIG. 16 shows a flowchart of systems and methods 850 for writing block-level secured data according to a possible embodiment of the present disclosure. The systems and methods 850 as disclosed provide a basic example of a write operation, and similarly to the read operation of FIG. 15 additional cases and different operational flow may be used.

In the example systems and methods 850 disclosed, operational flow is instantiated at a start operation 852. Operational flow proceeds to a write request receipt module 854, which corresponds to receiving a primary write request from a client device (e.g. an application server as shown in FIGS. 3-4) at a secure storage appliance. The primary write request generally addresses a virtual disk, and includes a block of data to be written to the virtual disk.

Operational flow proceeds to an identity determination module 856, which determines the identity of the client device from which the primary write request is received. After determining the identity of the client device, the identity determination module 856 accesses a workgroup key based upon the identity of the client device and accesses the virtual disk at which the primary write request is targeted. Operational flow proceeds to a share determination module 858, which determines the number of secondary data blocks that will be created, and the specific physical disks on which those shares will be stored. The share determination module 858 obtains the session keys for each of the shares that are encrypted with the workgroup key obtained in the identity determination module 856 (e.g. locally, from a key manager, or from the physical disks themselves). These session keys for each share are decrypted using the workgroup key.

Operational flow proceeds to a data processing module 860, which provides to the parser driver 304 the share information, session keys, and the primary data block. The parser driver 304 operates to cryptographically split and encrypt the primary data block, thereby generating N secondary data blocks to be written to N shares in accordance with the principles described above in the examples of FIGS. 8-9 and 13. Operational flow proceeds to a secondary write module 862 which transmits the share information to the physical storage devices for storage.

Operational flow proceeds to a metadata storage module 864, which updates a metadata repository by logging the data written, allowing the secure storage appliance to track the physical disks upon which data has been written, and with what session and workgroup keys the data can be accessed. Operational flow terminates at an end operation 866, which signifies completion of the write request.

As previously mentioned, in certain instances additional operations can be included in the system 850 for writing data using the secure storage appliance. For example, confirmation messages can be returned to the secure storage appliance confirming successful storage of data on the physical disks. Other operations are possible as well.

Figure 17:
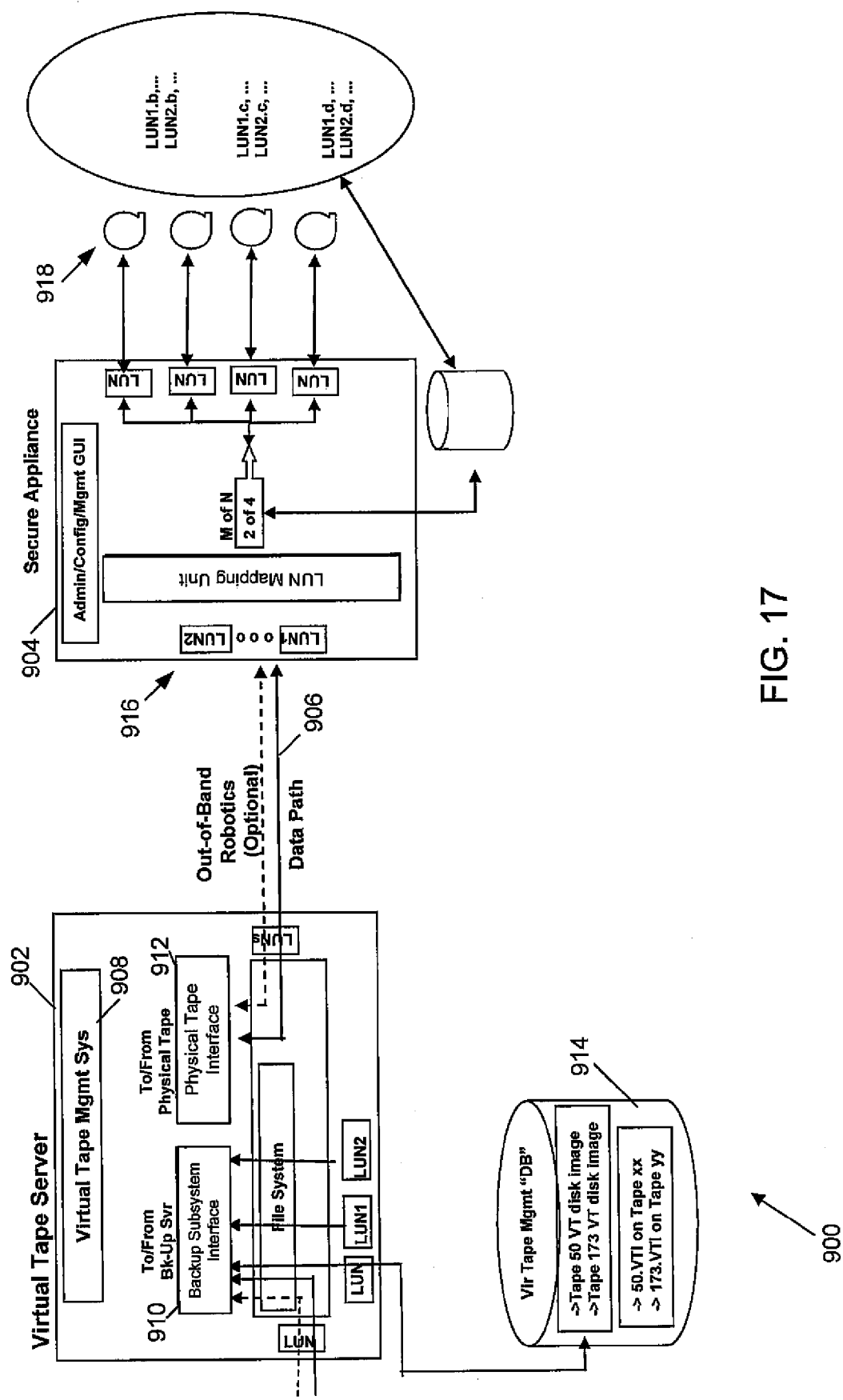
FIG. 17 shows a possible arrangement for providing secure storage data backup, according to a possible embodiment of the present disclosure.
Figure 18:
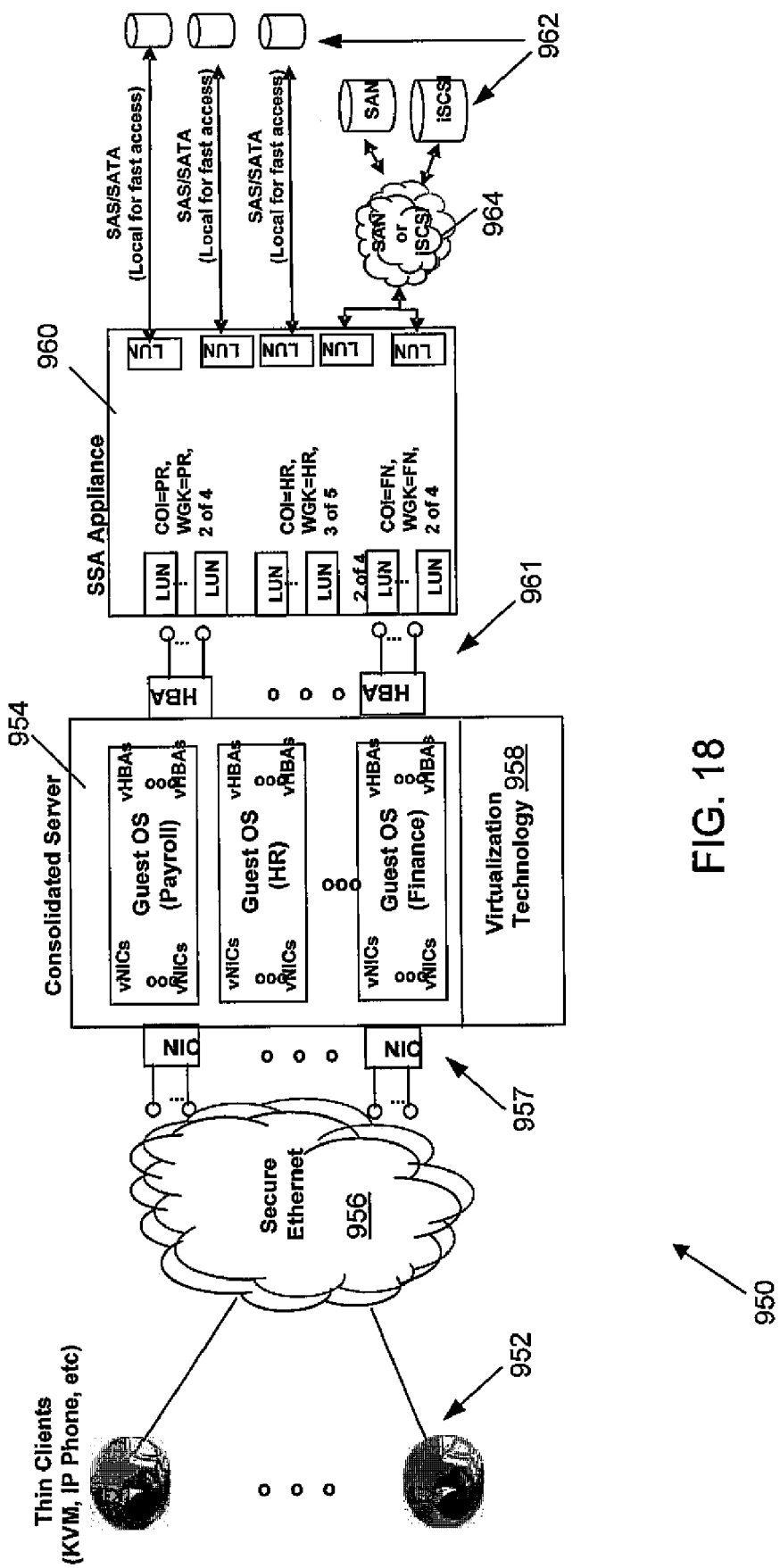
FIG. 18 shows a possible arrangement for providing secure storage for a thin client computing network, according to a possible embodiment of the present disclosure.

Now referring to FIGS. 17-18 of the present disclosure, certain applications of the present disclosure are discussed in the context of (1) data backup systems and (2) secure network thin client network topology used in the business setting. FIG. 17 shows an example system 900 for providing secure storage data backup, according to a possible embodiment of the present disclosure. In the system 900 shown, a virtual tape server 902 is connected to a secure storage appliance 904 via a data path 906, such as a SAN network using Fibre Channel or iSCSI communications. The virtual tape server 902 includes a management system 908, a backup subsystem interface 910, and a physical tape interface 912. The management system 908 provides an administrative interface for performing backup operations. The backup subsystem interface 910 receives data to be backed up onto tape, and logs backup operations. A physical tape interface 912 queues and coordinates transmission of data to be backed up to the secure storage appliance 904 via the network. The virtual tape server 902 is also connected to a virtual tape management database 914 that stores data regarding historical tape backup operations performed using the system 900.

The secure storage appliance 904 provides a virtual tape head assembly 916 which is analogous to a virtual disk but appears to the virtual tape server 902 to be a tape head assembly to be addressed and written to. The secure storage appliance 904 connects to a plurality of tape head devices 918 capable of writing to magnetic tape, such as that typically used for data backup. The secure storage appliance 904 is configured as described above. The virtual tape head assembly 916 provides an interface to address data to be backed up, which is then cryptographically split and encrypted by the secure storage appliance and stored onto a plurality of distributed magnetic tapes using the tape head devices 918 (as opposed to a generalized physical storage device, such as the storage devices of FIGS. 3-4).

In use, a network administrator could allocate virtual disks that would be presented to the virtual tape head assembly 916. The virtual tape administrator would allocate these disks for storage of data received from the client through the virtual tape server 902. As data is written to the disks, it would be cryptographically split and encrypted via the secure storage appliance 904.

The virtual tape administrator would present virtual tapes to a network (e.g. an IP or data network) from the virtual tape server 902. The data in storage on the tape head devices 918 is saved by the backup functions provided by the secure storage appliance 904. These tapes are mapped to the virtual tapes presented by the virtual tape head assembly 916. Information is saved on tapes as a collection of shares, as previously described.

An example of a tape backup configuration illustrates certain advantages of a virtual tape server over the standard tape backup system as described above in conjunction with FIG. 2. In one example of a tape backup configuration, share 1 of virtual disk A, share 1 of virtual disk B, and other share 1's can be saved to a tape using the tape head devices 918. Second shares of each of these virtual disks could be stored to a different tape. Keeping the shares of a virtual tape separate preserves the security of the information, by distributing that information across multiple tapes. This is because more than one tape is required to reconstitute data in the case of a data restoration. Data for a volume is restored by restoring the appropriate shares from the respective tapes. In certain embodiments an interface that can automatically restore the shares for a volume can be provided for the virtual tape assembly. Other advantages exist as well.

Now referring to FIG. 18, one possible arrangement of a thin client network topology is shown in which secure storage is provided. In the network 950 illustrated, a plurality of thin client devices 952 are connected to a consolidated application server 954 via a secured network connection 956.

The consolidated application server 954 provides application and data hosting capabilities for the thin client devices 952. In addition, the consolidated application server 954 can, as in the example embodiment shown, provide specific subsets of data, functionality, and connectivity for different groups of individuals within an organization. In the example embodiment shown, the consolidated application server 954 can connect to separate networks and can include separate, dedicated network connections for payroll, human resources, and finance departments. Other departments could have separate dedicated communication resources, data, and applications as well. The consolidated application server 954 also includes virtualization technology 958, which is configured to assist in managing separation of the various departments' data and application accessibility.

The secured network connection 956 is shown as a secure Ethernet connection using network interface cards 957 to provide network connectivity at the server 954. However, any of a number of secure data networks could be implemented as well.

The consolidated application server 954 is connected to a secure storage appliance 960 via a plurality of host bus adapter connections 961. The secure storage appliance 960 is generally arranged as previously described in FIGS. 3-16. The host bus adapter connections 961 allow connection via a SAN or other data network, such that each of the dedicated groups on the consolidated application server 954 has a dedicated data connection to the secure storage appliance 960, and separately maps to different port logical unit numbers (LUNs). The secure storage appliance 960 then maps to a plurality of physical storage devices 962 that are either directly connected to the secure storage appliance 960 or connected to the secure storage appliance 960 via a SAN 964 or other data network.

In the embodiment shown, the consolidated application server 954 hosts a plurality of guest operating systems 955, shown as operating systems 955*a-c*. The guest operating systems 955 host user-group-specific applications and data for each of the groups of individuals accessing the consolidated application server. Each of the guest operating systems 955*a-c* have virtual LUNs and virtual NIC addresses mapped to the LUNs and NIC addresses within the server 954, while virtualization technology 958 provides a register of the mappings of LUNS and NIC addresses of the server 954 to the virtual LUNs and virtual NIC addresses of the guest operating systems 955*a-c*. Through this arrangement, dedicated guest operating systems 955 can be mapped to dedicated LUN and NIC addresses, while having data that is isolated from that of other groups, but shared across common physical storage devices 962.

As illustrated in the example of FIG. 18, the physical storage devices 962 provide a typical logistical arrangement of storage, in which a few storage devices are local to the secure storage appliance, while a few of the other storage devices are remote from the secure storage appliance 960. Through use of (1) virtual disks that are presented to the various departments accessing the consolidated application server 954 and (2) shares of virtual disks assigned to local and remote storage, each department can have its own data securely stored across a plurality of locations with minimal hardware redundancy and improved security.

Although FIGS. 17-18 present a few options for applications of the secure storage appliance and secure network storage of data as described in the present disclosure, it is understood that further applications are possible as well. Furthermore, although each of these applications is described in conjunction with a particular network topology, it is understood that a variety of network topologies could be implemented to provide similar functionality, in a manner consistent with the principles described herein.

Figure 19:
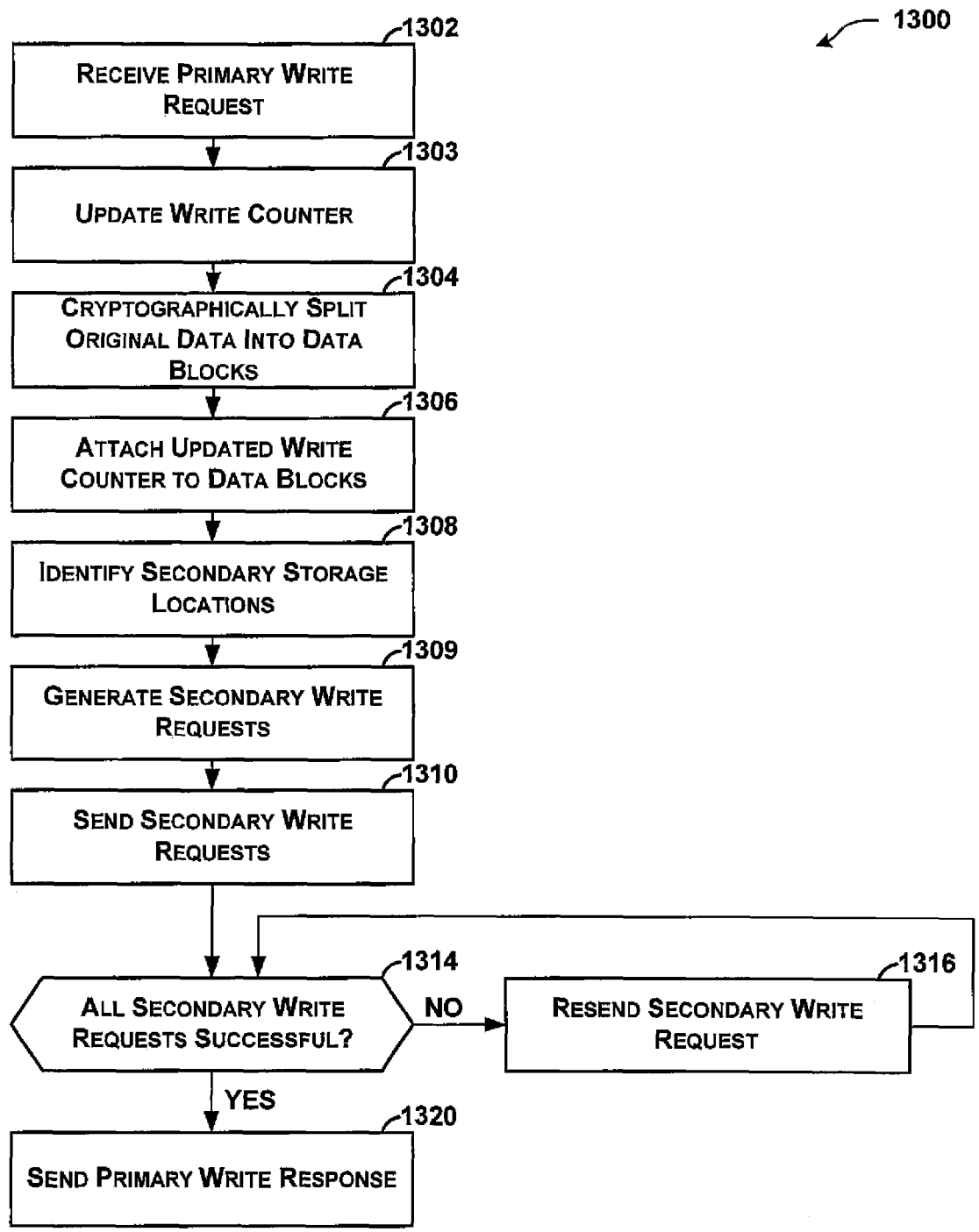
FIG. 19 is a flowchart that illustrates an example operation of the secure storage appliance that uses write counters during a write operation.

FIG. 19 is a flowchart that illustrates a first example operation 1300 of secure storage appliance 120. It should be understood that operation 1300 is provided for purposes of explanation only and does not represent a sole way of practicing the techniques of this disclosure. Rather, secure storage appliance 120 may perform other operations that include more or fewer steps than operation 1300 or may perform the steps of operation 1300 in a different order.

Operation 1300 begins when write module 306 receives a primary write request that specifies a primary data block to write to a primary storage location at a virtual disk (1302). In one example implementation, the primary storage location may be a range of disk sector addresses. The disk sector addresses specified by the primary storage location may be virtual disk sector addresses in the sense that storage devices 206 may not actually have disk sectors associated with the disk sector addresses, but application server device 1006 may output primary read requests and primary write requests as though disk sectors associated with the disk sector addresses actually exist.

Write module 306 then updates a write counter associated with the primary storage location at the virtual disk (1303). The write counter associated with the primary storage location may be a variety of different types of data. In a first example, the write counter associated with the primary storage location may be an integer. In this first example, write module 306 may update the write counter associated with the primary storage location by incrementing the write counter. In a second example, the write counter associated with the primary storage location may be an alphanumeric string. In this example, write module 306 may update the write counter associated with the primary storage location by shifting characters in the alphanumeric string.

Next, encryption module 310 cryptographically splits the primary data block into a plurality of secondary data blocks (1304). As explained above, encryption module 310 may cryptographically split the primary data block into the plurality of secondary data blocks in a variety of ways. For example, encryption module 310 may cryptographically split the primary data block into the plurality of secondary data blocks using the SECUREPARSER™ algorithm developed by SecurityFirst Corp. of Rancho Santa Margarita, Calif.

After encryption module 310 cryptographically splits the primary data block into the plurality of secondary data blocks, write module 306 attaches the updated write counter to each of the secondary data blocks (1306). Write module 306 may attach the updated write counter to each of the secondary data blocks in a variety of ways. For example, write module 306 may append the updated write counter to the ends of each of the secondary data blocks, append the updated write counter to the beginnings of each of the secondary data blocks, or insert the updated write counter at some location in the middle of the secondary data blocks.

As described above, the storage locations of a storage device are divided into shares. Each share is reserved for data associated with a volume. In other words, a volume has a share of the storage locations of a storage device. Each volume has shares of each of storage devices 206. For example, storage locations "1000" through "2000" of storage device 206A may be reserved for data associated with a first volume and storage locations "2000" through "3000" of storage device 206A may be reserved for data associated with a second volume. Furthermore, in this example, storage locations "1000" through "2000" of storage device 206B may be reserved for data associated with the first volume and storage locations "2000" through "3000" of storage device 206B may be reserved for data associated with the second volume.

After attaching the updated write counter to the secondary data blocks, write module 306 identifies a set of secondary storage locations, the set of secondary storage locations containing a secondary storage location for each of the secondary data blocks (1308). In one example implementation, secure storage appliance 120 stores a volume map that contains entries that map virtual disks to volumes. In addition, secure storage appliance 120 stores a different primary storage map for each volume. A primary storage map for a volume contains entries that map primary storage locations to intermediate storage locations. An intermediate storage location is a primary storage location relative to a volume. For example, primary storage location "1000" of a first virtual disk may map to intermediate storage location "2000" of a volume and primary storage location "3000" of a second virtual disk may map to intermediate storage location "2000." In addition, secure storage appliance 120 stores a different secondary storage map for each volume. A secondary storage map for a volume contains entries that map intermediate storage locations to secondary storage locations within the volume's shares of storage devices 206. For example, secondary storage locations "2500" through "3500" of storage device 206A may be reserved for data associated with the volume, secondary storage locations "4000" through "5000" of storage device 206B may be reserved for data associated with the volume, and secondary storage locations "2000" through "3000" of storage device 206C may be reserved for data associated with the volume. In this example, the secondary storage map may contain an entry that maps intermediate storage location "2000" to secondary location "3000" of storage device 206A, secondary storage location "4256" of storage device 206B, and secondary storage location "2348" of storage device 206C. In this example implementation, write module 306 identifies the secondary storage locations for each of the secondary data blocks by first using the volume map to identify a primary associated with the virtual disk specified by the primary write request. Write module 306 then uses the volume storage map of the identified volume to identify an intermediate storage location for the primary storage location. Next, write module 306 then uses the secondary storage map to identify the set of secondary storage locations associated with the intermediate storage location.

In a second example implementation, secure storage appliance 120 stores a map that contains entries that directly map primary storage locations of virtual disks to sets of secondary storage locations of storage devices 206. In a third example implementation, secure storage appliance 120 uses arithmetic formulas to identify sets of secondary storage locations for virtual storage locations of virtual disks.

After write module 306 identifies the secondary storage locations for each of the secondary data blocks, write module 306 generates a set of secondary write requests (1309). Each of the secondary write requests generated by write module 306 instructs one of storage devices 206 to store one of the secondary data blocks at one of the identified secondary storage locations. For example, a first one of the secondary write requests instructs storage device 206A to store a first one of the secondary data blocks at a first one of the identified secondary storage locations, a second one of the secondary write requests instructs storage device 206B to store a second one of the secondary data blocks at a second one of the identified secondary storage locations, and so on. Next, write module 306 sends via secondary interface 1202 secondary write requests to a plurality of storage devices 206 (1310). In one example implementation, write module 306 sends the secondary write requests concurrently. In other words, write module 306 may send one or more of the secondary write requests before another one of the secondary write requests finishes.

Write module 306 then determines whether all of the secondary write requests were successful (1314). Write module 306 may determine that one of the secondary write requests was not successfully completed when write module 306 received a response that indicates that one of storage devices 206 did not successfully complete the secondary write request. In addition, write module 306 may determine that one of the secondary write requests was not successfully completed when write module 306 did not receive a response from one of storage devices 206 within a timeout period. Furthermore, write module 306 may determine that a secondary write request sent to a storage device was successful when write module 306 receives a secondary write response from the storage device indicating that secondary write request was completed successfully.

If one or more of the secondary write requests were not successful ("NO" of 1314), write module 306 resends the one or more secondary write requests that were not successful (1316). Subsequently, write module 306 may again determine whether all of the secondary write requests were successful (1314), and so on.

If write module 306 determines that all of the secondary write requests were successful ("YES" of 1314), write module 306 may send via primary interface 1200 a primary write response that indicates that the primary write request was completed successfully (1320).

Figure 20:
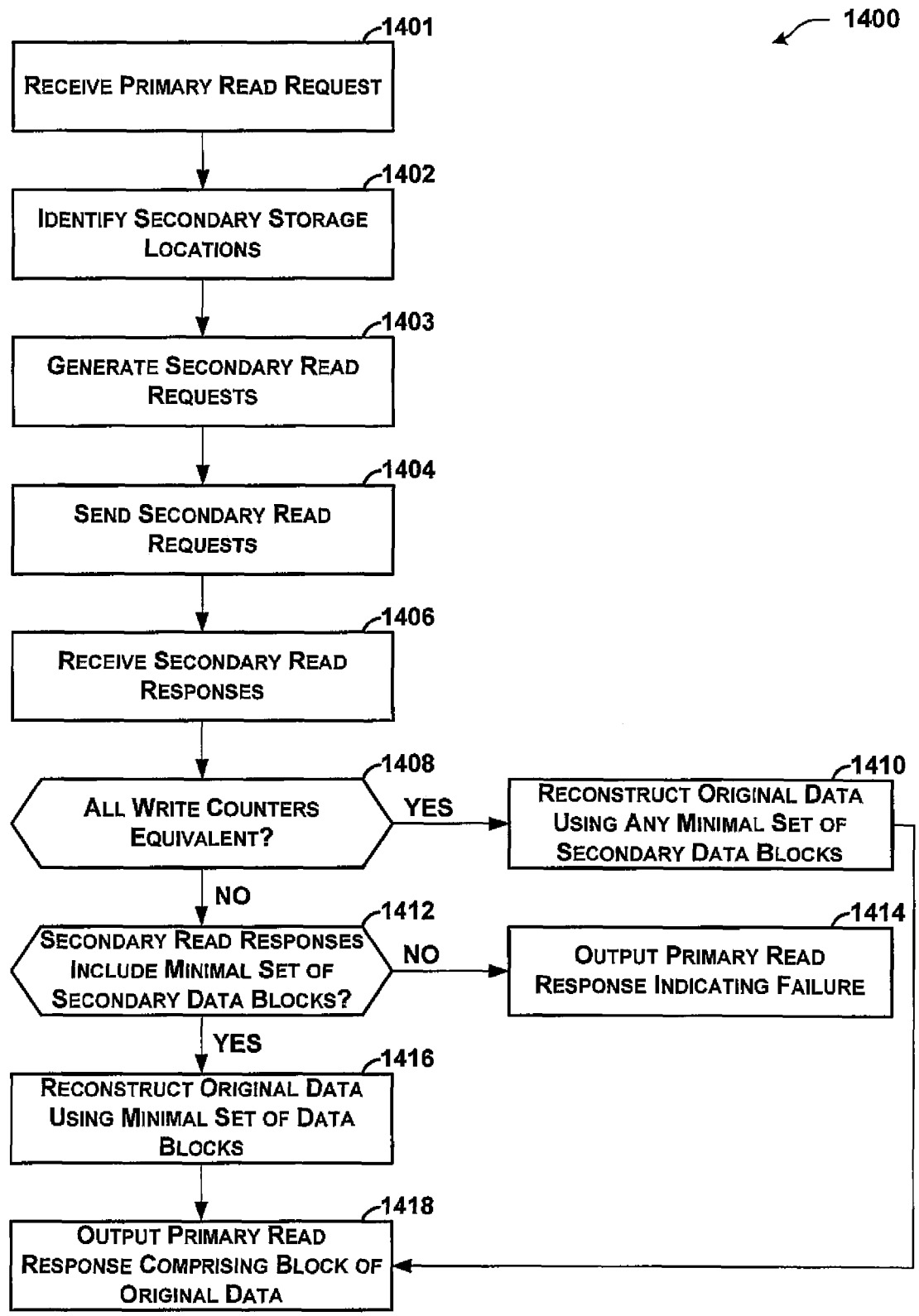
FIG. 20 is a flowchart that illustrates an example operation of the secure storage appliance that uses write counters during a read operation.

FIG. 20 is a flowchart that illustrates an example operation 1400 of read module 305 in secure storage appliance 120. Operation 1400 that uses write counters during a read operation. It should be understood that operation 1400 is provided for purposes of explanation only and does not represent a sole way of practicing the techniques of this disclosure. Rather, secure storage appliance 120 may perform other operations that include more or fewer steps than operation 1400 or may perform the steps of operation 1400 in a different order.

Operation 1400 begins when read module 305 in secure storage appliance 120 receives a primary read request that specifies a primary storage location at a virtual disk (1401). When secure storage appliance 120 receives the primary read request, read module 305 identifies secondary storage locations associated with the primary storage location of the virtual disk (1402). Read module 305 may identify the secondary storage locations associated with the primary storage location of the virtual disk using a volume map, an intermediate storage location map, and a secondary location map, as described above with regard to FIG. 4.

After read module 305 identifies the secondary storage locations, read module 305 generates a set of secondary read requests (1403). Each of the secondary read requests is a request to retrieve a data block stored at one of the identified secondary storage locations. After generating the secondary read requests, read module 305 sends the secondary read requests to ones of storage devices 206 (1404). As described in detail below with reference to FIG. 21, read module 305 may send secondary read requests to selected ones of storage devices 206. Read module 305 may send the secondary read requests concurrently. In other words, read module 305 may send one or more of the secondary read requests before one or more other ones of the secondary read requests have completed.

Subsequently, read module 305 receives from storage devices 206 secondary read responses that are responsive to the secondary read requests (1406). Each of the secondary read responses contains a secondary data block.

After read module 305 receives the secondary read responses, read module 305 determines whether all of the write counters attached to each of the secondary data blocks are equivalent (1408). In one example implementation, the write counters may be equivalent when the write counters are mathematically equal. In another example, the write counters may be equivalent when the write counters are multiples of a common number.

If read module 305 determines that all of the write counters are equivalent ("YES" of 1408), decryption module 308 reconstructs the primary data block using any minimal set of the secondary data blocks contained in the secondary read responses (1414). The minimal set of the secondary data blocks includes at least the minimum number of secondary data blocks required to reconstruct the primary data block. Furthermore, each of the secondary data blocks in the minimal set of secondary data blocks must have an equivalent write counter. In addition, the write counters of the secondary data blocks in the minimal set of the secondary data blocks must be greater than the write counters of any other set of the secondary data blocks that has the minimum number of secondary data blocks whose write counters are equivalent. For example, if only three secondary data blocks are required to reconstruct the primary data block and read module 305 received five secondary read responses, decryption module 308 may use any three of the five secondary data blocks in the secondary read responses to reconstruct the primary data block.

On the other hand, if read module 305 determines that one of the write counters is not equivalent to another one of the write counters ("NO" of 1408), read module 305 determines whether the secondary read responses include a minimal set of secondary data blocks (1410). If the secondary read responses do not include a minimal set of secondary data blocks ("NO" of 1412), read module 305 may output a primary read response that indicates that the primary read response failed (1414). In one example implementation, read module 305 may not have sent secondary read requests to all of the data storage devices that store secondary data blocks associated with the primary data block. In this example implementation, when the secondary read responses do not include a minimal set of secondary data blocks ("NO" of 1412), read module 305 may output secondary read requests to ones of the data storage devices that read module 305 did not previously send secondary request requests to. Furthermore, in this example implementation, read module 305 may loop back and again determine whether the received secondary read responses include a minimal set of secondary data blocks.

On the other hand, if the secondary read responses include a minimal set of secondary data blocks ("YES" 1412), read module 305 reconstructs the primary data block using the secondary data blocks in the minimal set of secondary data blocks (1416).

After read module 305 reconstructs the primary data block, read module 305 sends to the device that sent the primary read request a primary read response that contains the primary data block (1418). For example, if application server device 1006 sent the primary read request, read module 305 sends to application server device 1006 a primary read response that contains the primary data block.

Figure 21:
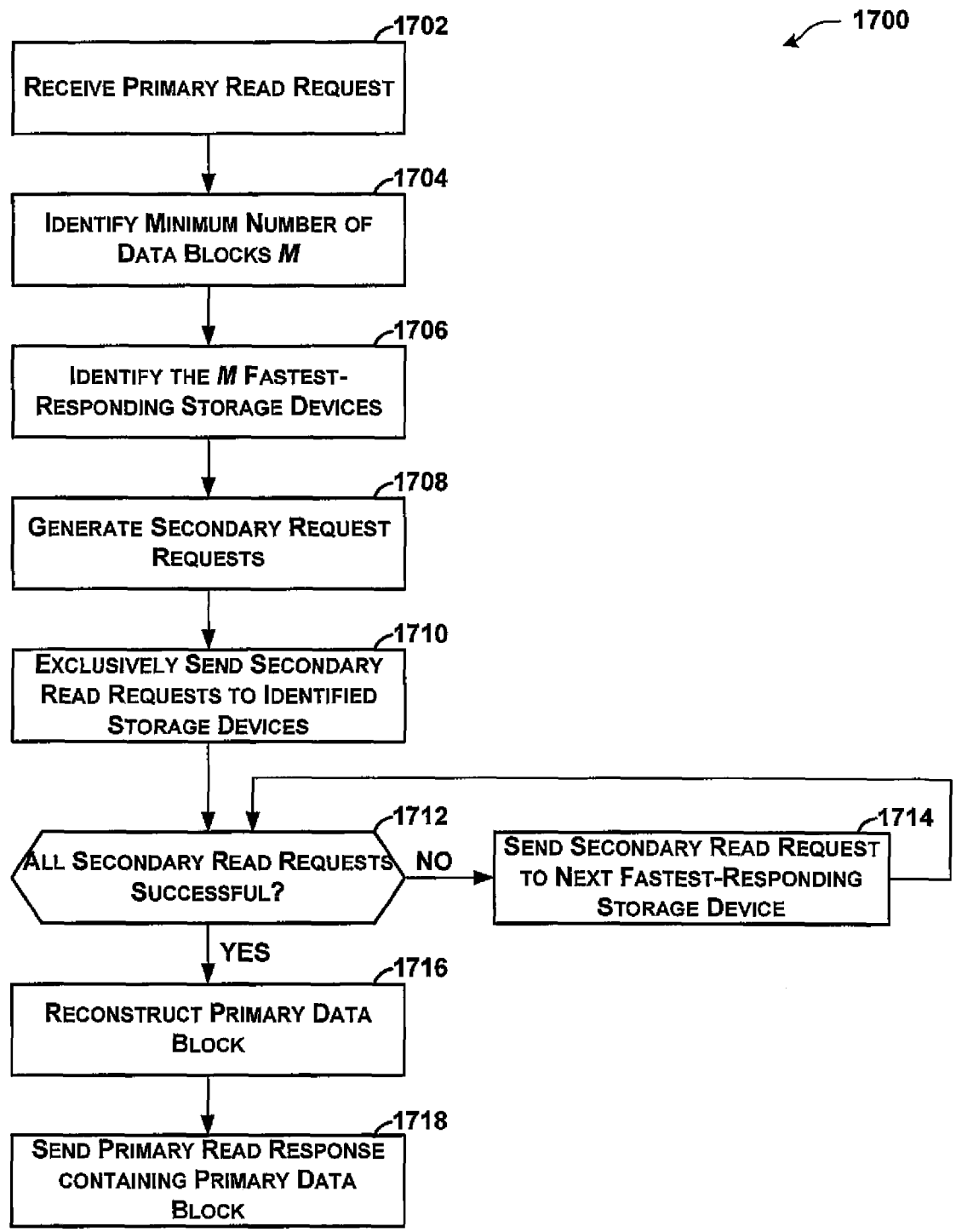
FIG. 21 is a flowchart that illustrates an example operation of the secure storage appliance to retrieve secondary data blocks from a set of fastest-responding storage devices.

FIG. 21 is a flowchart that illustrates a second alternate example operation 1700 of read module 305 in secure storage appliance 120 to retrieve secondary data blocks from storage devices 206. It should be understood that operation 1700 is provided for purposes of explanation only and does not represent a sole way of practicing the techniques of this disclosure. Rather, secure storage appliance 120 may perform other operations that include more or fewer steps than operation 1700 or may perform the steps of operation 1700 in a different order.

Initially, read module 305 receives a primary read request for data stored at a primary storage location (1702). After receiving the primary read request, read module 305 identifies a minimum number of secondary data blocks M required to reconstruct the primary data block. (1704). As used in this disclosure, the letter "M" is used to designate the minimum number of secondary storage blocks required to reconstruct a primary data block. Each volume may have a different value for M. In one example implementation, read module 305 may identify the value of M for a volume by accessing a configuration table that contains an entry that indicates the value of M for the volume. For example, read module 305 may determine that the value of M for a particular volume is three, meaning that a minimum of three secondary data blocks are required to reconstruct the primary data block of the volume.

Next, read module 305 identifies the M fastest-responding ones of storage devices 206 (1706). The set of fastest-responding storage devices are the storage devices that are expected to respond fastest to requests sent by secure storage appliance 120 to the storage devices. Read module 305 may identify the fastest-responding storage devices in a variety of ways. In a first example, read module 305 calculates expected response time statistics for each of storage devices 206. For instance, read module 305 may calculate an expected response time statistic that indicates that the average time it takes for storage device 206A to respond to a read request sent from secure storage appliance 120 is 0.5 seconds and may calculate an expected response time statistic that indicates that the average time it takes for storage device 206B to respond to a read request sent from secure storage appliance 120 is 0.8 seconds. In this first example, read module 305 uses the expected response time statistics to identify the M fastest-responding storage devices. Read module 305 may acquire the expected response time statistics by periodically sending messages to storage devices 206 and determining how long each of storage devices 206 take to respond to the messages. In one example implementation, the expected response time statistic for one of storage devices 206 is the average of the times it took the storage device to respond to the most recent fifteen messages.

In a second example, read module 305 calculates expected response time statistics for each of storage devices 206 as described in the first example. However, in this second example, read module 305 also tracks the current busyness of each storage devices 206. In this second example, read module 305 accounts for the current busyness of each of storage devices 206 when identifying the M fastest-responding storage devices. For instance, if the expected response time statistics indicate that storage device 206A has the fastest average response time, but storage device 206A is currently very busy, read module 305 might not include storage device 206A among the M fastest-responding storage devices. To implement this, read module 305 may maintain a running count of the number of I/O requests outstanding to each of storage devices 206. In this example, it is assumed that any current I/O request is about halfway complete. Consequently, the expected response time of one of storage devices 206 is equal to $(N+0.5)*R$, where N is the number of I/O requests outstanding for the storage device and R is the average response time for the storage device.

Ones of storage devices 206 may have different response times for a variety of reasons. For example, a first subset of storage devices 206 may be physically located at a first data center and a second subset of the storage devices may be physically located at a second data center. In this example, the first data center and the second data center are geographically separated from one another. For instance, the first data center may be located in Asia and the second data center may be located in Europe. In this example, both the first data center and the second data center may store at least a minimum number of the shares of each volume to reconstruct the data of each volume. Separating data centers in this manner may be useful to prevent data loss in the event a catastrophe occurs at one of the geographic locations. In another instance, both the first data center and the second data center store fewer than the minimum number of shares of each volume to reconstruct the data of each volume. In this instance, distributing the shares in this manner may protect the data of the volumes in the event that all data at one of the data centers is compromised.

After read module 305 identifies the M fastest-responding storage devices, read module 305 generates a set of secondary read requests (1708). The set of secondary read requests includes one read request for each of the M fastest-responding storage devices. Each of the secondary read requests specifies a secondary storage location associated with at the primary storage location specified by the primary read request.

After generating the secondary storage requests, read module 305 exclusively sends secondary read requests to the identified storage devices (1710). In other words, read module 305 does not send secondary read requests to ones of storage devices 206 that are not among the M fastest-responding storage devices. Read module 305 may send the secondary read requests concurrently.

Subsequently, read module 305 determines whether all of the secondary read requests were successful (1712). Secondary read requests might not be successful for a variety of reasons. For example, a secondary read request might not be successful when one of storage devices 206 does not respond to one of the secondary read requests. In another example, a secondary read request might not be successful when one of storage devices 206 sends to secure storage appliance 120 a secondary read response that indicates that the storage device is unable to read the data requested by one of the secondary read requests.

If read module 305 determines that one or more of the secondary read requests have not been successful ("NO" of 1712), read module 305 may send a new secondary read request to a next fastest-responding storage device (1714). For example, suppose M=2, storage devices 206 includes four storage devices, and the expected response time for the four storage devices are 0.4 seconds, 0.5 seconds, 0.6 seconds, and 0.7 seconds, respectively. In this example, read module 305 would have sent secondary read requests to the first storage device and the second storage device. However, because there has been an error reading from either the first storage device or the second storage device, read module 305 sends a secondary read request to the third storage device. Alternatively, if read module 305 determines that one or more of the secondary read requests have not been successful, read module 305 may send new secondary read requests to each storage device that stores a secondary data block associated with the primary data block, but was not among the identified fastest-responding storage devices. After sending the secondary read request to the next fastest-responding storage device, read module 305 may determine again whether all of the secondary read requests have been successful (1712).

If read module 305 determines that all of the secondary write requests were successful ("YES" of 1712), read module 305 uses the secondary data blocks in the secondary read responses to reconstruct the primary data block stored virtually at the primary storage location specified by the primary read request (1716). After reconstructing the primary data block, read module 305 sends a primary read response containing the primary data block to the sender of the primary read request (1718).

Figure 22:
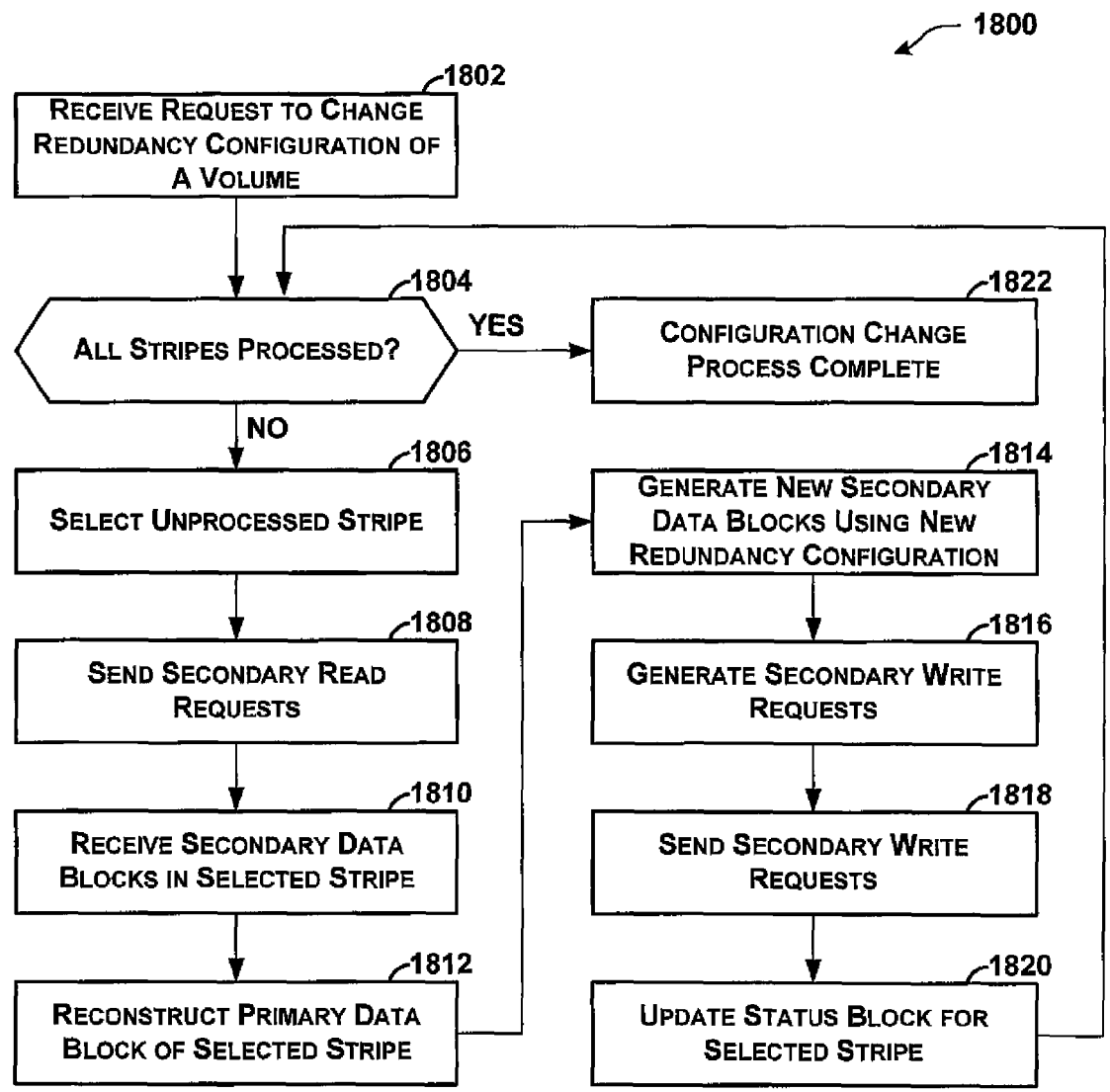
FIG. 22 is a flowchart that illustrates an example operation of the secure storage appliance when the secure storage appliance receives a request to change the redundancy scheme.

FIG. 22 is a flowchart that illustrates an example operation 1800 of secure storage appliance 120 when secure storage appliance 120 receives a request to change the redundancy scheme. It should be understood that operation 1800 is provided for purposes of explanation only and does not represent a sole way of practicing the techniques of this disclosure. Rather, secure storage appliance 120 may perform other operations that include more or fewer steps than operation 1800 or may perform the steps of operation 1800 in a different order.

Initially, configuration change module 312 receives a request to change the redundancy configuration of a volume (1802). The "redundancy configuration" of a volume is described in terms of a two numbers: M and N. As described above, the number M designates the minimum number of secondary storage blocks required to reconstruct a primary data block. The number N designates the number of secondary data blocks generated for each primary data block. In one example implementation, configuration change module 312 may receive the configuration change request via primary interface 1200. In another example implementation, configuration change module 312 may receive the configuration change request via an administrative interface.

The configuration change request instructs secure storage appliance 120 to change the redundancy configuration of data stored in storage devices 206. For example, a volume may currently be using a redundancy configuration where M=3 and N=5 (i.e., a 3/5 redundancy configuration). A 3/5 redundancy configuration is a redundancy configuration in which five secondary data blocks are written to different ones of storage devices 206 for a primary data block and in which a minimum of three secondary data blocks are required to completely reconstruct the primary data block. In this example, the request to change the redundancy configuration of the volume may instruct secure storage appliance 120 to start implementing a 4/8 redundancy configuration for the volume. A 4/8 redundancy configuration is a redundancy configuration in which eight secondary data blocks are written to different ones of storage devices 206 for a primary data block and in which a minimum of four secondary data blocks are required to completely reconstruct the primary data block.

After receiving the request to change the redundancy configuration of the volume, configuration change module 312 determines whether all stripes in the source version of the volume have been processed (1804). As explained above, a "stripe" is a set of secondary data blocks that can be used to reconstruct a primary data block. A volume contains one stripe for each primary data block of the volume. If fewer than all of the stripes in the source version of the volume have been processed ("NO" of 1804), configuration change module 312 selects one of the unprocessed stripes in the source version of the volume (1806). Configuration change module 312 may select one of the unprocessed stripes in the source version of the volume in a variety of ways. For example, configuration change module 312 may select one of the unprocessed stripes in the source version of the volume randomly from the unprocessed stripes in the source version of the volume.

Configuration change module 312 then sends secondary read requests for secondary data blocks in the selected stripe (1808). In one example implementation, configuration change module 312 exclusively sends secondary read requests to the M fastest-responding storage devices that store secondary data blocks of the volume. Read module 305 may send the secondary read requests concurrently.

After sending secondary read requests for secondary data blocks in the selected stripe, configuration change module 312 may receive at least a minimal set of secondary data blocks in the selected stripe (1810). For example, if the redundancy configuration of the source version of the volume is a 3/5 redundancy configuration, configuration change module 312 may receive three of the five secondary data blocks of the selected stripe.

When configuration change module 312 receives at least a minimal set of secondary data blocks in the selected stripe, configuration change module 312 uses decryption module 308 to reconstruct the primary data block of the selected stripe using the received secondary data blocks in the selected stripe (1812).

After using decryption module 308 to reconstruct the primary data block of the selected stripe, configuration change module 312 uses encryption module 310 to generate secondary data blocks for the primary data block using the new redundancy configuration (1814). For example, if the new redundancy scheme is a 4/8 redundancy configuration, encryption module 310 generates eight secondary data blocks.

Next, configuration change module 312 generates a set of secondary write requests to write the new secondary data blocks to secondary storage locations of the destination version of the volume at the destination storage devices (1816). Configuration change module 312 then sends the secondary write requests to appropriate ones of storage devices 206 (1816).

After sending the secondary write requests, configuration change module 312 updates stripe metadata to indicate that the selected stripe has been processed (1820). Configuration change module 312 then loops back and again determines whether all stripes in the source version of the volume have been processed (1804), and so on.

If all of the stripes in the source version of the volume have been processed ("YES" of 1804), configuration change module 312 outputs an indication that the configuration change process is complete (1822).

As a result of processing all of the stripes in the source version of the volume, the source version of the volume and the destination version of the volume are synchronized. In other words, the source version of the volume and the destination version of the volume contain data representing the same primary data blocks. In one example implementation, an administrator is able to configure configuration change module 312 to maintain the synchronization of the source version of the volume and the destination version of the volume until the administrator chooses to break the synchronization of the source version of the volume and the destination version of the volume. To maintain the synchronization of the source version of the volume and the destination version of the volume, configuration change module 312 may use encryption module 310 to cryptographically split primary data blocks in incoming primary write requests into sets of secondary data blocks in both redundancy configurations and send secondary write requests to write the secondary data blocks in the original redundancy configuration and secondary write requests to write secondary data blocks in the new redundancy configuration.

Figure 23:
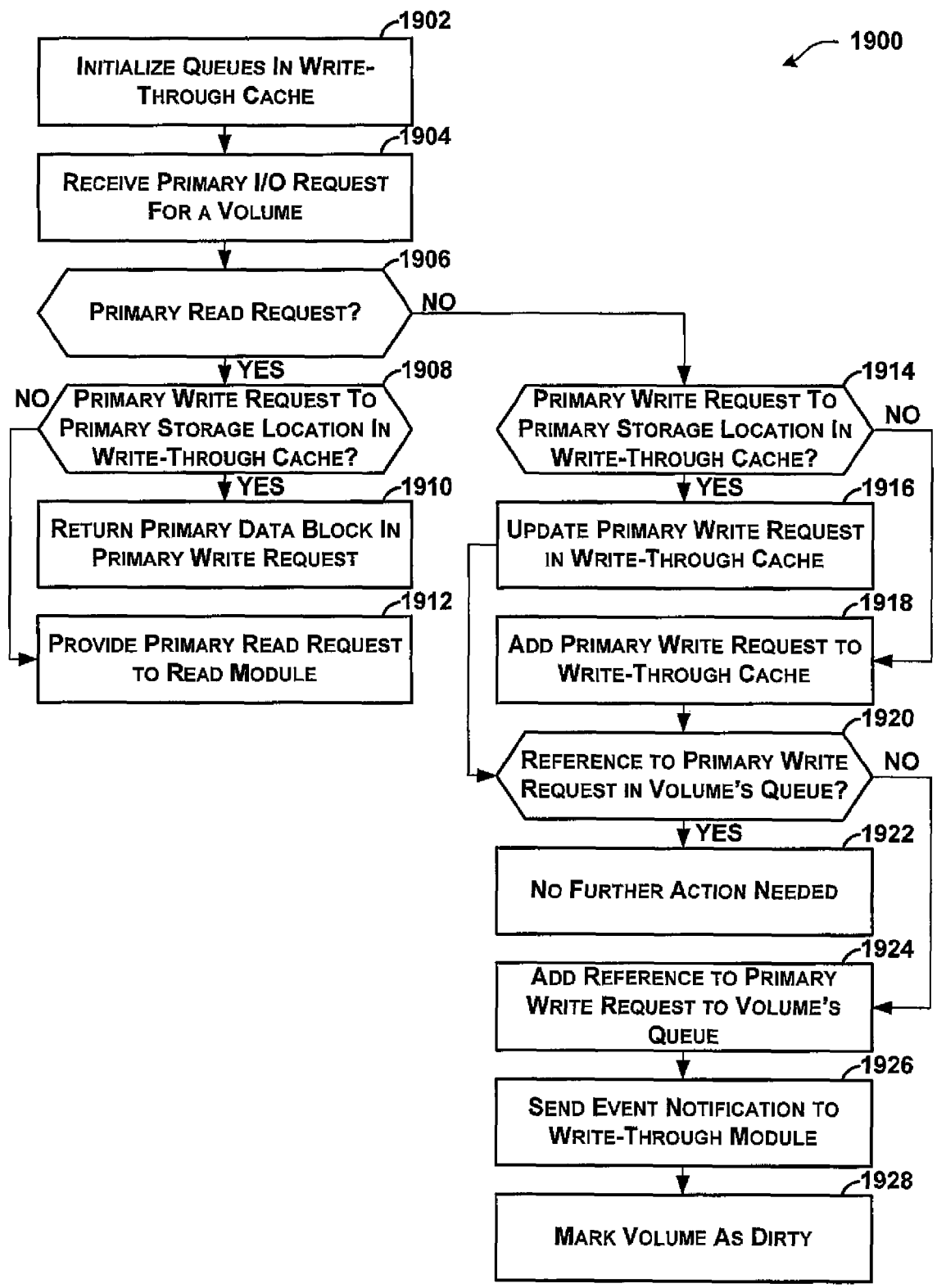
FIG. 23 is a flowchart that illustrates an example operation of the secure storage appliance to process a primary I/O request using a write-through cache.
Figure 24:
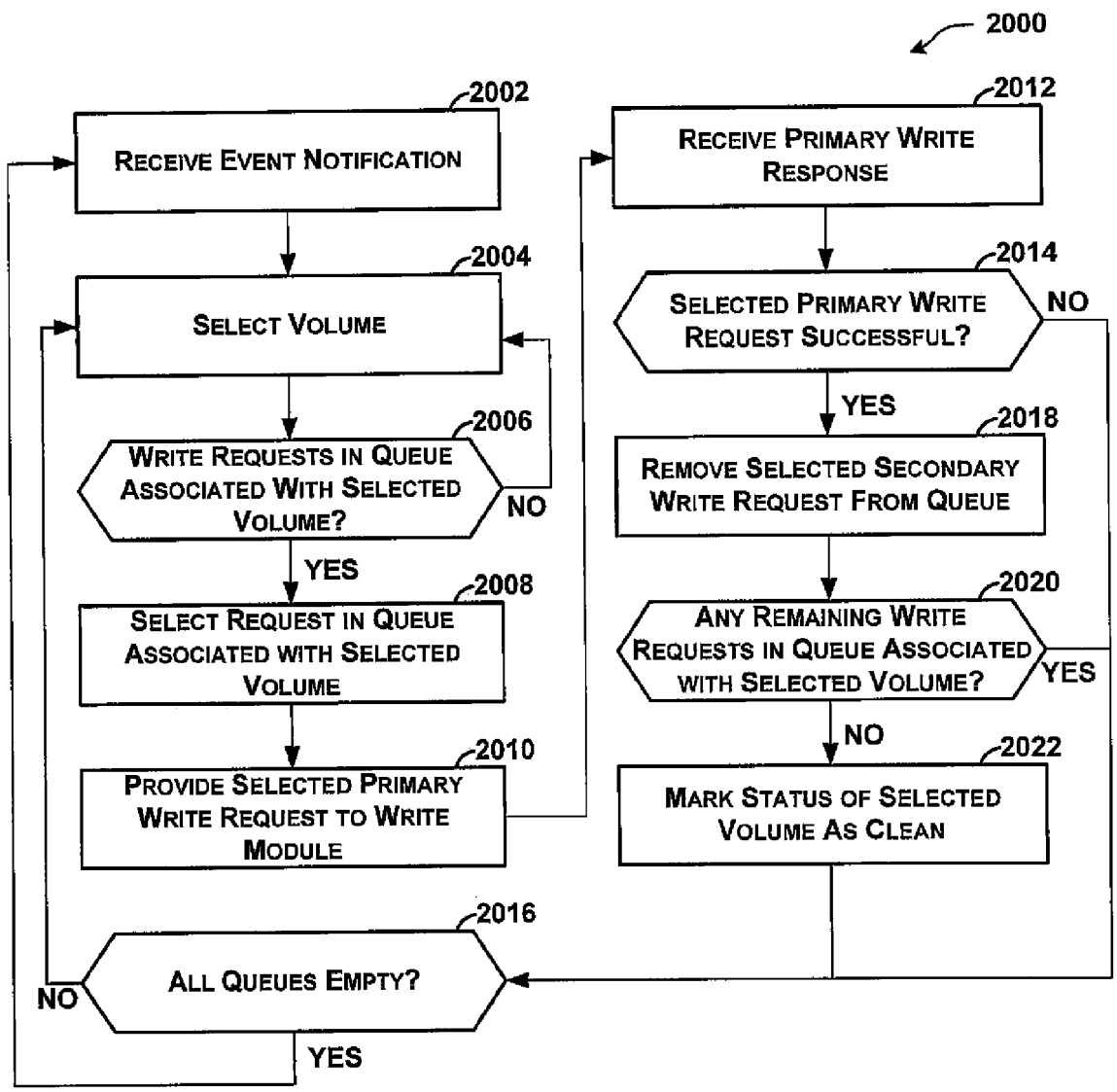
FIG. 24 is a flowchart that illustrates an example operation of the secure storage appliance to process primary write requests in the write-through cache.

FIG. 23 and FIG. 24 illustrate operations used in a first alternative implementation of secure storage appliance 120. As described below, the operations illustrated in FIG. 23 and FIG. 24 use write-through cache 316 when processing primary write operations.

FIG. 23 is a flowchart that illustrates an example operation 1900 of secure storage appliance 120 to process a primary write request using write-through cache 316. It should be understood that operation 1900 is provided for purposes of explanation only and does not represent a sole way of practicing the techniques of this disclosure. Rather, secure storage appliance 120 may perform other operations that include more or fewer steps than operation 1900 or may perform the steps of operation 1900 in a different order.

As discussed above, secure storage appliance 120 may provide a plurality of volumes. Each volume is a separate logical disk. Because each volume is a separate logical disk, application server device 1006 may treat each volume like a separate disk. For example, application server device 1006 may send to secure storage appliance 120 a primary read request to read a set of data at blocks "1000" to "2000" of a first volume and may send to secure storage appliance 120 a primary request to read a set of data at blocks "1000" to "2000" of a second volume. While each volume is a separate logical disk, data in each of the volumes may actually be stored at storage devices 206. For instance, data in a first volume and data in a second volume may actually be stored at storage device 206A.

Initially, write module 306 initializes a queue in write-through cache 316 for each volume provided by secure storage appliance 120 (1902). Each of the volumes has a status of either "clean" or "dirty." A volume has a status of "clean" when the volume's queue does not contain references to any outstanding secondary write requests to the volume. A volume has a status of "dirty" when the volume's queue contains one or more references to outstanding secondary write requests to the volume. The status of a volume is written to each of the storage devices that stores data associated with the volume. In this way, the status of a volume on a storage device indicates to an administrator whether the storage device stores up-to-date data of the volume.

Subsequently, cache driver 315 receives an incoming primary I/O request for a primary storage location at a virtual disk associated with one of the volumes (1904). Cache driver 315 may receive the incoming primary I/O request before parser driver 1204 receives the incoming primary I/O request. Upon receiving the incoming primary I/O request, cache driver 315 determines whether the incoming primary I/O request is a primary read request or a primary write request (1906).

If the incoming primary I/O request is an incoming primary read request ("YES" of 1906), cache driver 315 determines whether write-through cache 316 contains a primary write request to write a primary data block to a primary storage location that is also specified by the incoming primary read request (1908). For example, if write-through cache 316 contains a primary write request to write a primary data block to primary storage location "1000" and the incoming primary read request is to read data at primary storage location "1000," cache driver 315 may determine that the write-through cache 316 contains a primary write request to write a primary data block to a primary storage location that is also specified by the incoming primary read request.

If cache driver 315 determines that write-through cache 316 contains a primary write request to write a primary data block to a primary storage location that is also specified by the incoming primary read request ("YES" of 1908), cache driver 315 returns a primary read response that contains the primary data block in the primary write request in write-through cache 316 (1910). On the other hand, if cache driver 315 determines that write-through cache 316 does not contain a primary write request to write a primary data block to a primary storage location that is also specified by the incoming primary read request ("NO" of 1908), cache driver 315 provides the incoming primary read request to read module 305 so that read module 305 may take steps to retrieve the primary data block at the primary storage location specified by the incoming primary read request (1912).

If the incoming primary I/O request is an incoming primary write request ("NO" of 1906), cache driver 315 determines whether write-through cache 316 contains a primary write request to write a primary data block to a primary storage location that is also specified by the primary write request (1914). If cache driver 315 determines that write-through cache 316 contains a primary write request to write a primary data block to a primary storage location that is also specified by the incoming primary write request ("YES" of 1914), cache driver 315 updates the primary write request in write-through cache 316 such that the primary write request specifies the primary data block specified by the incoming primary write request (1916). Otherwise, if cache driver 315 determines that write-through cache 316 does not contain a primary write request to write a primary data block to a primary storage location that is also specified by the incoming primary write request ("NO" of 1914), cache driver 315 adds the incoming primary write request to write-through cache 316 (1918).

After cache driver 315 either updates the primary write request in write-through cache 316 or adds the primary write request to write-through cache 316, cache driver 315 determines whether the volume's queue contains a reference to the primary write request (1920). If cache driver 315 determines that the volume's queue contains a reference to the primary write request ("YES" of 1920), cache driver 315 does not need to perform any further action with regard to the primary write request (1922).

If cache driver 315 determines that the volume's queue does not contain a reference to the primary write request ("NO" of 1920), cache driver 315 adds a reference to the primary write request (1918). The reference to the primary write request may indicate a location of the primary write request in write-through cache 316. After adding the reference to the volume's queue, cache driver 315 then sends an event notification to write-through module 318 (1926). An event notification is a notification that an event has occurred. In this context, the event is the updating of the primary write request in write-through cache 316.

Cache driver 315 then marks the volume associated with the incoming primary write request as dirty (1928). In one example implementation, when cache driver 315 marks the volume as dirty, cache driver 315 may output secondary write requests to each of storage devices 206 that has a share devoted to storing data associated with the volume. In this example implementation, each of the secondary write requests instructs the storage devices to store metadata that indicates that the volume is dirty.

FIG. 24 is a flowchart that illustrates an example operation 2000 of a write-through module 318 in secure storage appliance 120 to process primary write requests in write-through cache 316. It should be understood that operation 2000 is provided for purposes of explanation only and does not represent a sole way of practicing the techniques of this disclosure. Rather, secure storage appliance 120 may perform other operations that include more or fewer steps than operation 2000 or may perform the steps of operation 2000 in a different order.

Initially, write-through module 318 receives an event notification from cache driver 315 (2002). Prior to receiving the event notification, write-through module 318 may be in a suspended state to conserve processing resources of secure storage appliance 120.

In response to receiving the event notification, write-through module 318 selects a volume (2004). In some example implementations, write-through module 318 selects the volume on a random basis. In other example implementations, write-through module 318 selects the volume on a deterministic basis. After write-through module 318 selects the volume, write-through module 318 determines whether there are one or more references to primary write requests in a queue in write-through cache 316 associated with the selected volume (2006). If there are no references to primary write requests in the queue in write-through cache 316 associated with the selected volume ("NO" of 2006), write-through module 318 may loop back and again select a volume (2004).

On the other hand, if there are one or more references to primary write requests in the queue in write-through cache 316 associated with the selected volume ("YES" of 2006), write-through module 318 selects one of the references to primary write requests in the queue in write-through cache 316 associated with the selected volume (2008). In some example implementations, write-through module 318 selects the reference on a random basis. In other example implementations, write-through module 318 selects the reference on a deterministic basis. For instance, write-through module 318 may select the reference to an oldest primary write request in the selected volume's queue in write-through cache 316.

Write-through module 318 then provides the primary write request indicated by the selected reference (i.e., the indicated primary write request) to write module 306 (2010). When write module 306 receives the indicated primary write request, write module 306 performs an operation to execute the indicated primary write request. For example, write module 306 may perform the example operation illustrated in FIG. 19 to execute the indicated primary write request. In another example, write module 306 may perform the example operation illustrated in FIG. 23 to execute the indicated primary write request.

After write-through module 318 provides to write module 306 the indicated primary write request, write-through module 318 receives a primary write response from write module 306 (2012). Write-through module 318 then determines whether the primary write response indicates that the indicated primary write request was successfully executed (2014). For example, the primary write response may indicate that the indicated primary write request was not successful when write module 306 did not receive a secondary write response from a storage device within a timeout period.

If write-through module 318 determines that the primary write response indicates that the indicated primary write request was not performed successfully ("NO" of 2014), write-through module 318 determines whether all queues in write-through cache 316 are empty (2016). If all queues in write-through cache 316 are empty ("YES" of 2016), write-through module 318 waits until another event notification is received (2002). If all queues in write-through cache 316 are not empty ("NO" of 2016), write-through module 318 selects one of the volumes (2004), and so on.

If write-through module 318 determines that the primary write response indicates that the indicated primary write request was performed successfully ("YES" of 2014), write-through module 318 removes the selected reference from the selected volume's queue in write-through cache 316 (2018). In one example implementation, the indicated primary write request is not removed from write-through cache 316 until the indicated primary write request becomes outdated or is replaced by more recent primary write requests. After removing the selected reference, write-through module 318 determines whether there are any remaining references in the selected volume's queue in write back cache 1216 (2020). If there are remaining references in the selected volume's queue in write back cache 1216 ("YES" of 2020), write-through module 318 determines whether all queues in write-through cache 1016 are empty, as discussed above (2016). If there are no remaining references in the selected volume's queue in write-through cache 316 ("NO" if 2020), write-through module 318 marks the status of the selected volume as clean (2022). In one example implementation, to mark the status of the selected volume as clean, write-through module 318 may output secondary write requests to each of storage devices 206 that has a share devoted to storing data associated with the volume. In this example implementation, each of the secondary write requests instructs the storage devices to store metadata that indicates that the volume is clean. Furthermore, in some example implementations, write-through module 318 marks the status of the queue as "clean" only after waiting a particular period of time after removing the selected primary write request from the selected volume's queue. Waiting this period of time may prevent the selected volume from thrashing between the "clean" status and the "dirty" status. After marking the status of the queue as "clean", write-through module 318 may determine whether all of the queues in write-through cache 316 are empty, as described above (2016).

Figure 25:
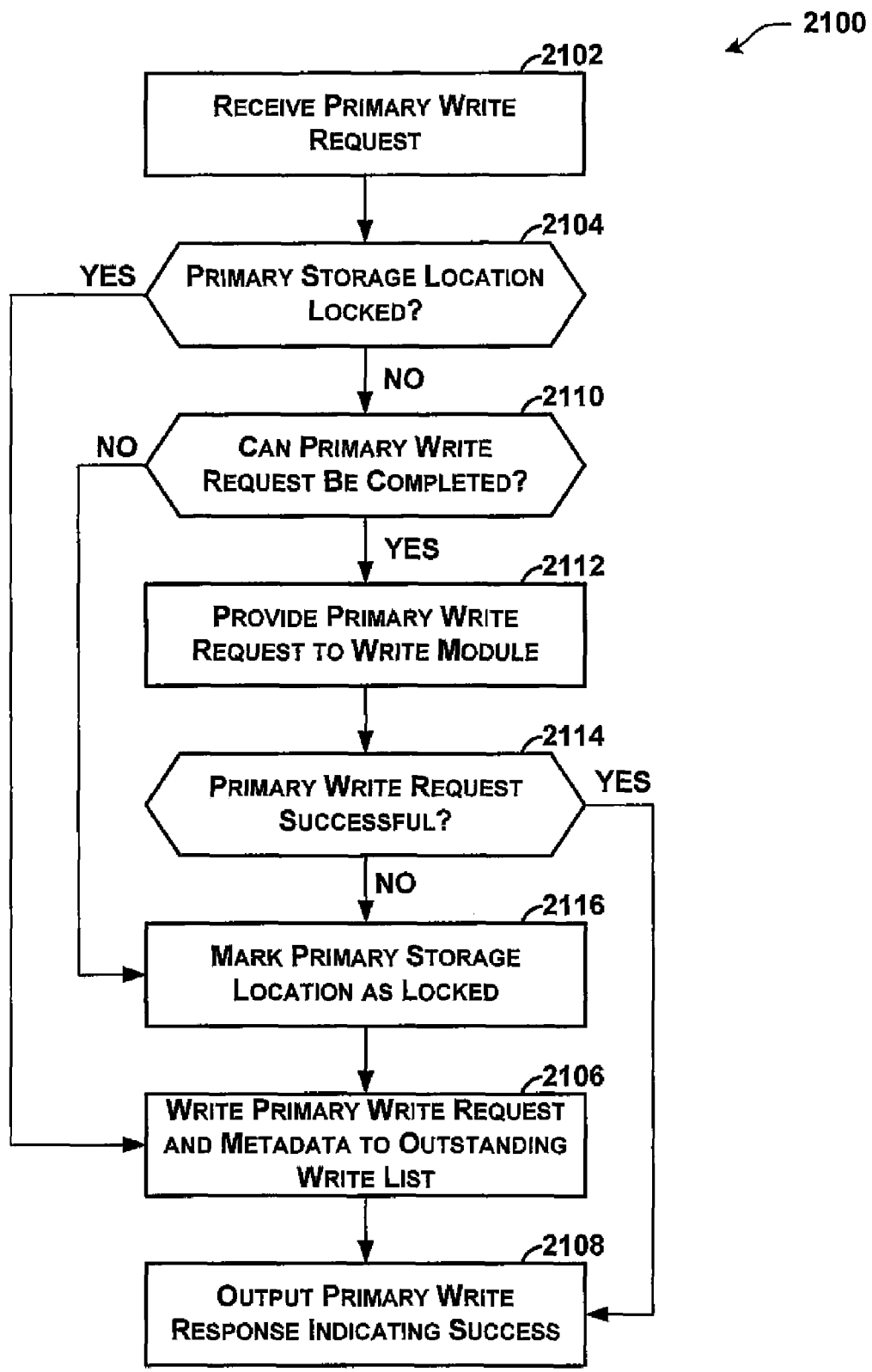
FIG. 25 is a flowchart that illustrates an example operation of the secure storage appliance to process a primary write request using an outstanding write list.
Figure 26:
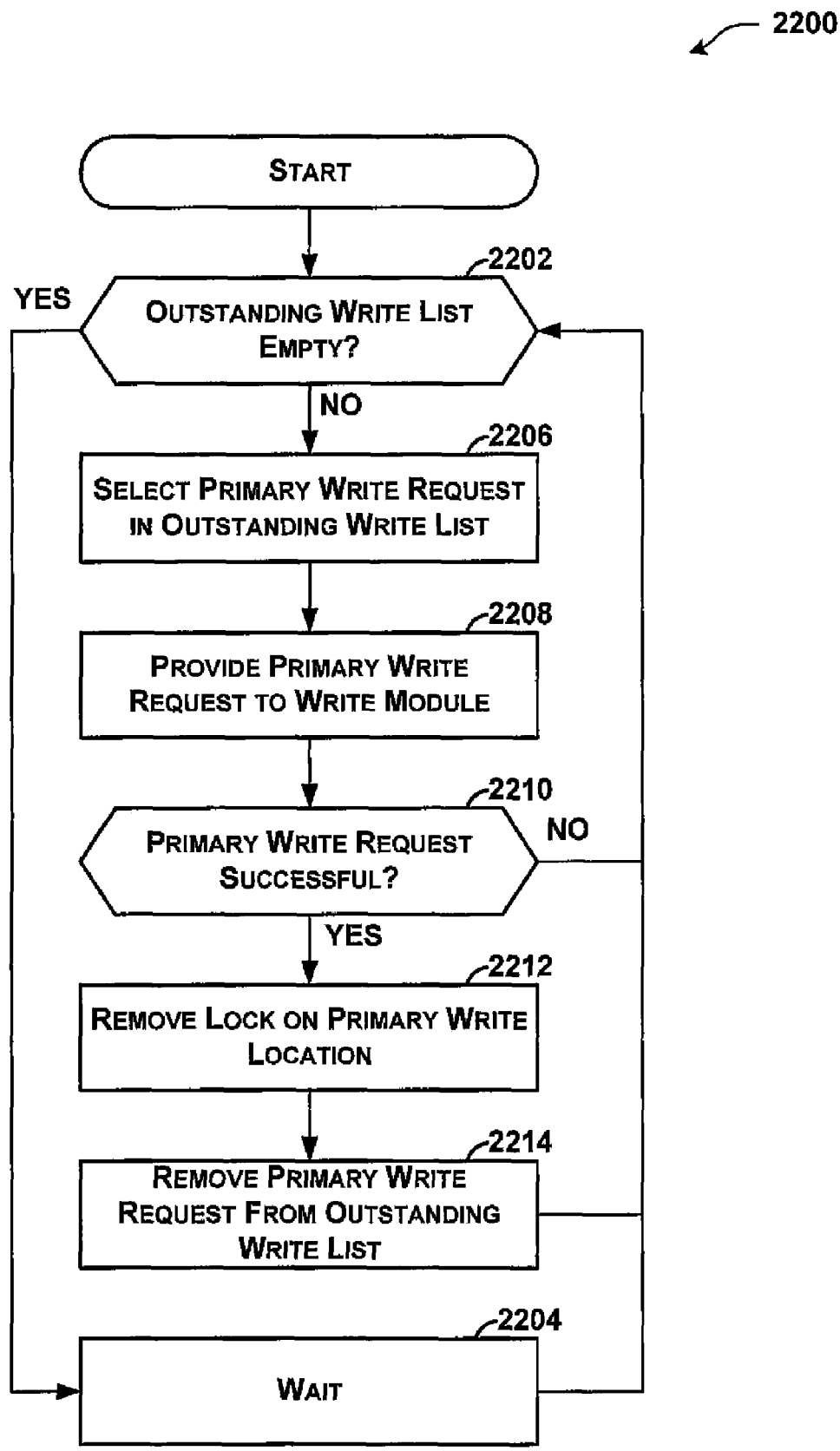
FIG. 26 is a flowchart that illustrates an example operation of the secure storage appliance to process primary write requests in the outstanding write list.
Figure 27:
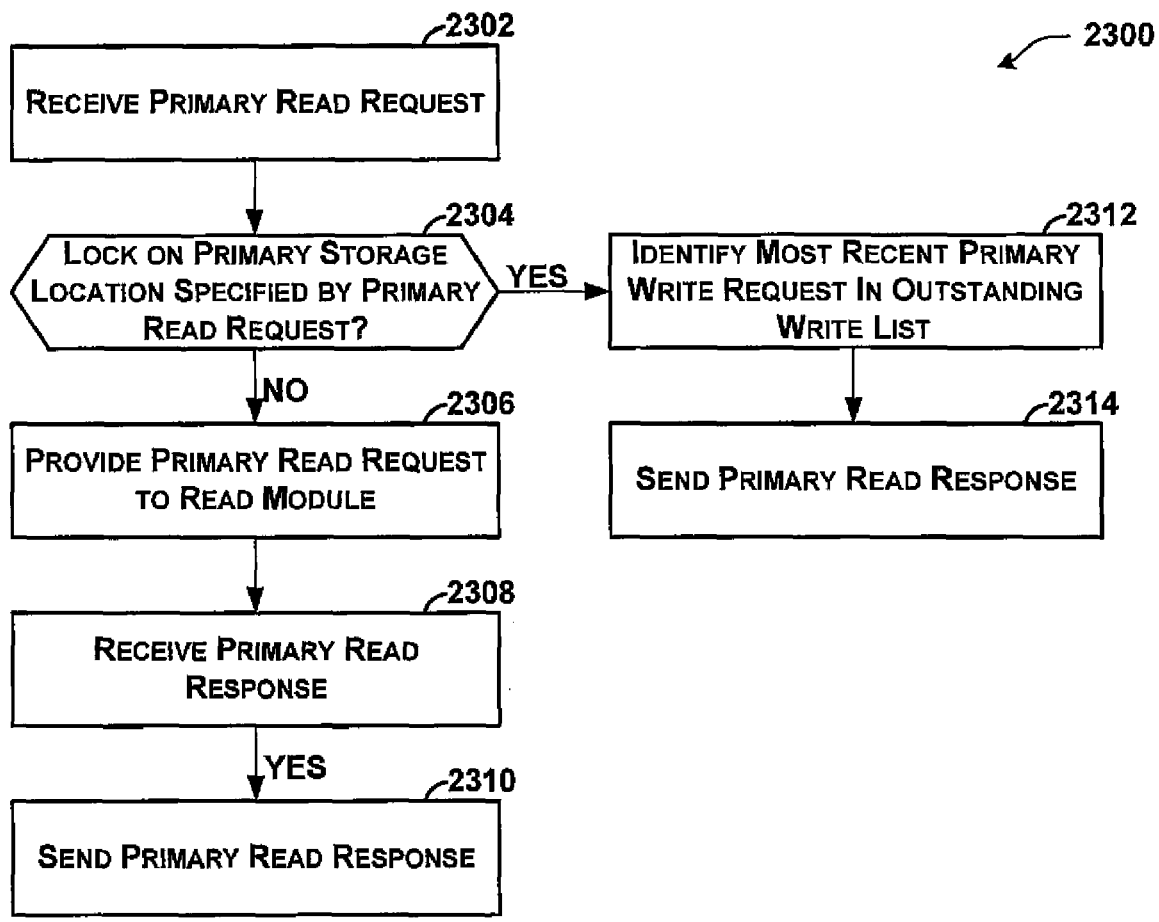
FIG. 27 is a flowchart that illustrates an example operation of the secure storage appliance to process a primary read request using the outstanding write list.

FIGS. 25-27 illustrate operations used in a second alternative implementation of secure storage appliance 120. As described below with reference to FIG. 25, in this alternative implementation of secure storage appliance 120, write module 306 uses outstanding write list 320 to temporarily store primary write requests that cannot be completed immediately. Furthermore, as described below with reference to FIG. 26, OWL module 326 attempts to complete primary write requests stored in outstanding write list 320. As described below with reference to FIG. 27, read module 305 uses outstanding write list 320 to respond to some primary read requests.

FIG. 25 is a flowchart that illustrates an example operation 2100 of secure storage appliance 120 to process a primary write request using an outstanding write list 320. It should be understood that operation 2100 is provided for purposes of explanation only and does not represent a sole way of practicing the techniques of this disclosure. Rather, secure storage appliance 120 may perform other operations that include more or fewer steps than operation 2100 or may perform the steps of operation 2100 in a different order.

Initially, OWL module 326 receives a primary write request to write a primary data block to a primary storage location of a volume (2102). After OWL module 326 receives the primary write request, OWL module 326 determines whether the primary write request can be completed at the current time (2104). There may be a variety of circumstances in which a primary write request cannot be completed. For example, OWL module 326 may be unable to complete a primary write request when one or more of storage devices 206 are not currently available. In a second example, the selected primary write request to write a secondary data block to a secondary storage location at storage device 206A cannot be completed at the current time because a backup operation is currently occurring at one or more of storage devices 206.

If OWL module 326 determines that the primary write request can be completed at the current time ("YES" of 2104), OWL module 326 provides the primary write request to write module 306 (2106). When write module 306 receives the primary write request, write module 306 performs an operation to securely write the primary write request. For instance, write module 306 may use operation 1300 in FIG. 19 or another operation to securely write the primary write request.

Subsequently, OWL module 326 determines whether the primary write request was successful (2108). If the OWL module 326 determines that the primary write request was successful ("YES" of 2108), the OWL module 326 outputs a primary write response indicating that the primary write request was successful (2110).

On the other hand, if the OWL module 326 determines that the primary write request was not successful ("NO" of 2108) or if the primary write request cannot be completed at the current time ("NO" of 2104), OWL module 326 writes the primary write request to outstanding write list 320 (2112). Outstanding write list 320 is a secure storage medium at secure storage appliance 120. All data in outstanding write list 320 may be encrypted such that it would be very difficult to access the data in outstanding write list 320 without an appropriate decryption key.

Outstanding write list 320 may be implemented in a variety of ways. For example, outstanding write list 320 may be implemented as a set of linked lists. In this example, each of the linked lists is associated with a different volume provided by secure storage appliance 120. Each of the linked lists comprises an ordered set of elements. Each of the elements contains a primary write request. For instance, the linked list associated with a first volume may comprise four elements, each of which contain one primary write request. In this example, OWL module 326 may write the selected secondary write request to outstanding write list 320 by adding an element to a linked list associated with a volume specified by the primary write request.

After OWL module 326 writes the primary write request to outstanding write list 320, OWL module 326 marks the primary storage location specified by the primary write request as locked (2114). After marking the primary storage location specified by the primary write request as locked, write module 306 outputs a primary write response that indicates that the primary write request was completed successfully (2110).

FIG. 26 is a flowchart that illustrates an example operation 2200 of OWL module 326 in secure storage appliance 120 that writes secondary write requests in the outstanding write list to storage devices. It should be understood that operation 2200 is provided for purposes of explanation only and does not represent a sole way of practicing the techniques of this disclosure. Rather, secure storage appliance 120 may perform other operations that include more or fewer steps than operation 2200 or may perform the steps of operation 2200 in a different order.

Initially, OWL module 326 determines whether outstanding write list 320 is empty (2202). In other words, OWL module 326 determines whether outstanding write list 320 contains any outstanding primary write requests. If OWL module 326 determines that outstanding write list 320 is empty ("YES" of 2202), OWL module 326 may wait a period of time (2204). After waiting, OWL module 326 may again determine whether outstanding write list 320 is empty (2202).

If OWL module 326 determines that outstanding write list 320 is not empty ("NO" of 2202), OWL module 326 selects one of the primary write requests in outstanding write list 320 (2206). In some example implementations, OWL module 326 may select the secondary write request on a random or a deterministic basis.

After selecting the primary write request, OWL module 326 provides the selected primary write request to write module 306 (2208). When write module 306 receives the primary write request, write module 306 performs an operation to securely write the primary write request. For instance, write module 306 may use operation 1300 in FIG. 19 or another operation to securely write the primary write request.

Subsequently, OWL module 326 determines whether the primary write request was completed successfully (2210). If the primary write request was not completed successfully ("NO" of 2210), OWL module 326 may loop back and again determine whether the outstanding write list is empty (2202).

As explained above with reference to FIG. 25, write module 306 locked the primary storage location specified by the selected primary write request when OWL module 326 added the selected primary write request to outstanding write list 320. As explained below with reference to FIG. 27, when OWL module 326 receives a primary read request to read data at the primary storage location when the primary storage location is locked, read module 305 uses the primary read request in outstanding write list 320 to respond to the primary read request.

Hence, when OWL module 326 determines that the primary write request was completed successfully ("YES" of 2210), OWL module 326 removes the lock on the primary storage location specified by the selected primary write request (2212). After removing the lock on the primary storage location specified by the selected primary write request, OWL module 326 removes the primary write request from outstanding write list 320 (2214). Removing the selected primary write request from outstanding write list 320 may free up data storage space in outstanding write list 320. OWL module 326 then loops back and again determines whether the outstanding write list is empty (2202).

FIG. 27 is a flowchart that illustrates an example operation 2300 of secure storage appliance 120 to process a primary read request using the outstanding write list. It should be understood that operation 2300 is provided for purposes of explanation only and does not represent a sole way of practicing the techniques of this disclosure. Rather, secure storage appliance 120 may perform other operations that include more or fewer steps than operation 2300 or may perform the steps of operation 2300 in a different order.

Initially, OWL module 326 receives a primary read request (2302). The primary read request comprises an instruction to retrieve data stored in a volume at a primary storage location. After receiving the primary read request, OWL module 326 determines whether there is a lock on the primary storage location (2304).

If OWL module 326 determines that there is no lock on the primary storage location ("NO" of 2304), OWL module 326 provides the primary read request to read module 305 (2306). When read module 305 receives the primary read request, read module 305 performs an operation to read data of the volume at primary storage location. For instance, read module 305 may perform the example operation 1400 illustrated in FIG. 20, the example operation 1700 illustrated in FIG. 21, or another operation. After providing the primary read request to read module 305, OWL module 326 receives a primary read response from the read module 305 (2308). OWL module 326 may then send the primary read response to a sender of the primary read request (2310).

On the other hand, if OWL module 326 determines that there is a lock on the primary storage location ("YES" of 2304), OWL module 326 identifies in outstanding write list 320 a primary write request that comprises an instruction to write primary data block to the primary storage location (2312). After identifying the primary write request, OWL module 326 sends to the sender of the primary read request a primary read response that contains the primary data block (2314). In this way, read module 305 uses the primary data block stored in outstanding write list 320 to respond to the primary read request.

Figure 28:
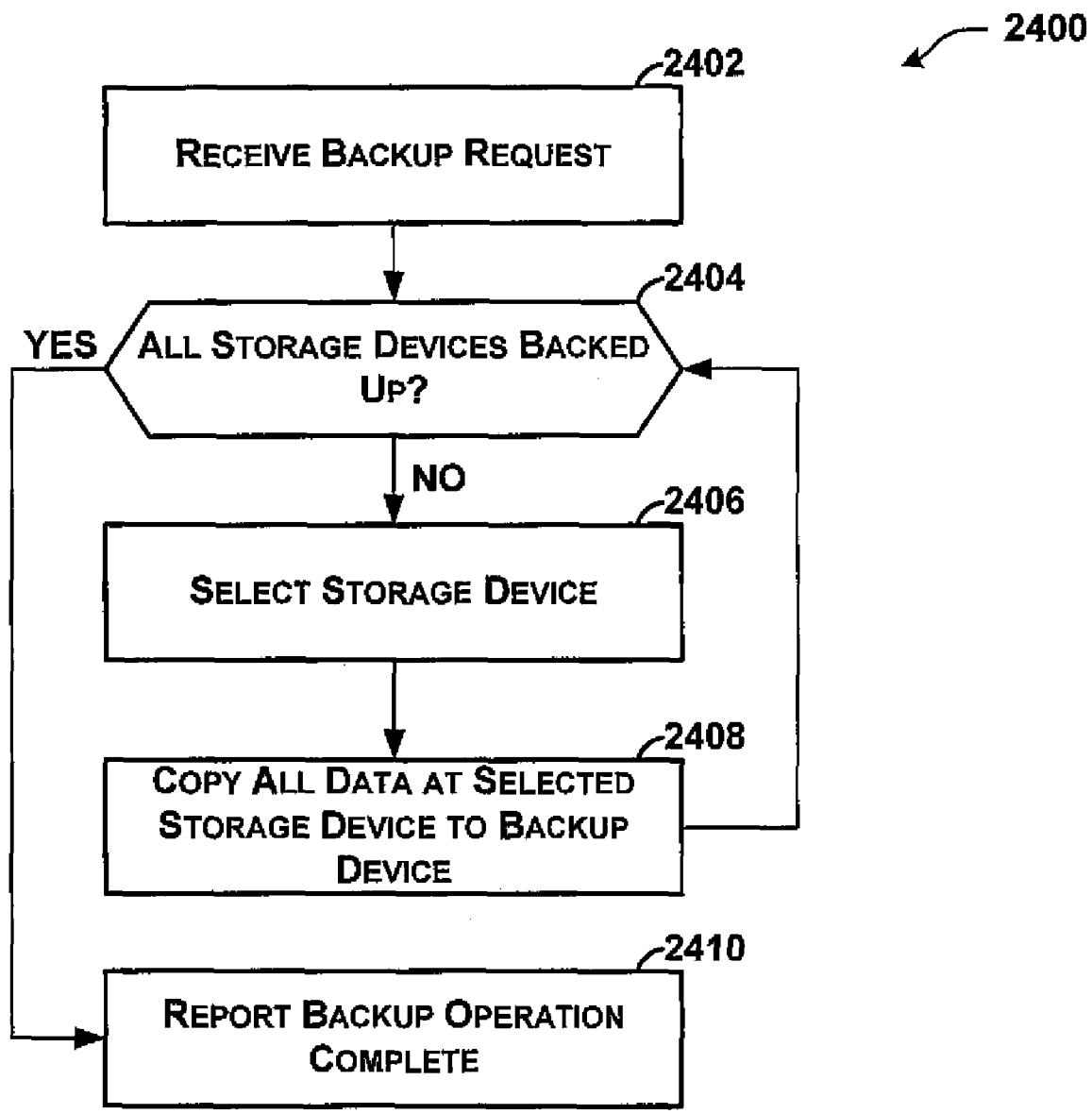
FIG. 28 is a flowchart that illustrates an example operation of a secure storage appliance to process a backup operation.

FIG. 28 is a flowchart illustrating an example operation 2400 of backup module 324 in secure storage appliance 120. It should be understood that operation 2400 is provided for purposes of explanation only and does not represent a sole way of practicing the techniques of this disclosure. Rather, secure storage appliance 120 may perform other operations that include more or fewer steps than operation 2400 or may perform the steps of operation 2400 in a different order.

Initially, backup module 324 receives a request to perform a backup operation that backs up data stored at storage devices 206 to a set of backup devices (2402). Backup module 324 may receive the request to perform the backup operation in a variety of ways. In a first example, backup module 324 may receive the request to perform the backup operation as an invocation of a function by a process operating on secure storage application 1008 or another device. In a second example, backup module 324 may receive the request to perform the backup operation via an administrative interface of secure storage appliance 120. In a third example, backup module 324 may receive the request from application server device 1006. In the example of FIG. 28, the set of backup devices includes one backup device for each one of storage devices 206.

When backup module 324 receives the request to perform the backup operation, backup module 324 determines whether all of storage devices 206 have been backed up (2404). If one or more of storage device 206 have not yet been backed up ("NO" of 2404), backup module 324 selects one of storage devices 206 that has not yet been backed up (2406). After selecting the storage device, backup module 324 copies all of the data at the selected storage device to the backup device associated with the selected storage device (2408). Backup module 324 may then loop back and again determine whether all of storage devices 206 have been backed up (2404). If all of storage devices 206 have been backed up ("YES" of 2404), backup module 324 reports that the backup operation is complete.

As discussed above, each of storage devices 206 may store data associated with a plurality of different volumes and secondary data blocks of the data each of the volumes are distributed among storage devices 206. Consequently, when backup module 324 copies the data at one of storage devices 206 to one of the backup devices, data associated with the plurality of different volumes is copied to the backup device. Because each of the backup devices is a physically separate device, it may be difficult to reconstruct the data associated with a volume from individual ones of the backup devices. For example, if a thief steals one of the backup devices, it would be difficult, if not impossible, for the thief to reconstruct the data of a volume.

It is recognized that the above networks, systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for securely writing and reading data, the method comprising:
receiving, at a secure storage appliance, a primary read request for a primary data block at a primary storage location of a volume provided by the secure storage appliance;
in response to receiving the primary read request, determining, at the secure storage appliance, whether the primary storage location is locked;

when the primary storage location is locked, retrieving the primary data block from an outstanding write list that stores primary write requests that could not be completed when the primary write requests were received by the secure storage appliance;

when the primary storage location is not locked,
- sending, from the secure storage appliance to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than N;
- receiving, at the secure storage appliance, secondary read responses sent by the storage devices, the secondary read responses containing the secondary data blocks; and
- reconstructing, at the secure storage appliance, the primary data block using the secondary data blocks contained in the secondary read responses; and sending, from the secure storage appliance, a primary read response that is responsive to the primary read request, the primary read response containing the primary data block;

wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

2. The method of claim 1, further comprising:
receiving, at the secure storage appliance, a primary write request to store the primary data block at the primary storage location;
in response to receiving the primary write request, determining whether the primary storage location is locked;
in response to determining that the primary storage location is locked, writing the primary write request to the outstanding write list;
in response to determining that the primary storage location is not locked, determining, at the secure storage appliance, whether the primary write request can be completed;
when it is determined that the primary write request cannot be completed:
- locking, at the secure storage appliance, the primary storage location; and
- writing the primary write request to the outstanding write list; and when it is determined that the primary write request can be completed:
- cryptographically splitting, at the secure storage appliance, the primary data block into the secondary data blocks; and
- sending, from the secure storage appliance to the storage devices, secondary write requests to write the secondary data blocks.

3. The method of claim 2, wherein determining whether the primary write request can be completed comprises: determining that the primary write request could not be completed when a backup operation is currently occurring at the one of the storage devices.

4. The method of claim 2, wherein determining whether the primary write request can be completed comprises: determining that the primary write request could not be completed when one of the storage devices is not currently available.

5. The method of claim 2, further comprising:
after writing the primary write request to the outstanding write list,
- cryptographically splitting, at the secure storage appliance, the primary data block into the secondary data blocks;
- sending, from the secure storage appliance to the storage devices, secondary write requests to write the secondary data blocks;
- determining, at the secure storage appliance, whether all of the secondary write requests were successful; and
- unlocking, at the secure storage appliance, the primary storage location when the secondary write requests were successful.

6. The method of claim 5, further comprising: removing the primary write request from the outstanding write list when the secondary write requests were successful.

7. The method of claim 1, further comprising:
storing a first subset of the secondary data blocks at a first subset of the storage devices that is physically located at a first data center; and
storing a second subset of the secondary data blocks at a second subset of the storage devices that is physically located at a second data center, the first data center being geographically separated from the second data center.

8. The method of claim 7,
wherein the first subset of the secondary data blocks includes at least the minimum number of secondary data blocks; and
wherein the second subset of the secondary data blocks includes at least the minimum number of secondary data blocks.

9. The method of claim 7, wherein storing the first subset of the secondary data blocks comprises sending the secondary write requests from the secure storage appliance to the storage devices via a storage-area network (SAN).

10. The method of claim 1, wherein locking the primary storage location comprises updating metadata stored at the secure storage appliance.

11. An electronic computing device comprising:
a processing unit;
a primary interface;
a secondary interface; and
a system memory comprising instructions that, when executed by the processing unit, cause the processing unit to:
- receive a primary read request for a primary data block at a primary storage location of a volume provided by the electronic computing device;
- in response to receiving the primary read request, determine whether the primary storage location is locked;
- when the primary storage location is locked, retrieve the primary data block from an outstanding write list that stores primary write requests that could not be completed when the primary write requests were received by the secure storage appliance;
- when the primary storage location is not locked,
  - send, to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than N;

receive secondary read responses sent by the storage devices, the secondary read responses containing the secondary data blocks; and reconstruct the primary data block using the secondary data blocks contained in the secondary read responses; and send a primary read response that is responsive to the primary read request, the primary read response containing the primary data block;

wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

12. The electronic computing device of claim 11, wherein the instructions further cause the processing unit to:

receive a primary write request to store the primary data block at the primary storage location;

in response to receiving the primary write request, determine whether the primary storage location is locked;

in response to determining that the primary storage location is locked, writing the primary write request to the outstanding write list;

in response to determining that the primary storage location is not locked, determine whether the primary write request can be completed;

when it is determined that the primary write request cannot be completed:
 lock the primary storage location; and
 write the primary write request to the outstanding write list; and when it is determined that the primary write request can be completed:
 cryptographically split the primary data block into the secondary data blocks;
 send, to the storage devices, secondary write requests to write the secondary data blocks.

13. The electronic computing device of claim 12, wherein the instructions cause the processing unit to determine that the primary write request could not be completed when a backup operation is currently occurring at one of the storage devices.

14. The electronic computing device of claim 12, wherein the instructions cause the processing unit to determine that the primary write request could not be completed when one of the storage devices is not currently available.

15. The electronic computing device of claim 12, the instructions further causing the processing unit to:

after writing the primary data block to the outstanding write list,
 cryptographically split the primary data block into the secondary data blocks;
 send, to the storage devices, secondary write requests to write the secondary data blocks;
 determine whether all of the secondary write requests were successful; and
 unlock the primary storage location when the secondary write requests were successful.

16. A non-transitory computer-readable storage medium comprising encoded digital data representing instructions that, when executed at an electronic computing device, cause the electronic computing device to:

receive a primary write request to store a primary data block at a primary storage location;

in response to receiving the primary write request, determine whether the primary storage location is locked;

in response to determining that the primary storage location is locked, write the primary write request to an outstanding write list;

in response to determining that the primary storage location is not locked, determine whether the primary write request can be completed;

when it is determined that the primary write request cannot be completed: lock the primary storage location; and write the primary write request to the outstanding write list; and when it is determined that the primary write request can be completed: cryptographically split the primary data block into the secondary data blocks;

send, to the storage devices, secondary write requests to write the secondary data blocks;

receive a primary read request for the primary data block at the primary storage location of a volume provided by the electronic computing device; in response to receiving the primary read request, determine whether the primary storage location is locked;

when the primary storage location is locked, retrieve the primary data block from an outstanding write list that stores primary write requests that could not be completed at the time when the primary write requests were received by the secure storage appliance;

when the primary storage location is not locked, send, to at least M storage devices in a plurality of N storage devices that store secondary data blocks that result from cryptographically splitting the primary data block, secondary read requests to read ones of the secondary data blocks, wherein M designates a minimum number of secondary data blocks required to reconstruct the primary data block and N designates a number of secondary storage blocks generated by cryptographically splitting the primary data block, wherein M is less than M;

receive secondary read responses sent by the storage devices, the secondary read responses containing the secondary data blocks; and reconstruct the primary data block using the secondary data blocks contained in the secondary read responses; and send a primary read response that is responsive to the primary read request, the primary read response containing the primary data block;

wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

17. The computer-readable storage medium of claim 16, wherein the instructions cause the processing unit to determine that the primary write request could not be completed when a backup operation is currently occurring at one of the storage devices.

18. The computer-readable storage medium of claim 16, wherein the instructions cause the processing unit to determine that the primary write request could not be completed when one of the storage devices is not currently available.

* * * * *